United States Patent
Choi et al.

(10) Patent No.: US 10,235,305 B2
(45) Date of Patent: *Mar. 19, 2019

(54) METHOD AND SYSTEM FOR SHARING CONTENT, DEVICE AND COMPUTER-READABLE RECORDING MEDIUM FOR PERFORMING THE METHOD

(71) Applicant: SAMSUNG ELECTRONICS CO., LTD., Suwon-si (KR)

(72) Inventors: Sun Choi, Seongnam-si (KR); Won-jong Choi, Daejeon (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/367,996

(22) Filed: Dec. 2, 2016

(65) Prior Publication Data

US 2017/0083460 A1     Mar. 23, 2017

Related U.S. Application Data

(63) Continuation of application No. 13/946,288, filed on Jul. 19, 2013, now Pat. No. 9,529,738.

(30) Foreign Application Priority Data

Jul. 20, 2012   (KR) .......................... 10-2012-0079583

(51) Int. Cl.
   *G06F 13/10*      (2006.01)
   *H04L 29/08*      (2006.01)
   (Continued)

(52) U.S. Cl.
   CPC ............ *G06F 13/102* (2013.01); *G06F 13/10* (2013.01); *G06F 13/20* (2013.01);
   (Continued)

(58) Field of Classification Search
   None
   See application file for complete search history.

(56) References Cited

U.S. PATENT DOCUMENTS

| 7,526,252 B2 | 4/2009 | Rekimoto et al. |
| 7,773,977 B2 | 8/2010 | Tominaga |

(Continued)

FOREIGN PATENT DOCUMENTS

| CN | 101447846 A | 6/2009 |
| CN | 101674314 A | 3/2010 |

(Continued)

OTHER PUBLICATIONS

Allegro Software Development Corporation, "Networked Digital Media Standards. A UPnP / DLNA Overview", Internet Citation, Oct. 26, 2006 (Oct. 26, 2016), total 25 pages, XP007906876.

(Continued)

*Primary Examiner* — Henry Tsai
*Assistant Examiner* — Aurangzeb Hassan
(74) *Attorney, Agent, or Firm* — Sughrue Mion, PLLC

(57) ABSTRACT

A method and system for sharing content, by which an experience is shared between users in real-time based on an interactive service between devices is provided. The method includes: receiving content-related information from at least one peripheral device reproducing content to be shared while an interactive service is being provided; and transmitting the content-related information to at least one second communication device connected to a first communication device by the interactive service based on the received content-related information.

18 Claims, 40 Drawing Sheets

(51) Int. Cl.
*H04L 12/18* (2006.01)
*H04L 12/28* (2006.01)
*G06F 13/20* (2006.01)
*G06F 13/28* (2006.01)
*H04L 29/06* (2006.01)

(52) U.S. Cl.
CPC ...... *H04L 12/1836* (2013.01); *H04L 12/2812* (2013.01); *H04L 67/06* (2013.01); *G06F 13/28* (2013.01); *H04L 29/06* (2013.01); *H04L 29/08072* (2013.01)

(56) References Cited

U.S. PATENT DOCUMENTS

| | | | | |
|---|---|---|---|---|
| 7,860,923 | B2* | 12/2010 | Singer | H04L 63/0823 709/203 |
| 7,979,509 | B1* | 7/2011 | Malmskog | H04L 67/2842 709/213 |
| 8,199,734 | B2 | 6/2012 | Sammarco | |
| 8,316,154 | B2 | 11/2012 | Yoneda | |
| 8,392,525 | B2 | 3/2013 | Todoroki | |
| 8,577,737 | B1* | 11/2013 | Amacker | G06Q 30/00 705/26.1 |
| 8,774,048 | B2 | 7/2014 | Raveendran | |
| 8,832,681 | B1* | 9/2014 | Cantrell | G06F 8/61 717/172 |
| 8,886,936 | B2* | 11/2014 | Nonaka | A61B 5/0002 380/44 |
| 9,264,238 | B2* | 2/2016 | Ji | H04L 65/1016 |
| 9,483,752 | B1* | 11/2016 | Raju | G06Q 10/10 |
| 9,549,045 | B2* | 1/2017 | Jooste | G06F 9/54 |
| 2004/0153545 | A1* | 8/2004 | Pandya | H04L 47/70 709/226 |
| 2004/0174824 | A1* | 9/2004 | Ohta | H04L 29/06 370/252 |
| 2007/0061398 | A1 | 3/2007 | Forssell | |
| 2008/0229304 | A1* | 9/2008 | Bengtsson | G06F 8/61 717/178 |
| 2008/0303684 | A1 | 12/2008 | Choi et al. | |
| 2009/0030974 | A1* | 1/2009 | Boudreau | H04L 63/104 709/203 |
| 2009/0234955 | A1 | 9/2009 | Hanley et al. | |
| 2010/0191859 | A1 | 7/2010 | Raveendran | |
| 2011/0078714 | A1 | 3/2011 | Sagayaraj et al. | |
| 2011/0083130 | A1* | 4/2011 | Boldyrev | G06F 9/4856 718/1 |
| 2012/0016951 | A1* | 1/2012 | Li | H04N 21/6125 709/217 |
| 2012/0297466 | A1* | 11/2012 | Li | G06F 21/10 726/7 |
| 2013/0027404 | A1* | 1/2013 | Sarnoff | G06T 1/20 345/441 |
| 2013/0036370 | A1* | 2/2013 | Ananthakrishnan | G06F 3/0488 715/753 |
| 2013/0194374 | A1* | 8/2013 | Kieft | H04L 67/38 348/14.07 |
| 2013/0225081 | A1* | 8/2013 | Doss | H04W 4/206 455/41.2 |
| 2013/0311539 | A1* | 11/2013 | Ngai | G06F 9/5072 709/201 |
| 2013/0325949 | A1* | 12/2013 | Virani | G06F 9/541 709/204 |
| 2014/0258441 | A1* | 9/2014 | L'Heureux | H04W 12/06 709/217 |
| 2014/0279235 | A1* | 9/2014 | Sandholm | G06Q 10/101 705/26.41 |
| 2014/0289040 | A1* | 9/2014 | Green | G06Q 30/0248 705/14.49 |

FOREIGN PATENT DOCUMENTS

| | | |
|---|---|---|
| CN | 101682647 A | 3/2010 |
| CN | 102292957 A | 12/2011 |
| JP | 2004104653 A | 4/2004 |
| JP | 2005260348 A | 9/2005 |
| JP | 2006323448 A | 11/2006 |
| JP | 2008160581 A | 7/2008 |
| JP | 201049526 A | 3/2010 |
| KR | 10-2007-0070865 A | 7/2007 |
| KR | 10-2008-0087997 A | 10/2008 |
| WO | 2004/049182 A1 | 6/2004 |
| WO | 2007/073468 A1 | 6/2007 |

OTHER PUBLICATIONS

International Search Report for PCT/KR2013/006482 dated Oct. 25, 2013 [PCT/ISA/210].
Written Opinion for PCT/KR2013/006482 dated Oct. 25, 2013 [PCT/ISA/237].
Notification of Transmittal of ISR and Written Opinion for PCT/KR2013/006482 dated Oct. 25, 2013 [PCT/ISA/220].
Communication from the European Patent Office dated Dec. 2, 2013 in a counterpart European Application No. 13177235.2.
Communication dated Aug. 21, 2017, from the State Intellectual Property Office of People's Republic of China in counterpart Application No. 201310307700.0.
Communication dated Aug. 7, 2017, from the Japanese Patent Office in counterpart application No. 2013-148382.
Communication dated Oct. 19, 2018, issued by the Korean Patent Office in counterpart Korean Application No. 10-2012-79583.

* cited by examiner

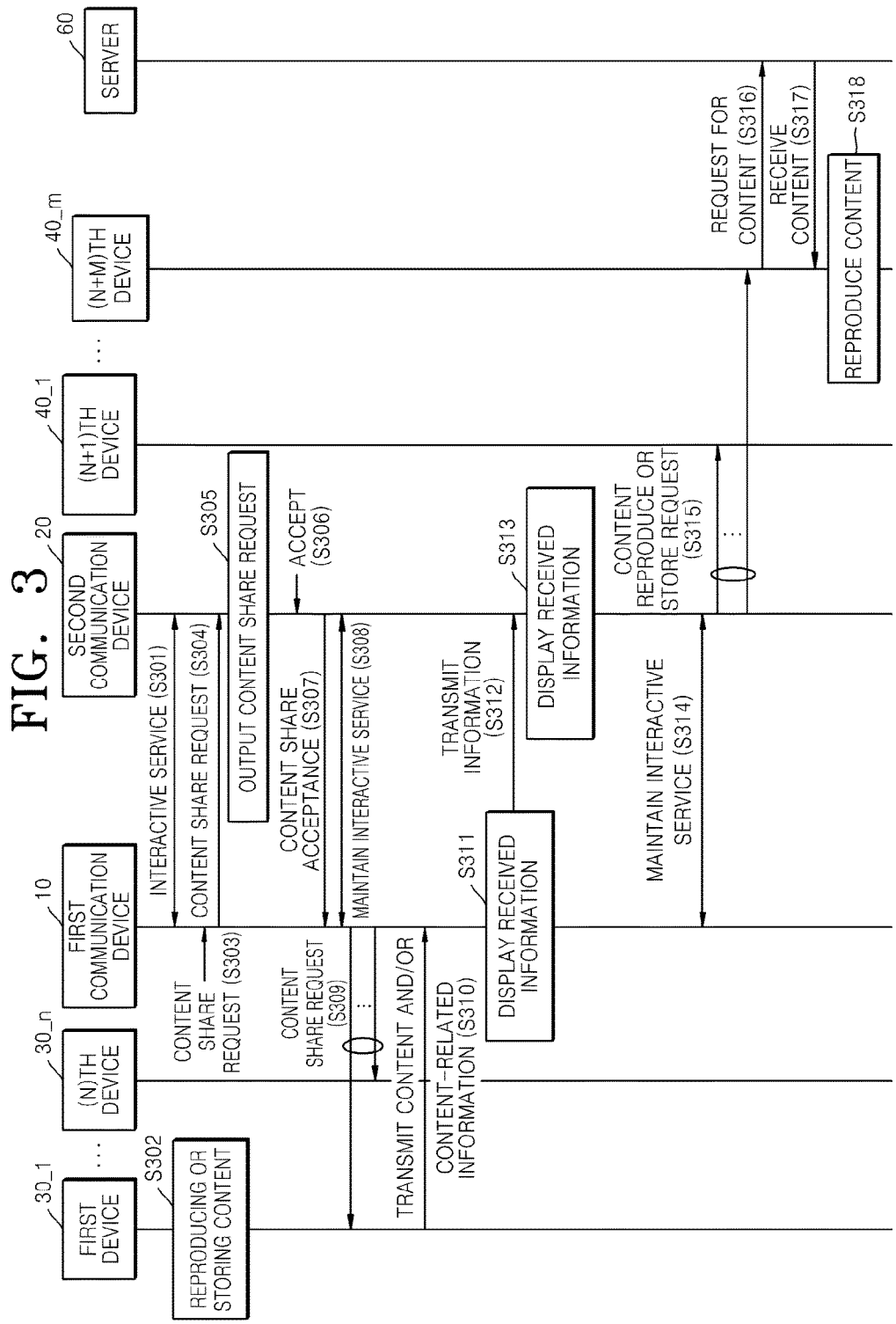

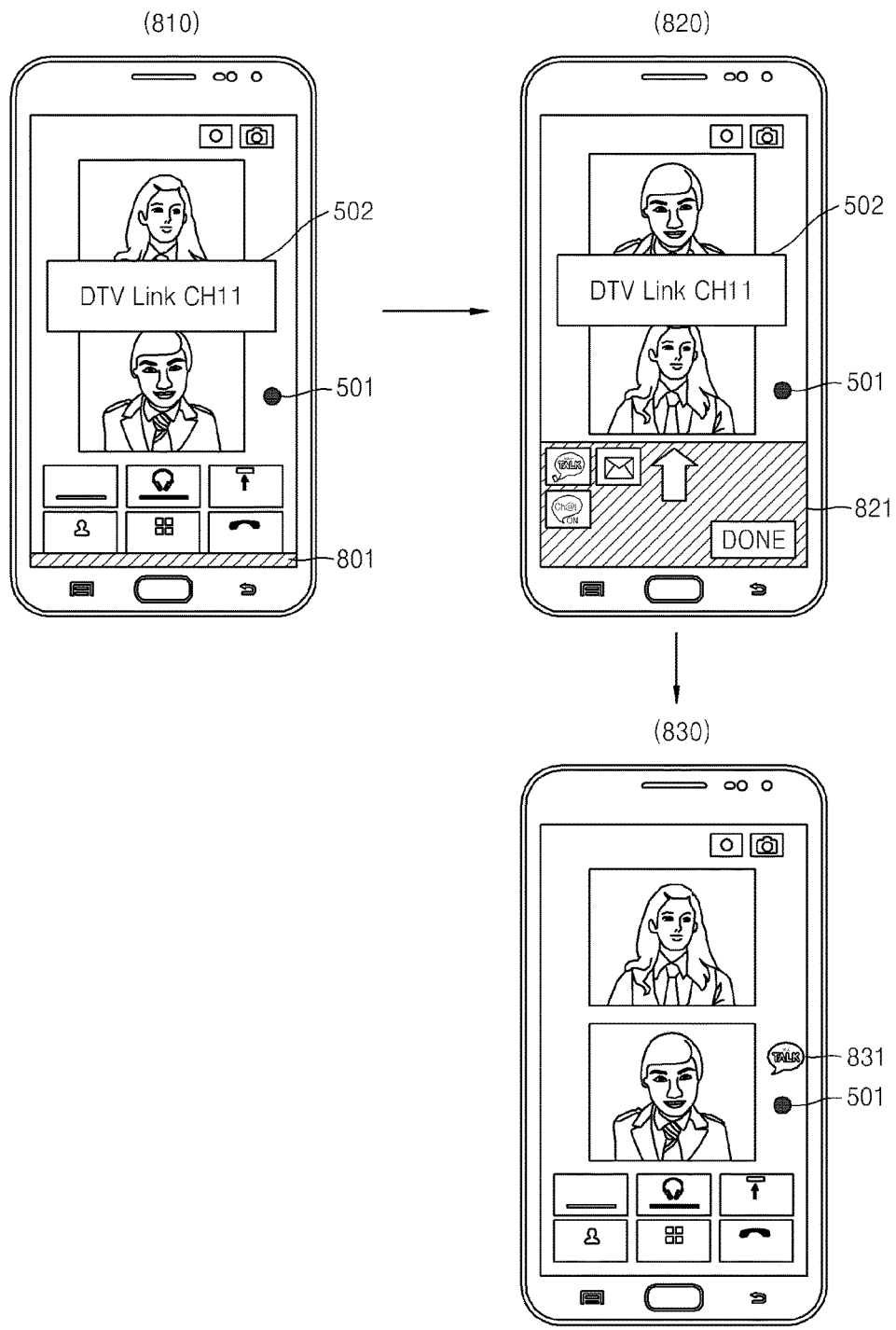

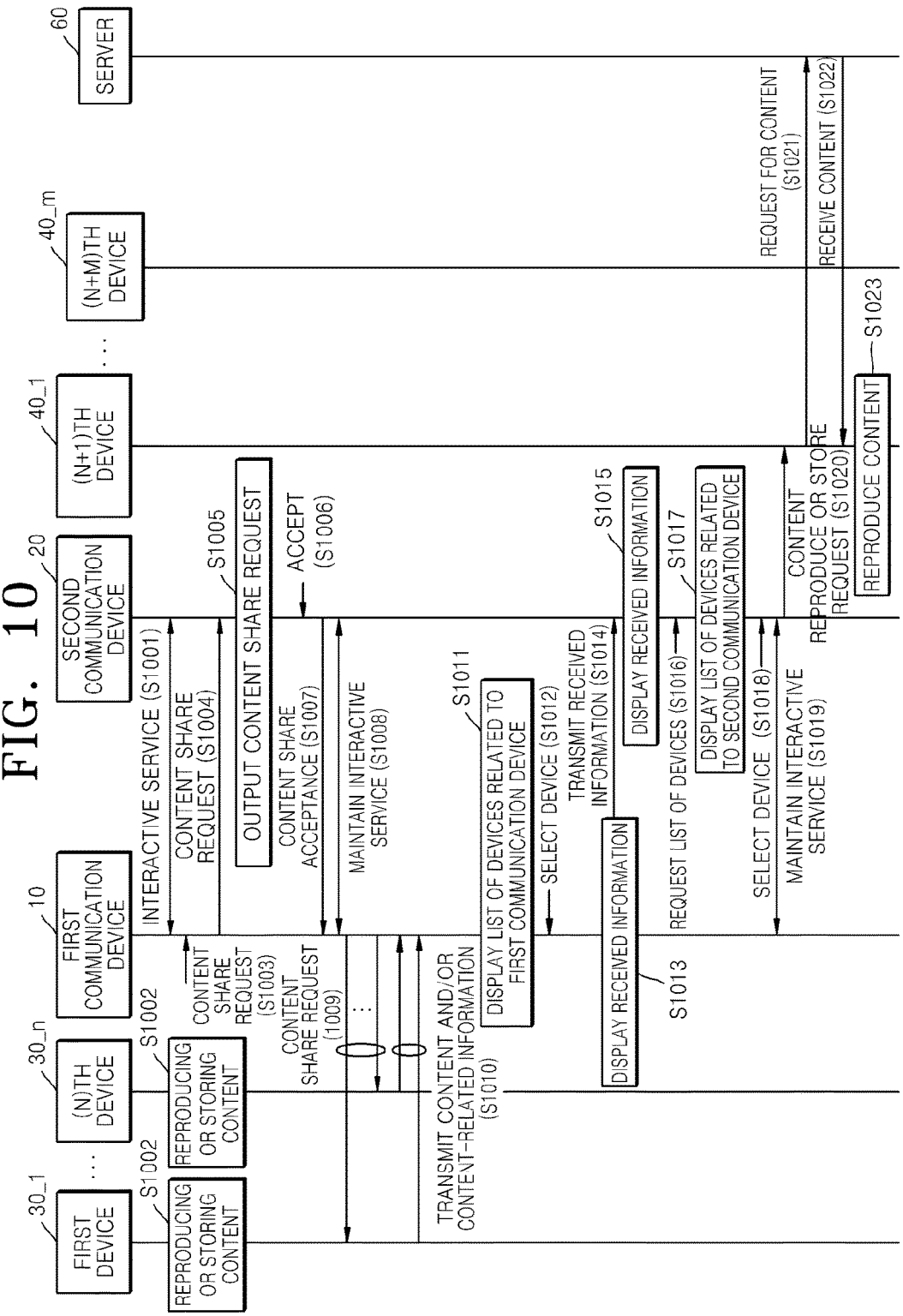

METHOD AND SYSTEM FOR SHARING CONTENT, DEVICE AND COMPUTER-READABLE RECORDING MEDIUM FOR PERFORMING THE METHOD

CROSS-REFERENCE TO RELATED PATENT APPLICATION

This is a Divisional of U.S. application Ser. No. 13/946,288 filed Jul. 19, 2013, which claims the benefit of Korean Patent Application No. 10-2012-0079583, filed on Jul. 20, 2012, in the Korean Intellectual Property Office, the disclosure of which is incorporated herein in its entirety by reference.

BACKGROUND

1. Field

Methods and applications consistent with the exemplary embodiments relate to sharing content, and more particularly, to a method and system for sharing content by using a device which executes an interactive service, and a computer-readable recording medium for performing the method.

2. Description of the Related Art

An interactive service between devices is a communication service for transmitting and receiving information between the devices that includes a two-way communication service or a bidirectional communication service. Examples of the interactive service may include a messenger service, an image and voice-based call service, and a voice-based call service.

Since there has been an increase in the use of such an interactive service, various services based on environments of the interactive service have been suggested.

SUMMARY

The exemplary embodiments provide a method and system for sharing content between users based on an interactive service between devices, and a device and computer-readable recording medium for performing the method.

The exemplary embodiments also provide a method and system for sharing content in real-time between service users while an interactive service is being executed between devices, and a device and computer-readable recording medium thereof.

According to an aspect of the exemplary embodiments, there is provided a method of sharing content, wherein the method is performed by a device, the method including: transmitting a content share request to at least one first peripheral device while an interactive service is being provided; receiving information about at least one of content and content-related information from at least one second peripheral device in response to the content share request; and transmitting the received information to at least one communication device connected to the interactive service, wherein the at least one first peripheral device includes the at least one second peripheral device.

The transmitting of the received information may be performed via a communication service which is different from the interactive service.

The method may further include determining whether content sharing is accepted by the at least one communication device.

The content may include content that is being reproduced by the at least one second peripheral device, content that is stored in the at least one second peripheral device, or content included in a content list that is stored in the at least one second peripheral device.

The content-related information may include identification information of the at least one second peripheral device that provided the content, identification information of the content, reproduction synchronization information of the content, and location information of the content.

The transmitting of the received information may include displaying the received information.

The transmitting of the content share request may include broadcasting the content share request to the at least one first peripheral device.

The receiving of the information may include: receiving at least one of the content and the content-related information from the at least one second peripheral device; displaying a list concerning the at least one second peripheral device; selecting one peripheral device from the displayed list; and determining information about at least one of the content and the content-related information received from the selected peripheral device as the received information.

The at least one second peripheral device includes a device that is reproducing the content or a device that stores the content.

The transmitting of the content share request may be performed according to a request of a user of the device.

The transmitting of the content share request may include: displaying a list concerning the at least one first peripheral device; selecting one peripheral device from the displayed list; and transmitting the content share request to the selected peripheral device.

According to another aspect of the exemplary embodiments, there is provided a device comprising: a first communication processor configured to communicate with at least one other communication device; a second communication processor configured to communicate with at least one peripheral device; a storage configured to store at least one program and data which enables the sharing of content that is being reproduced by, or stored in, the at least one peripheral device with the at least one communication device while an interactive service with the at least one communication device is being provided through the first communication processor; an information input and output device configured to receive input information of a user and output information based on the interactive service and the sharing; and a processor configured to transmit a content share request to at least one first peripheral device through the second communication processor while the interactive service is being provided through the first communication processor, receiving information about at least one of content and content-related information from at least one second peripheral device in response to the content share request, and transmitting the received information to the at least one connected communication device, wherein the at least one peripheral device comprises the at least one first peripheral device, and the at least one first peripheral device comprises the at least one second peripheral device.

According to another aspect of the exemplary embodiments, there is provided a device comprising: a touch screen configured to receive touch-based user input information, and display information based on a bidirectional communication service and content sharing with at least one communication device; at least one processor configured to provide a user interface by controlling the touch screen; a first communication processor configured to communicate with the at least one communication device; a second communication processor configured to communicate with at least one peripheral device that is reproducing or storing content to be shared; and a storage configured to store at least one program and data which enables the content sharing while an interactive service configured to be executable by the at least one processor is being provided, wherein the at least one program comprises commands for: transmitting a content share request to the at least one peripheral device while the interactive service is being provided; receive information about at least one of content and content-related information from the at least one peripheral device in response to the content share request; and transmit the received information to the at least one communication device connected to the interactive service.

According to another aspect of the exemplary embodiments, there is provided a method of sharing content, wherein the method is performed by a device, the method comprising: receiving information about at least one of content and content-related information from at least one communication device connected to the device by an interactive service while the interactive service is being provided; and transmitting a content reproduce or storage request to at least one peripheral device related to the device based on the received information about at least one of the content and the content-related information.

According to another aspect of the exemplary embodiments, there is provided a device comprising: a first communication processor configured to communicate with at least one communication device; a second communication processor configured to communicate with at least one peripheral device; a storage configured to store at least one program and data enabling content sharing based on the at least one communication device and the at least one peripheral device while an interactive service with the at least one communication device is being provided through the first communication processor; an information input and output device configured to receive input information of a user and output information based on the interactive service and the content sharing; and a processor configured to receive information about at least one of content and content-related information from the at least one communication device through the first communication processor while the interactive service is being provided, and transmitting a content reproduce or store request to the at least one peripheral device based on the received information through the second communication processor.

According to another aspect of the exemplary embodiments, there is provided a device comprising: a touch screen configured to receive touch-based user input information, and display information based on an interactive service and content sharing with at least one communication device; at least one processor configured to provide a user interface by controlling the touch screen; a first communication processor which communicates with the at least one communication device; a second communication processor configured to communicate with at least one peripheral device that reproduces or stores content to be shared; and a storage configured to store at least one program and data which enables the content sharing by using the at least one communication device and the at least one peripheral device connected to the interactive service while the interactive service configured to be executable by the at least one processor is being provided, wherein the at least one program comprises commands for: receiving information about at least one of content and content-related information for the content sharing from the at least one communication device connected to the interactive service while the interactive service is being provided; and transmits a content reproduce or storage request to the at least one peripheral device based on the received information about at least one of the content and the content-related information.

According to another aspect of the present invention, there is provided a method of sharing content, wherein the method is performed by a device, the method including: transmitting a content share request to at least one first peripheral device while an interactive service is being provided; receiving content from at least one second peripheral device in response to the content share request; and transmitting the received content to at least one communication device connected to the device by the interactive service, wherein the at least one first peripheral device includes the at least one second peripheral device.

According to another aspect of the exemplary embodiments, there is provided a method of sharing content, wherein the method is performed by a device, the method including: receiving a content from at least one peripheral device while an interactive service is being provided; requesting a content transmission session to at least one communication device connected to the device by the interactive service; receiving an acceptance signal of the content transmission session from the at least one communication device; and transmitting the content received from the at least one peripheral device to the at least one communication device.

According to another aspect of the exemplary embodiments, there is provided a method of sharing content, wherein the method is performed by a device, the method including: transmitting a content share request to at least one first peripheral device while an interactive service is being provided; receiving content-related information from at least one second peripheral device in response to the content share request; and transmitting the received content-related information to at least one communication device connected to the device by the interactive service.

According to another aspect of the exemplary embodiments, there is provided a method of sharing content, wherein the method is performed by a device, the method including: receiving content-related information from at least one peripheral device that is reproducing or storing content to be shared while an interactive service is being provided; generating content execution information based on the received content-related information; and transmitting the generated content execution information to at least one communication device connected to the device by the interactive service.

The generating of the content execution information may include: transmitting a content share request message using the content-related information to the at least one communication device based on the interactive service; receiving a content sharing acceptance message from the at least one communication device based on the interactive service; and generating the content execution information based on the content-related information in response to the receiving of the content sharing acceptance message.

The generating of the content execution information may further include: displaying the content-related information on the device; receiving approval information of a user on the displayed content-related information; and transmitting the content share request message using the content-related information to the at least one communication device in response to the receiving of the approval information.

The transmitting of the generated content execution information may include maintaining the interactive service with the at least one communication device after transmitting the content execution information to the at least one communication device.

The generating of the content execution information may include: transmitting a content share request message using the content-related information to the at least one communication device based on one of the interactive service and a communication service different from the interactive service; receiving a content share acceptance message from the at least one communication device; and generating the content execution information based on the content-related information in response to the receiving of the content share acceptance message.

The receiving of the content-related information may be performed based on one of an operation of monitoring the at least one peripheral device, an operation of transmitting a content share request to the at least one peripheral device, and a near field wireless communication between the at least one peripheral device and the device.

The transmitting of the content execution information may include displaying the content execution information on the device.

The interactive service may include one of a messenger service, a voice-based communication service, and a voice and image-based communication service.

According to another aspect of the exemplary embodiments, there is provided a method of sharing content, wherein the method is performed by a device, the method including: receiving content execution information from at least one communication device connected to the device by an interactive service; and controlling content reproduction by at least one peripheral device related to the device based on the content execution information.

The receiving of the content execution information may include: receiving the content share request message from the at least one communication device based on the interactive service; transmitting a message accepting the content share request to the at least one communication device based on the interactive service; and receiving the content execution information from the at least one communication device based on the interactive service.

The controlling of the content reproduction may include maintaining the interactive service with the at least one communication device after the content reproduction is controlled.

The receiving of the content execution information may include receiving the content execution information based on one of the interactive service and a communication service different from the interactive service.

The receiving of the content execution information may include: receiving the content share request message from the at least one communication device based on one of the interactive service and the different communication service; transmitting a message accepting the content share request to the at least one communication device; and receiving the content execution information from the at least one communication device.

The method may further include, after controlling content reproduction by, or storage in, the at least one peripheral device related to the device, controlling the at least one peripheral device such that the interactive service with the communication device by the device is seamlessly performed by the at least one peripheral device.

According to another aspect of the exemplary embodiments, there is provided a device including: a first communication processor configured to communicate with at least one communication device; a second communication processor configured to communicate with at least one peripheral device that reproduces or stores content; a storage configured to store at least one program and data which enables content sharing while an interactive service between the at least one communication device and the device is being provided through the first communication processor; an information input and output device configured to receive user input information and output information based on the interactive service and the content sharing; and a processor configured to receive content-related information from the at least one peripheral device through the second communication processor while the interactive service is being provided through the first communication processor, generate content execution information based on the received content-related information, and transmit the generated content execution information to the at least one communication device through the first communication processor.

According to another aspect of the exemplary embodiments, there is provided a device comprising: a first communication processor configured to communicate with at least one communication device; a second communication processor configured to communicate with at least one external device which reproduces or stores content; a storage configured to store at least one program and data which enables content sharing while an interactive service with the at least one communication device is being provided through the first communication processor; an information input and output device configured to receive user input information and output information based on the interactive service and the content sharing; and a processor configured to receive content execution information from the at least one communication device through the first communication processor while the interactive service is being provided through the first communication d processor, and control content reproduction by the at least one external device through the second communication processor based on the content execution information.

According to another aspect of the exemplary embodiments, there is provided a system for sharing content, the system comprising at least one first peripheral device that is configured to reproduce or store content; a first communication device configured to receive content-related information from the at least one first peripheral device while an interactive service is being provided, and generate content execution information based on the received content-related information; at least one second peripheral device configured to reproduce or store the content; and a second communication device configured to receive the content execution information while the interactive service is being provided with the first communication device, and control reproducing or storing of the content by the at least one second peripheral device based on the received content execution information.

The system may include a plurality of second communication devices and a plurality of peripheral devices, wherein the plurality of second communication devices simultaneously execute the interactive service with the first communication device, and control the reproducing or storing of the content in a corresponding second peripheral device from among the plurality of second peripheral devices.

According to another aspect of the exemplary embodiments, there is provided a computer-readable recording medium having recorded thereon one or more programs including commands for executing any one of the methods described above.

BRIEF DESCRIPTION OF THE DRAWINGS

The above and other features of the exemplary embodiments will become more apparent by describing in detail exemplary embodiments thereof with reference to the attached drawings in which:

FIG. 3 is a flowchart illustrating a method of sharing content based on the system of FIG. 1, according to an exemplary embodiment;

FIG. 8 illustrates screens for selecting another communication service while an interactive service is being provided, according to another exemplary embodiment;

FIG. 10 is a flowchart illustrating a method of sharing content based on the system of FIG. 1, according to another exemplary embodiment;

DETAILED DESCRIPTION OF EXEMPLARY EMBODIMENTS

Figure 1:
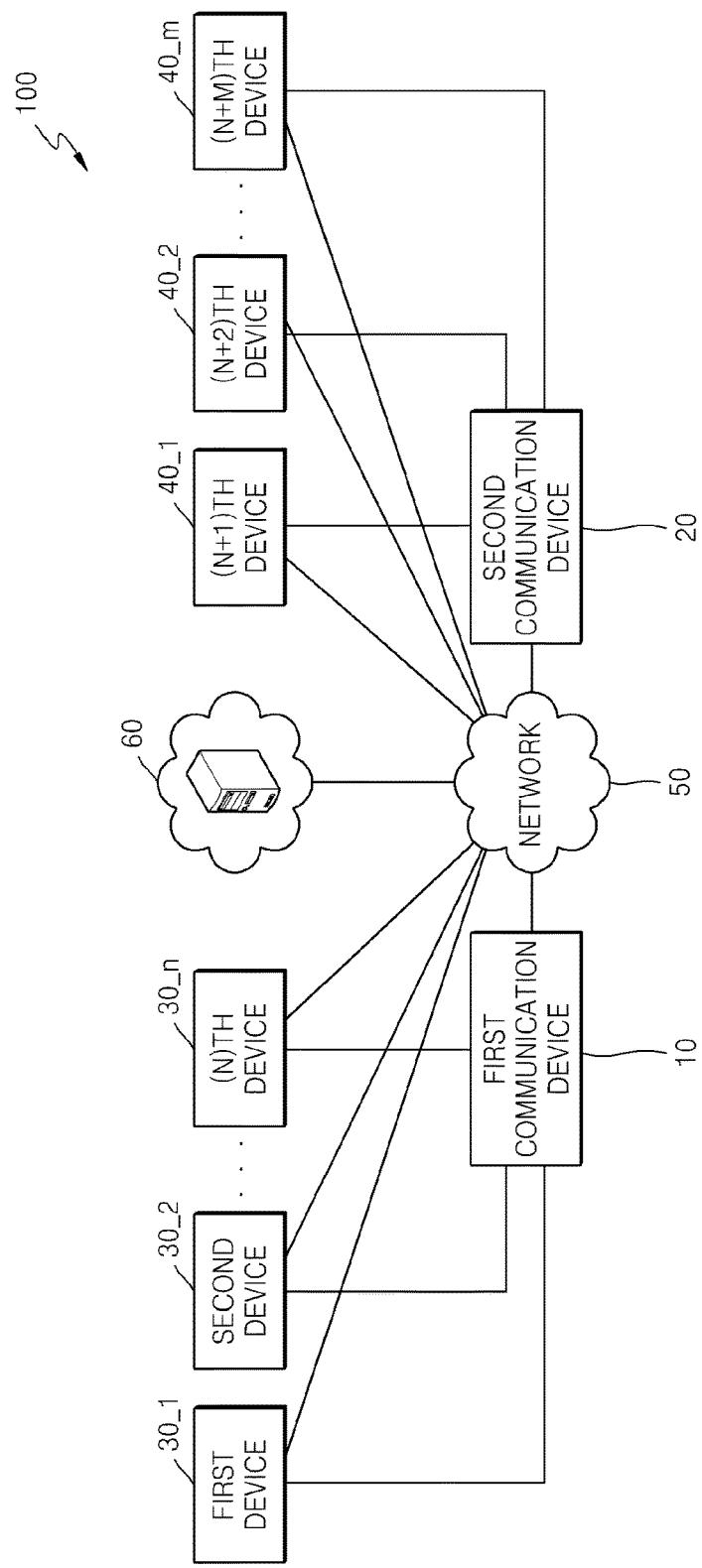
FIG. 1 is a block diagram of a system for sharing content, according to an exemplary embodiment.

As the application allows for various changes and numerous exemplary embodiments, particular exemplary embodiments will be illustrated in the drawings and described in detail in the written description. However, this is not intended to limit the present exemplary embodiments to particular modes of practice, and it is to be appreciated that all changes, equivalents, and substitutes that do not depart from the spirit and technical scope of the present exemplary embodiments are encompassed in the present exemplary embodiments. In the description of the exemplary embodiments, certain detailed explanations of related art are omitted when it is deemed that they may unnecessarily obscure the essence of the application.

The terms such as "first" and "second" are used herein merely to describe a variety of constituent elements, but the constituent elements are not limited by the terms. The terms are used only for the purpose of distinguishing one constituent element from another constituent element.

Most of the terms used herein are general terms that have been widely used in the technical art to which the exemplary embodiments pertain. However, some of the terms used herein may be created reflecting intentions of technicians in this art, precedents, or new technologies. Also, some of the terms used herein may be arbitrarily chosen by the present applicant. In this case, these terms are defined in detail below. Accordingly, the specific terms used herein should be understood based on the unique meanings thereof and the whole context of the present exemplary embodiments.

As used herein, the singular forms "a", "an" and "the" are intended to include the plural forms as well, unless the context clearly indicates otherwise. It will be further understood that the terms "includes" or "including", when used in this specification, specify the presence of stated features, integers, steps, operations, elements, components, and/or groups thereof, but do not preclude the presence or addition of one or more other features, integers, steps, operations, elements, components, and/or groups thereof.

As used herein, the term "and/or" includes any and all combinations of one or more of the associated listed items. Expressions such as "at least one of," when preceding a list of elements, modify the entire list of elements and do not modify the individual elements of the list.

Content mentioned throughout the specification is obtained by preparing an audio and/or a video and/or a character in a digital signal format, and is reproduced by a content reproducing device. Accordingly, examples of the content include video on demand-based content, internet protocol television (IPTV)-based content, cable broadcasting-based content, terrestrial broadcasting-based content, cloud server-based content, and content providing server-based content, but are not limited thereto. The content may alternatively be still image-based content, such as a photograph.

Content-related information mentioned throughout the specification includes identification information of a device reproducing or storing content, identification information of the content, reproduction synchronization information of the content, and location information of the content. For example, when a device reproducing content is a digital television (DTV) and the content being reproduced is a real-time broadcast program of channel 11, content-related information may include identification information of the DTV, identification information of the content including the channel 11 and a title of the real-time broadcast program, reproduction synchronization information of the content including current time information, and location information of the content including the channel 11, but is not limited thereto.

Reproduction synchronization information may be information for synchronizing a content reproduction time between devices for sharing content. For example, when content being currently reproduced is a nature documentary of a Google cloud server, reproduction synchronization information of the content includes reproduction location information of the content, location information of the content may include the Google cloud server, and identification information of the content may include the nature documentary. The identification information of the content may include information about a name of the content, a generated date of the content, a capacity of the content, a type of the content, and a manufacturer of the content.

Content execution information includes a set of commands which immediately reproduce or store content in a communication device or a peripheral device of the communication device. The content execution information may be generated based on the content-related information described above. For example, when the content-related information is a DTV link channel 11 as described above, content execution information may include a set of commands for turning on the DTV and setting the channel 11. When content-related information is the nature documentary of the Google cloud server as described above, content execution information may include a set of commands for connecting to the Google cloud server via a computer and downloading the nature documentary. Accordingly, the content execution information may include operation control information of the peripheral device. For example, when the peripheral device is a content reproducing apparatus, the content execution information may include operation control information of the content reproducing apparatus for reproducing content. However, the content-related information and the content execution information are not limited thereto.

User input information mentioned throughout the specification may depend upon a gesture of a user. The gesture may be variously defined according to an input apparatus.

In other words, when the input apparatus is based on a touch screen, examples of the gesture may include tapping, touching and holding, double tapping, dragging, panning, flicking, dragging and dropping, and sweeping, but are not limited thereto. The gesture based on the touch screen may be performed by a finger or a touching tool, such as a stylus pen, of the user.

When the input apparatus is based on a motion sensor, the user input information may depend upon a device movement-based gesture by the user, such as shaking or hitting a device. Examples of the motion sensor include an acceleration sensor, a geomagnetic sensor, a gyro sensor, and an orientation sensor.

When the input apparatus is based on a camera, the gesture may include a space gesture based on an image captured by the camera. The camera may be configured based on an image sensor or an optical sensor.

Alternatively, when the input apparatus is a physical button, a dial, a slider switch, a joystick, or a click wheel, the user input information may depend upon a physical control of the user of the input apparatus. When the input apparatus is based on an audio input apparatus, the user input information may depend upon voice recognition of the user based on a natural language.

Hereinafter, the application will be described in detail by explaining exemplary embodiments with reference to the attached drawings. The same reference numerals in the drawings denote like elements, and a repeated explanation thereof will not be given.

Figure 33:
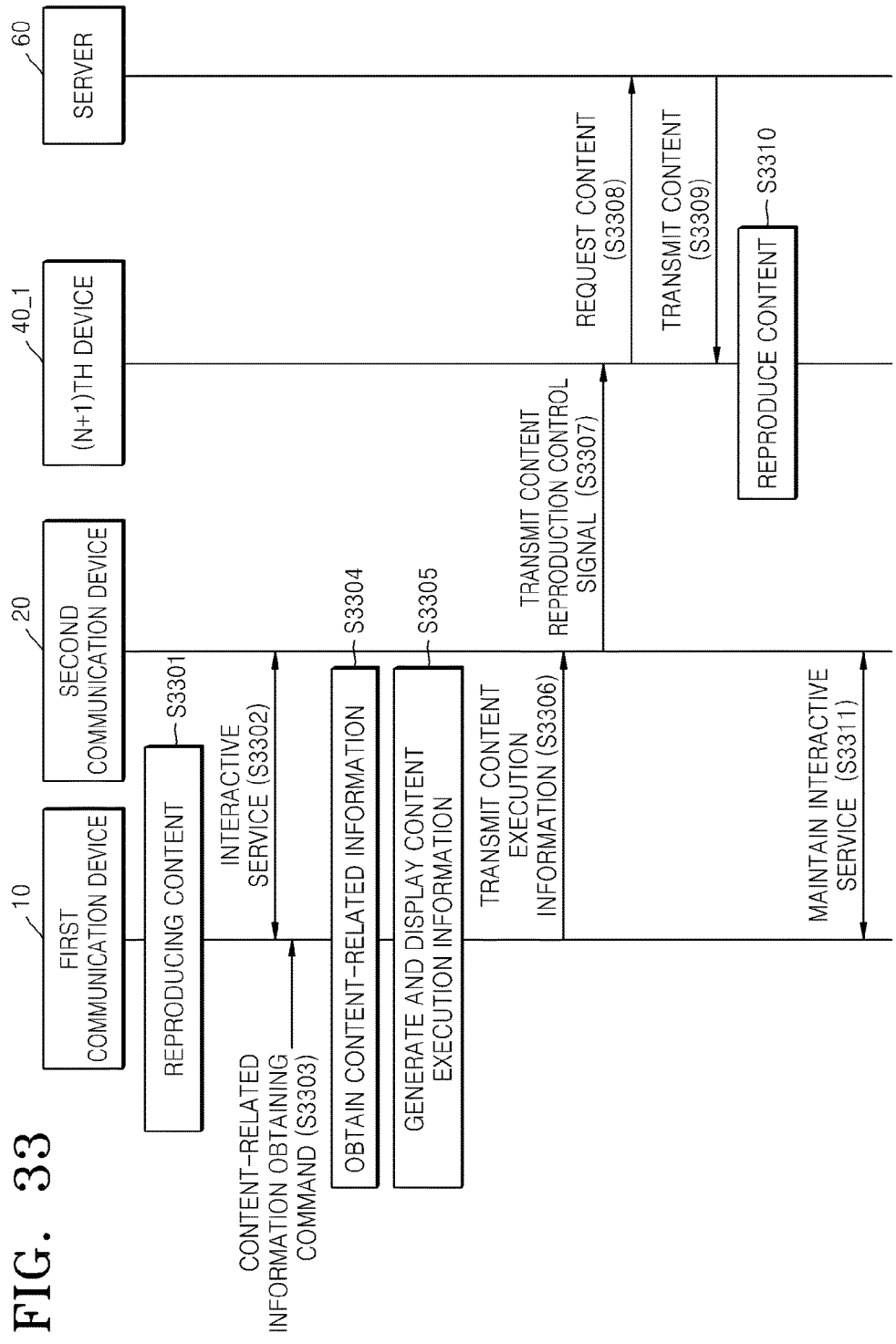
FIG. 33 is a flowchart illustrating a method of sharing content based on the system of FIG. 32.

FIG. 1 is a block diagram of a system 100 for sharing content, according to an exemplary embodiment, wherein an interactive service is provided in a one-to-one manner, and a communication device that executes an interactive service includes a plurality of peripheral devices. However, alternatively, the system 100 may be modified such that a communication device that executes an interactive service includes one peripheral device as shown in FIG. 33 described later.

An interactive service is a service for transmitting and receiving data between devices, and may be a two-way communication service or a bidirectional communication service. Examples of the interactive service include a messenger service, a voice-based communication service, and a voice and image-based communication service, but are not limited thereto. The interactive service may execute operations to generate, delete, or change a multimedia communication session between devices based on a session initiation protocol (SIP).

Examples of the messenger service include Kakao talk and ChatON, but are not limited thereto. Examples of the voice-based communication service include voice call services based on third generation (3G), fourth generation (4G), long term evolution (LTE), and voice over internet protocol (VoIP). Examples of the voice and image-based communication service include video call services based on 3G, 4G, LTE, and VoIP, such as Facetime and Skype, but are not limited thereto.

Referring to FIG. 1, the system 100 includes a first communication device 10, a second communication device 20, first through (n)th devices 30_1 through 30_$n$, (n+1)th through (n+m)th devices 40_1 through 40_$m$, a network 50, and a server 60.

The first communication device 10 and the second communication device 20 are each devices which may execute the interactive service described above. Accordingly, application programs which execute the interactive service are installed in the first and second communication devices 10 and 20. The executing of the interactive service may be the providing of the interactive service. Thus, it may be understood that the interactive service is provided while the interactive service is executed.

Examples of the first and second communication devices 10 and 20 include a smartphone, a laptop, a tablet, a personal computer (PC), a mobile device, a handheld device, a handheld PC, and a personal digital assistant (PDA), but are not limited thereto.

The first and second communication devices 10 and 20 may be the same type or different types of devices. For example, as shown in FIG. 1, the first and second communication devices 10 and 20 may both be smartphones. However, alternatively, the first communication device 10 may be a smartphone, and the second communication device 20 may be a tablet, or vice versa. The types of devices of the first and second communication devices 10 and 20 are not limited thereto.

The first through (n)th devices 30_1 through 30_$n$ and the (n+1)th through (n+m)th devices 40_1 through 40_$m$ are devices which reproduce and/or store content. Accordingly, the first through (n)th devices 30_1 through 30_$n$ and the (n+1)th through (n+m)th devices 40_1 through 40_$m$ may be a content reproducing and/or storage, a multimedia reproducing and/or storage, or a media reproducing and/or storage. Examples of the first through (n)th devices 30_1 through 30_$n$ and the (n+1)th through (n+m)th devices 40_1 through 40_$m$ include a TV having a communication function, an audio reproducing system having a communication function, a laptop, a tablet, a desktop PC, a multimedia player, and a digital consumer electronics (CE) having communication and display functions, but are not limited thereto. The first through (n)th devices 30_1 through 30_$n$ may be peripheral or external devices located in close proximity to the first communication device 10. The (n+1)th through (n+m)th devices 40_1 through 40_$m$ may be peripheral or external devices located in close proximity to the second communication device 20.

The first through (n)th devices 30_1 through 30_$n$ and the (n+1)th through (n+m)th devices 40_1 through 40_$m$ are connected to the corresponding first and second communication devices 10 and 20 wirelessly or via a wired connection. The first through (n)th devices 30_1 through 30_$n$ may be controlled by the first communication device 10 and may transmit and receive data to and from the first communication device 10. The (n+1)th through (n+m)th devices 40_1 through 40_$m$ may be controlled by the second communication device 20 and may transmit and receive data with the second communication device 20. Data transmitted and received between the first communication device 10 and the first through (n)th devices 30_1 through 30_$n$ may include information about at least one of content and content-related information, but is not limited thereto. Data transmitted and received between the second communication device 20 and the (n+1)th through (n+m)th devices 40_1 through 40_$m$ may include information about at least one of content execution information, content-related information, and content, but is not limited thereto.

The first through (n)th devices 30_1 through 30_$n$ may be controlled by the first communication device 10 to be connected to the server 60 through the network 50, and may receive broadcast content from a broadcasting station (not shown). The (n+1)th through (n+m)th devices 40_1 through 40_$m$ may be controlled by the second communication device 20 to be connected to the server 60 through the network 50, and may receive broadcast content from the broadcasting station.

The server 60 may be connected to download content. However, each of the first through (n)th devices 30_1 through 30_$n$ and the (n+1)th through (n+m)th devices 40_1 through 40_$m$ may be connected to the server 60 through the network 50 regardless of the controls of the first and second communication devices 10 and 20. In other words, the first through (n)th devices 30_1 through 30_$n$ and the (n+1)th through (n+m)th devices 40_1 through 40_$m$ may be connected to the server 60 through the network 50 via a control using a remote controller (not shown) or a direct control, and transmit and receive data to and from the server 60.

Alternatively, the first through (n)th devices 30_1 through 30_$n$ may be control target devices of the first communication device 10, and thus may be home devices or devices capable of near field communication with the first communication device 10. Similarly, the (n+1)th through (n+m)th devices 40_1 through 40_$m$ may be control target devices of the second communication device 20, and thus may be home devices or devices capable of near field communication with the second communication device 20. Examples of the near field communication include wireless communication, such as Bluetooth, WiFi, ZigBee, near field communication (NFC), and radio frequency identification (RFID), but are not limited thereto. The first through (n)th devices 30_1 through 30_$n$ and the (n+1)th through (n+m)th devices 40_1 through 40_$m$ may be respectively connected to the first and second communication devices 10 and 20 via a wired home network or a universal serial bus (USB).

While the first and second communication devices 10 and 20 execute the interactive service through the network 50, a user of the first communication device 10 and a user of the second communication device 20 may share content in real-time by using at least one of the first through (n)th devices 30_1 through 30_$n$ and at least one of the (n+1)th through (n+m)th devices 40_1 through 40_$m$. In other words, as shown in FIG. 2, while the first and second communication devices 10 and 20 are executing a messenger service, the users of the first and second communication devices 10 and 20 may share content in real-time by using the first device 30_1 and the (n+m)th device 40_$m$.

Figure 2:
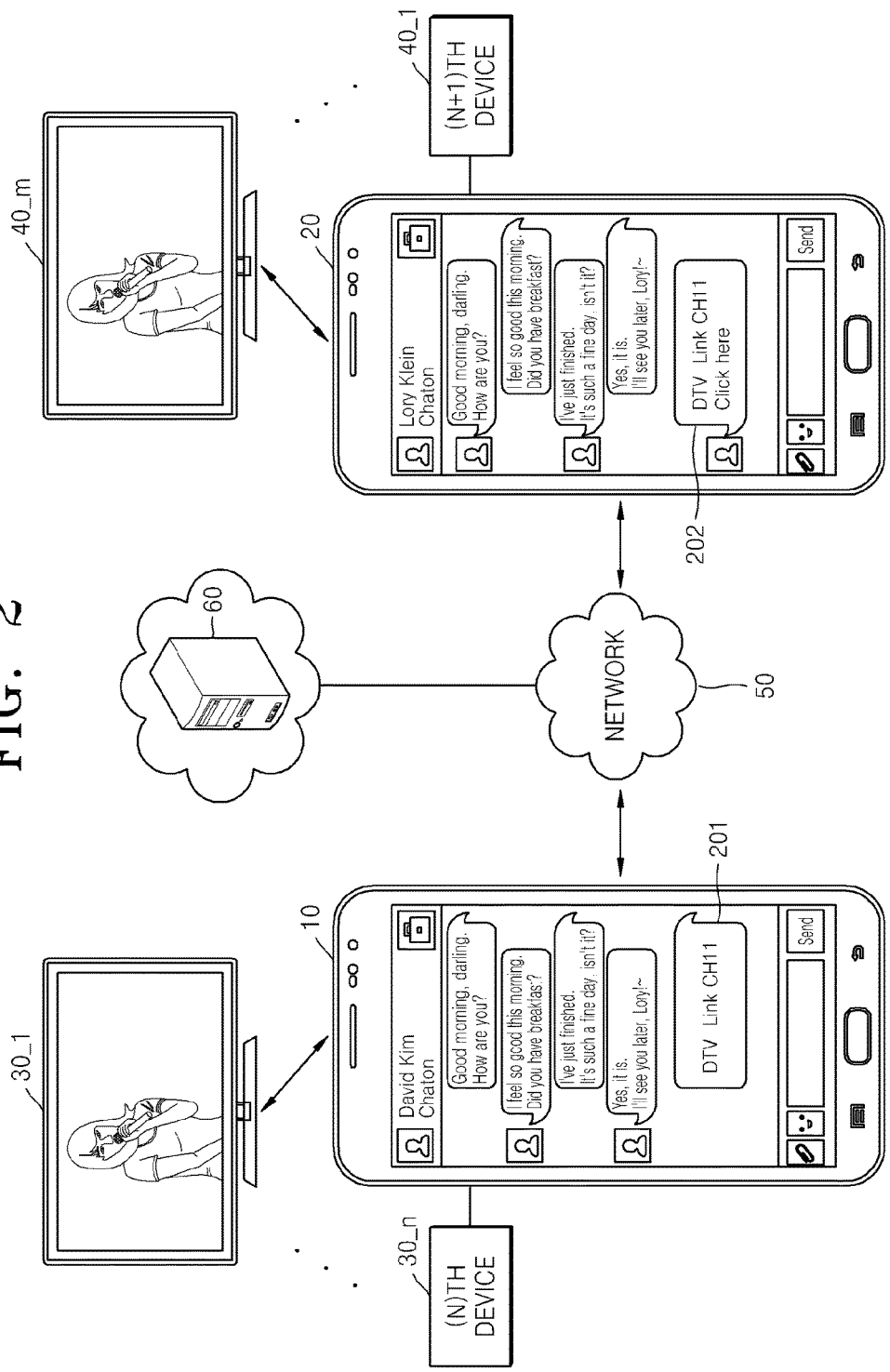
FIG. 2 is a diagram illustrating the sharing of content based on the system of FIG. 1.

FIG. 2 is a diagram for describing the sharing of content based on the system 100 of FIG. 1. Referring to FIG. 2, while the first and second communication devices 10 and 20 execute the messenger service, for example, ChatON, the user of the first communication device 10 may want to share the content being reproduced in the first device 30_1 in real-time with the user of the second communication device 20.

In this case, the first communication device 10 receives content or content-related information of the content being reproduced from the first device 30_1. The first communication device 10 transmits the content or content-related information to the second communication device 20 while displaying the content-related information by using the messenger service being executed. In FIG. 2, the content-related information is displayed in a text balloon 201 so that the user of the first communication device 10 may recognize the content-related information received from the first device 30_1. The second communication device 20 reproduces the same content as the first device 30_1 by transmitting information indicating content share acceptance to the first communication device 10 and controlling an operation of the (n+m)th device 40_m based on the content-related information (DTV Link CH 11) and information for determining the content share acceptance (Click here), as shown in a text balloon 202. Accordingly, the user of the first communication device 10 determines that the user of the second communication device 20 accepted the content sharing, and the users of the first and second communication devices 10 and 20 may view the content reproduced through the first device 30_1 and the (n+m)th device 40_m, which are peripheral devices, while transmitting and receiving messages about the content through the messenger service.

Examples of the network 50 include a wireless network and a wired network. The network 50 will be described in detail later with reference to FIG. 16A, with regard to a first communication processor 1608 and a second communication processor 1609 of the first communication device 10.

Examples of the server 60 include servers which provide various contents, a cloud server, a content providing server, and an application providing server.

FIG. 3 is a flowchart illustrating a method of sharing content based on the system 100 of FIG. 1, according to an exemplary embodiment. In FIG. 3, the first communication device 10 transmits a content share request to the second communication device 20, the first communication device 10 broadcasts the content share request to a peripheral device when the second communication device 20 accepts the content sharing request, and the second communication device 20 broadcasts a content reproduce or store request to the peripheral device.

Referring to FIG. 3, when a content share request is received from the user of the first communication device 10 in operation S303 while an interactive service is being executed between the first and second communication devices 10 and 20 in operation S301, and the first device 30_1 is reproducing or storing content in operation S302, the first communication device 10 transmits the content share request to the second communication device 20 in operation S304.

Then, the second communication device 20 outputs information indicating that the content share request is received, in operation S305, so that the user of the second communication device 20 recognizes that the content share request is received. When a content share acceptance signal is received in operation S306 from the user of the second communication device 20 based on the information output through the second communication device 20, the second communication device 20 transmits the content share acceptance signal to the first communication device 10 in operation S307.

Upon receiving the content share acceptance signal, the content share request is broadcasted to the first through (n)th devices 30_1 through 30_n in proximity to the first communication device 10, in operation S309. Here, the interactive service between the first and second communication devices 10 and 20 is maintained in operation S308. In order to broadcast the content share request to the first through (n)th devices 30_1 through 30_n while maintaining the interactive service, the first communication device 10 may execute the messenger service with the second communication device 20 as shown in FIG. 2 based on WiFi or a mobile communication network, while broadcasting the content share request to the first through (n)th devices 30_1 through 30_n based on Bluetooth or WiFi. However, communication networks used to maintain the interactive service while broadcasting the content share request are not limited thereto.

Accordingly, the first communication device 10 receives information about at least one of the content and the content-related information from the first device 30_1 reproducing or storing the content, in operation S310. When the content is received, the content to be shared may be stored only in the first device 30_1, but is not limited thereto. When the content-related information is received, the content to be shared may be received from outside the first device 30_1, or stored in the first device 30_1 but may also be found outside the first device 30_1, but is not limited thereto. Here, outside the first device 30_1 may denote an external device including the server 60.

The content-related information may include a content list as well as the content-related information described above. When the content-related information includes the content list, the content may be stored in the external device, such as the server 60, and location information of the content may include location information of the external device and location information about where the content is stored in the external device.

The first device 30_1 may determine whether to transmit the content, the content-related information, or both the content and the content-related information, based on whether the content to be shared is stored only in the first device 30_1. The first communication device 10 transmits the information about the at least one of the content and the content-related information while displaying the information in operations S311 and S312. When the information transmitted from the first communication device 10 to the second communication device 20 is the content in operation S311, the first communication device 10 may request a content transmission session based on a real-time transport protocol (RTP) to the second communication device 20, and the first communication device 10 transmits the content to the second communication device 20 upon acceptance by the second communication device 20.

The second communication device 20 displays the information received from the first communication device 10 in operation S303, and the second communication 20 maintains the interactive service with the first communication device 10 in operation S314 while broadcasting a content reproduce or store request to the (n+1)th through (n+m)th devices 40_1 through 40_m in operation S315. Accordingly, like the first communication device 10, the second communication device 20 may execute the messenger service shown in FIG. 2 with the first communication device 10 based on the mobile communication network or WiFi while broadcasting the content reproduce or store request to the (n+1)th through (n+m)th devices 40_1 through 40_m based on Bluetooth or WiFi. However, communication networks used to maintain the interactive service while broadcasting the content reproduce or store request are not limited thereto.

Although not shown in FIG. 3, when the information displayed in operation S312 is information shown in the text balloon 202 of FIG. 2, the second communication device 20 may transmit information indicating that the content-related information received from the first communication device 10 is accepted to be shared while broadcasting the content reproduce or store request to the (n+1)th through (n+m)th devices 40_1 through 40_*m*.

If the information received from the first communication device 10 is the content in operation S312, the second communication device 20 may broadcast the received content and the content reproduce or store request to the (n+1)th through (n+m)th devices 40_1 through 40_*m* when the content reproduce or store request is broadcasted to the (n+1)th through (n+m)th devices 40_1 through 40_*m* in operation S315, If the information received from the first communication device 10 is the content-related information in operation S312, the second communication device 20 may broadcast the content-related information and the content reproduce or store request to the (n+1)th through (n+m)th devices 40_1 through 40_*m*. If the information received from the first communication device 10 is the content and the content-related information in operation S312, the second communication device 20 may broadcast the content and the content-related information with the content reproduce or store request to the (n+1)th through (n+m)th devices 40_1 through 40_*m*.

The (n+m)th device 40_*m* from among the (n+1)th through (n+m)th devices 40_1 through 40_*m* reproduces or stores the content in operations S316 through S318 in response to the broadcasted content reproduce or store request. In FIG. 3, when the (n+m)th device 40_*m* is received the content reproduce or store request in operation S315, the (n+m)th device 40_*m* requests the server 60 for the content in operation S316, and upon receiving the content from the server 60 in operation S317, the (n+m)th device 40_*m* reproduces the content in operation S318. It may be understood that the content is not transmitted from the second communication device 20 when the content reproduce or store request is broadcasted to the (n+1)th through (n+m)th devices 40_1 through 40_*m* in operation S315.

Accordingly, when the second communication device 20 broadcasts the content or the content and the content-related information to the (n+1)th through (n+m)th devices 40_1 through 40_*m* in operation S315, operations S316 and S317 are not performed, and the (n+m)th device 40_*m* may immediately reproduce the content received from the second communication device 20 in operation S318.

The (n+m)th device 40_*m* from among the (n+1)th through (n+m)th devices 40_1 through 40_*m* reacts to the broadcasted content reproduce or store request because the (n+m)th device 40_*m* is the same type as the first device 30_1, a device capable of reproducing or storing the content, or a device capable of recognizing the content or the content-related information and the content reproduce or store request. However, a reason for the (n+m)th device 40_*m* reacting to the content reproduce or store request is not limited thereto.

It may be determined whether the (n+m)th device 40_*m* is the same type of device as the first device 30_1, the device which reproduces or stores the content, or the device which recognize the content or the content-related information and the content reproduce or store request, based on identification information of a device included in the content-related information transmitted with the content reproduce or store request.

According to the method of FIG. 3, the users of the first and second communication devices 10 and 20 may maintain the interactive service while sharing the content shown in FIG. 2 through the first device 30_1 and the (n+m)th device 40_*m*, which are respective peripheral devices, and share experiences on the content by using the interactive service.

FIGS. 4A through 4D illustrate screens of the first communication device 10 and the second communication device 20 based on the system 100 of FIG. 1, according to an exemplary embodiment, wherein the first and second communication devices 10 and 20 execute a messenger service to transmit a content share request, accept the content share request, and transmit content-related information.

Figure 4A:
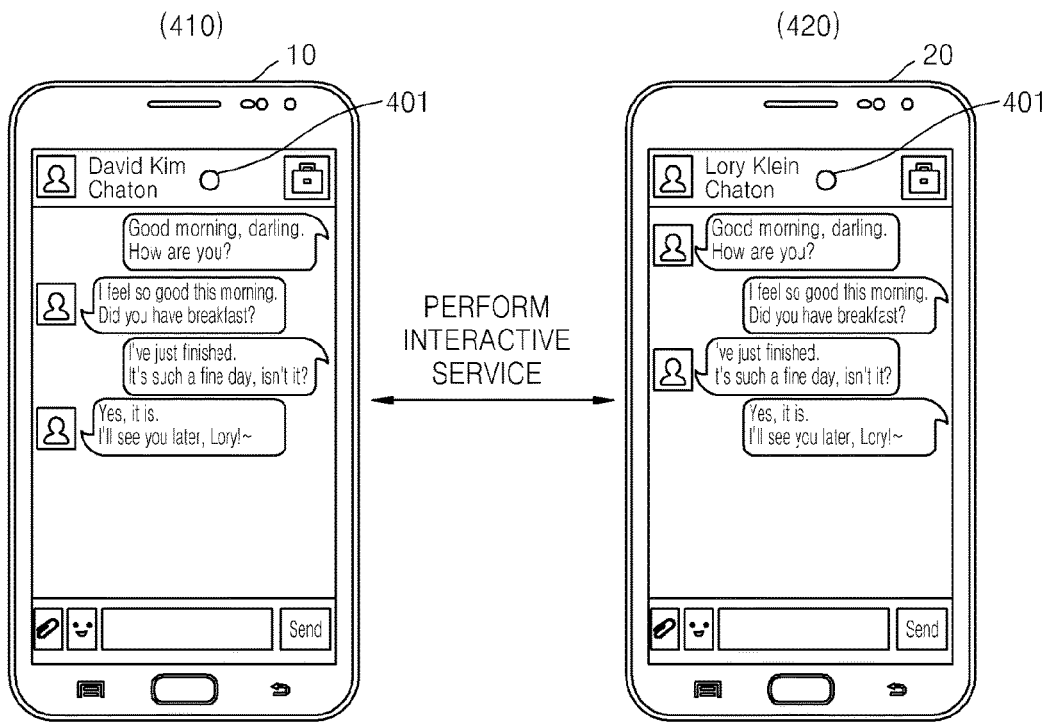
FIGS. 4A through 4D illustrate screens of a first communication device and a second communication device based on the system of FIG. 1, according to an exemplary embodiment n.

FIG. 4A illustrates screens of the first and second communication devices 10 and 20 that execute an interactive service based on the messenger service. A screen 410 is the screen of the first communication device 10 that executes the messenger service, and a screen 420 is the screen of the second communication device 20 that executes the messenger service. Here, the messenger service may be any messenger service.

Figure 4B:
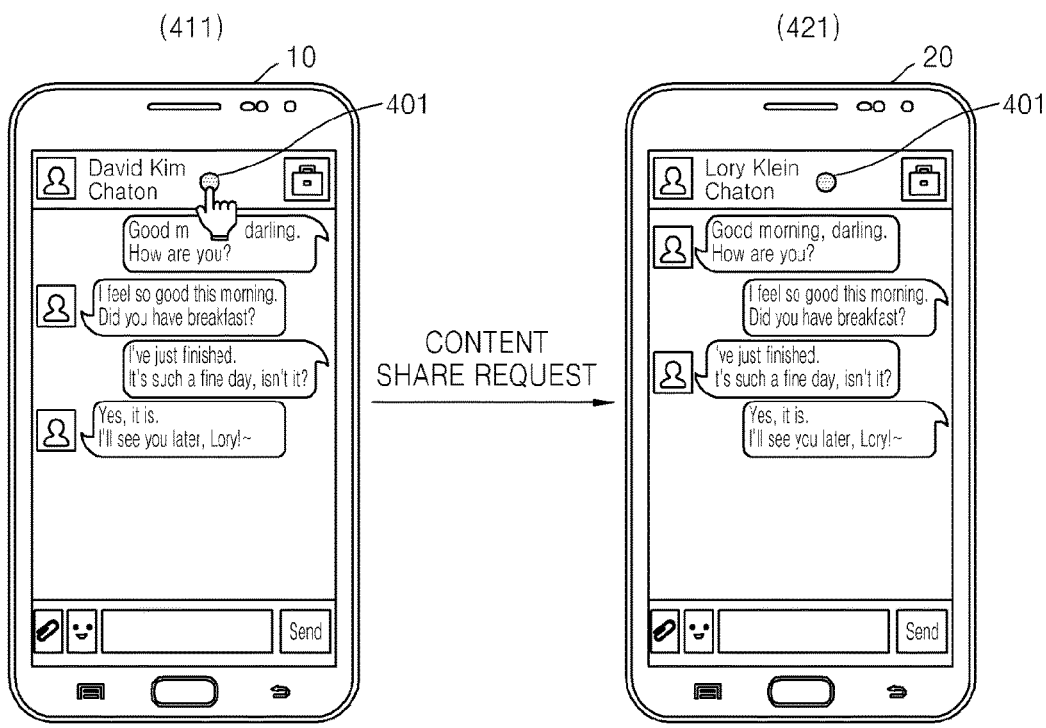

FIG. 4B illustrates screens of the first communication device 10 requesting the second communication device 20 to share content while the first and second communication devices 10 and 20 are executing the messenger service as shown in FIG. 4A.

Figure 4C:
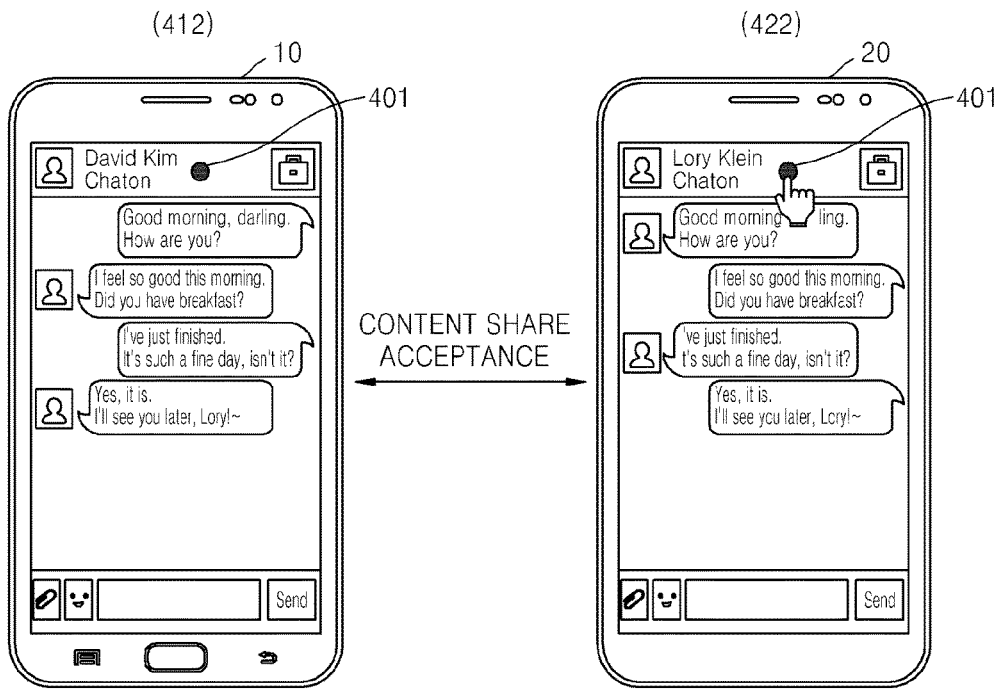

In other words, when a content share icon 401 of the first communication device 10 is touched by the user as shown on a screen 411 of FIG. 4B, the first communication device 10 changes a state of the content share icon 401 displayed on the first communication device 10 as in the screen 411 while transmitting the content share request to the second communication device 20. Accordingly, as shown in a screen 421, the state of the content share icon 401 of the second communication device 20 is changed. As the state of the content share icon 401 is changed, the user of the second communication device 20 may recognize that the content share request is received from the first communication device 10. In FIGS. 4B and 4C, the change of the state of the content share icon 401 is recognized by colors. However, the change of the state is not limited thereto, and a shape of the content share icon 401 may be changed.

FIG. 4C illustrates screens of the second communication device 20 accepting the content share request of the first communication device 10, as the first communication device 10 transmits the content share request to the second communication device 20 as shown in FIG. 4B.

In other words, as shown in a screen 422 of FIG. 4C, when the user of the second communication device 20 touches the content share icon 401, the second communication device 20 changes the state of the content share icon 401 while transmitting a content share request acceptance signal to the first communication device 10. Accordingly, as shown in a screen 412, the color of the content share icon 401 displayed on the first communication device 10 is changed, and thus the user of the first communication device 10 recognizes that the second communication device 20 accepted the content share request.

Figure 4D:
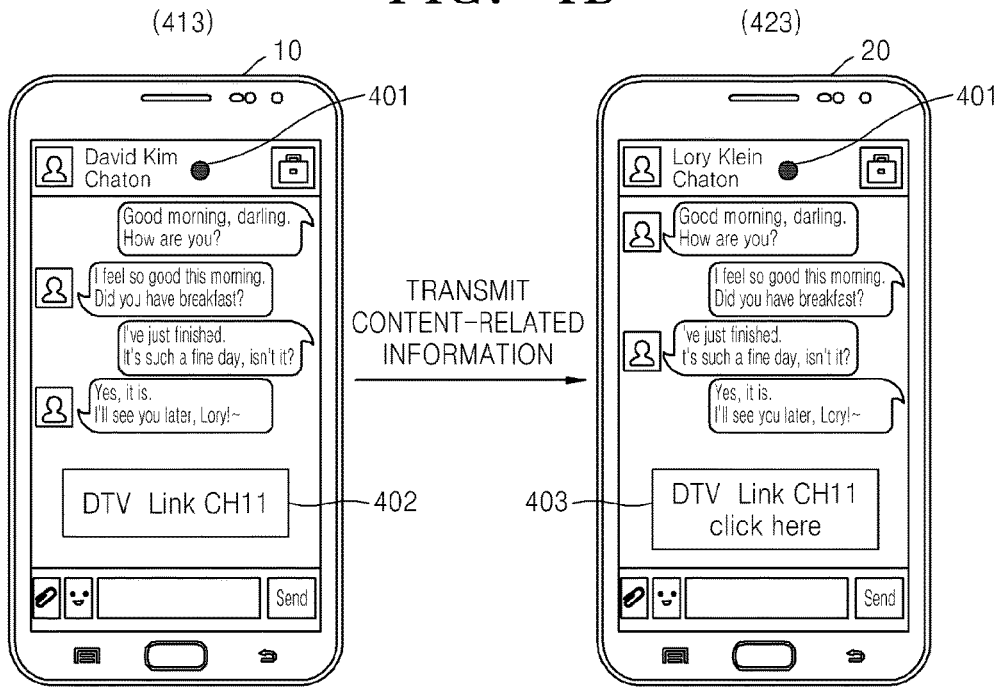

FIG. 4D illustrate screens of broadcasting the content share request to the first through (n)th devices 30_1 through 30_*n*, displaying the content-related information received from the first through (n)th devices 30_1 through 30_*n* on the first communication device 10, and transmitting and displaying the content-related information on the second communication device 20, as the first communication device 10 receives the content share request acceptance signal from the second communication device 20 as shown in FIG. 4C.

In other words, as shown in a screen 413 of FIG. 4D, the first communication device 10 receives and displays "DTV Link CH 11" that is the content-related information from the first through (n)th devices 30_1 through 30_*n*, and transmits the content-related information to the second communication device 20. A region 402 where the content-related information is displayed on the screen 413 may be a pop-up window or a notification window independent from the messenger service, or may be displayed in a text balloon based on the messenger service.

The second communication device 20 displays the content-related information in a region 403 as shown in a screen 423. "Click here" displayed with the content-related information is information used for the purpose described with reference to FIG. 2, and may be generated and displayed according to conditions set in a program operated by the second communication device 20, as the content-related information is received. "Click here" may alternatively be displayed as "Accept" and "Deny". Like the region 402, the region 403 may also be displayed in a pop-up window or a notification window independent from the messenger service, or may be displayed in a text balloon based on the messenger service.

When the user of the second communication device 20 touches "Click here" displayed in the region 403, the second communication device 20 transmits information to the first communication device 10 indicating that the content share request is accepted based on the content-related information received from the first communication device 10, while broadcasting the content reproduce or store request to the (n+1)th through (n+m)th devices 40_1 through 40_m as in operation S315 of FIG. 3.

"Click here" displayed in the region 403 may be provided as a functional menu item independent from the content-related information. Also, in the above exemplary embodiment, an operation control based on "Click here" is based on a touch, but alternatively, the operation control may be performed according to voice recognition or a space gesture of the user.

Also, operations based on the content share icon 401 shown in FIGS. 4A through 4D may be provided in a message form indicating a current operation state between the first and second communication devices 10 and 20. In other words, as a menu item (not shown) for sharing content displayed on a location corresponding to the content share icon 401 or a predetermined location is controlled by the user, a message, such as content share request, accept content share request, content share request to a peripheral device, or transmit content-related information to another device, may be displayed on the first communication device 10. The message displayed on the first communication device 10 may be displayed on a notification window, but is not limited thereto. Also, the menu item or the content share icon 401 for controlling the content sharing may be provided in a button form including the message. The content share icon 401 may be controlled based on a touch, but alternatively, may be controlled based on a voice of the user.

The content-related information displayed on the region 402 of the screen 413 of FIG. 4D may be transmitted from the first communication device 10 to the second communication device 20 based on the messenger service. In other words, the messenger service executed by the second communication device 20 may be parsed to display the content-related information and information for determining the acceptance may be displayed on the region 403 as shown in the screen 423, or in a text balloon along with other messages. Accordingly, the first communication device 10 may transmit the content-related information to the second communication device 20 according to a data transmission format based on the messenger service. The content-related information may be included in an additional information field included in the data transmission format.

Also, since the content-related information displayed on the region 402 of the screen 413 of FIG. 4D is received from the first device 30_1 while the messenger service is being executed, the content-related information may be parsed in the messenger service executed by the first communication device 10 and displayed as a notification message. However, a method of displaying the content-related information received from the first device 30_1 on the first communication device 10 is not limited thereto.

In other words, the first communication device 10 may parse and display content-related information received via a communication service different from the messenger service. If the content-related information received from the different communication service is parsed, the content-related information transmitted from the first communication device 10 to the second communication device 20 may be transmitted via the different communication service. When the content-related information is transmitted through the different communication service other than the messenger service executed between the first and second communication devices 10 and 20, the content-related information may not be based on the interactive service. For example, the content-related information may be transmitted from the first communication device 10 to the second communication device 20 based on a one-way communication. The transmitting of the content-related information through the different communication service will be described in detail later with reference to FIG. 6.

FIGS. 5A through 5D illustrate screens of the first communication device 10 and the second communication device 20 based on the system 100 of FIG. 1, according to another exemplary embodiment. Here, the screens of FIGS. 5A through 5D correspond to those of FIGS. 4A through 4D during an interactive service based on a video call service between the first and second communication devices 10 and 20.

Figure 5A:
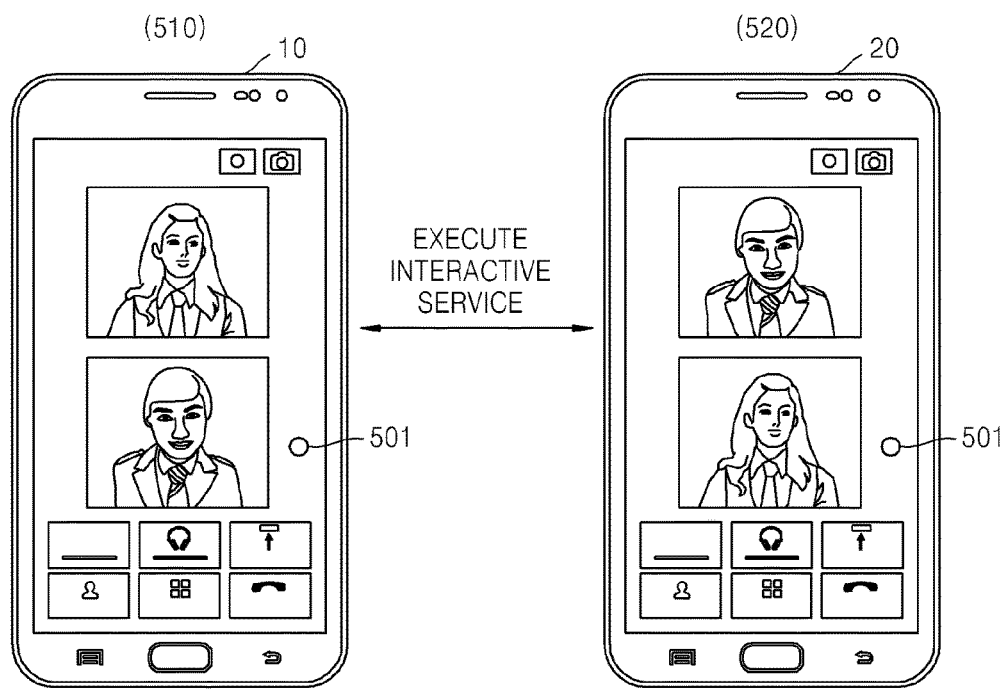
FIGS. 5A through 5D illustrate screens of the first communication device and the second communication device based on the system of FIG. 1, according to another exemplary embodiment.

In other words, FIG. 5A illustrates screens of the first and second communication devices 10 and 20 that are executing the interactive service based on the video call service. A screen 510 is the screen of the first communication device 10 executing the video call service, and a screen 520 is the screen of the second communication device 20 executing the video call service.

Figure 5B:
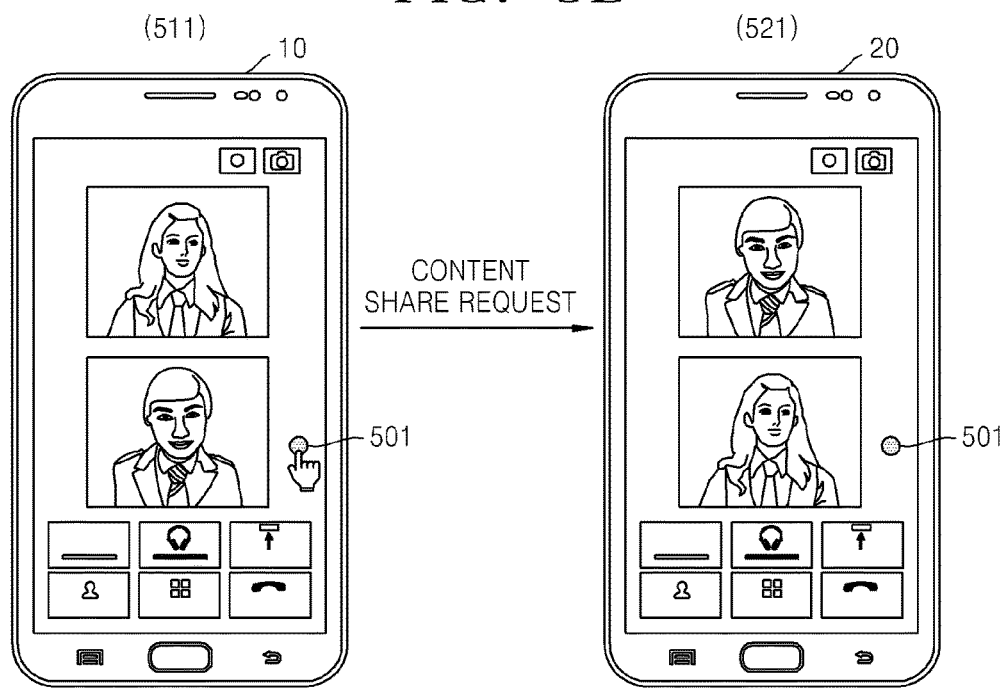

FIG. 5B illustrates screens of the first communication device 10 requesting the second communication device 20 to share content while the first and second communication devices 10 and 20 are executing the video call service as shown in FIG. 5A.

Figure 5C:
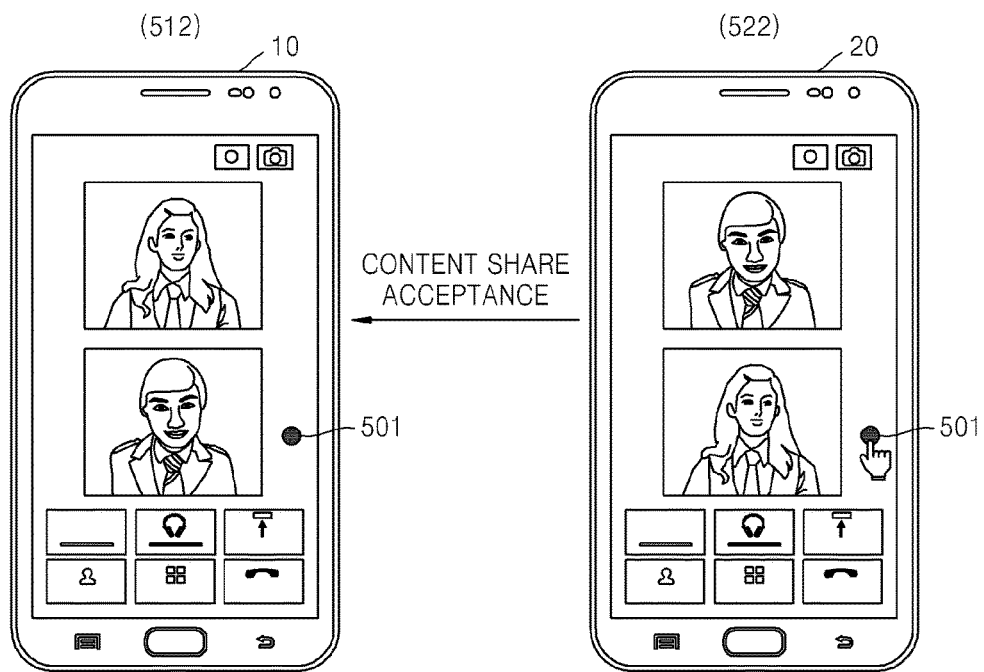

In other words, when a content share icon 501 of the first communication device 10 is touched by the user as shown on a screen 511 of FIG. 5B, the first communication device 10 changes a state of the content share icon 501 displayed on the first communication device 10 as in the screen 511 while transmitting the content share request to the second communication device 20. Accordingly, as shown in a screen 521, the state of the content share icon 501 of the second communication device 20 is changed. As the state of the content share icon 501 is changed, the user of the second communication device 20 may recognize that the content share request is received from the first communication device 10. In FIGS. 5B and 5C, the change of the state of the content share icon 501 is recognized by colors. However, the change of the state is not limited thereto, and a shape of the content share icon 501 may be changed.

FIG. 5C illustrates screens of the second communication device 20 accepting the content share request of the first communication device 10, as the first communication device 10 transmits the content share request to the second communication device 20 as shown in FIG. 5B.

In other words, as shown in a screen 522 of FIG. 5C, when the user of the second communication device 20 touches the content share icon 501, the second communication device 20 changes the state of the content share icon 501 while transmitting a content share request acceptance signal to the first communication device 10. Accordingly, as shown in a screen 512, the color of the content share icon 501 displayed on the first communication device 10 is changed, and thus the user of the first communication device 10 recognizes that the second communication device 20 accepted the content share request.

Figure 5D:
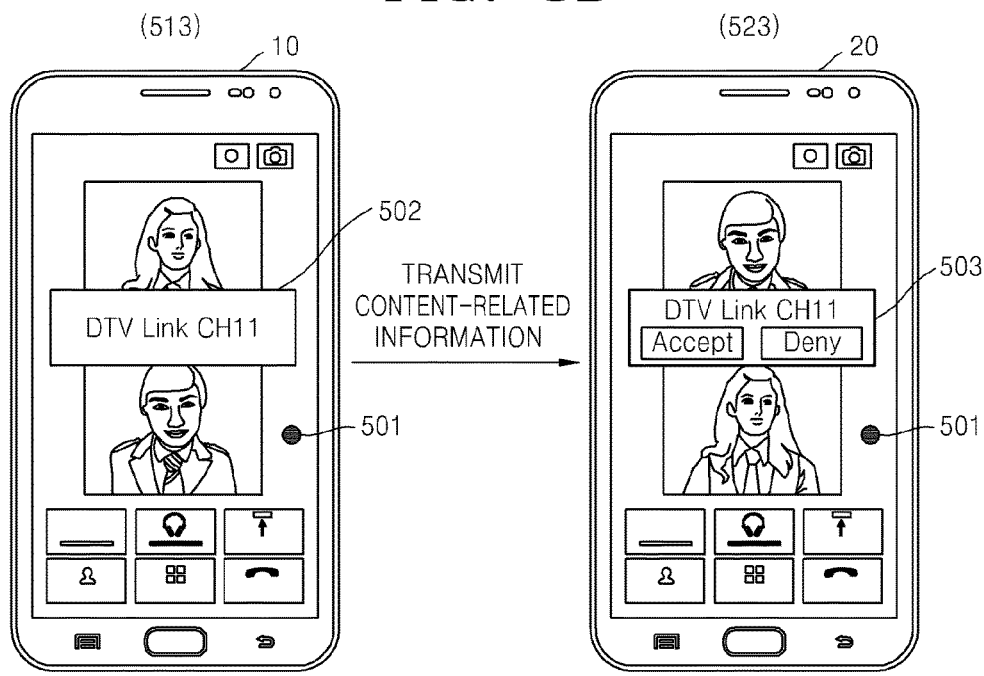

FIG. 5D illustrates screens broadcasting the content share request to the first through (n)th devices 30_1 through 30_$n$, receiving and displaying the content-related information received from the first through (n)th devices 30_1 through 30_$n$ by the first communication device 10, and transmitting the content-related information from the first communication device 10 to the second communication device 20, as the first communication device 10 receives the content share request acceptance signal from the second communication device 20 as shown in FIG. 5C.

In other words, as shown in a screen 513 of FIG. 5D, the first communication device 10 receives and displays "DTV Link CH 11" that is the content-related information from the first through (n)th devices 30_1 through 30_$n$, and transmits the content-related information to the second communication device 20. As shown in a screen 523, the second communication device 20 displays in a region 503 the received content-related information and information for selecting "accept" or "deny" used in a similar manner as "Click here" described above. The information for selecting "accept" or "deny" is generated by the second communication device 20 as the content-related information is received from the first communication device 10. In FIG. 5D, a program operated in the second communication device 20 is configured to generate the information for selecting "accept" or "deny" instead of "Click here".

The second communication device 20 may be operated upon by determining whether to accept the content-related information according to a selection of the user on the information for selecting "accept" or "deny" shown in the region 503 of the screen 523. In other words, when the user selects "accept", the second communication device 20 may transmit information that the content-related information received from the first communication device 10 is accepted while broadcasting the content reproduce or store request to the (n+1)th through (n+m)th devices 40_1 through 40_$m$. On the other hand, when the user selects "deny", the second communication device 20 may transmit a signal denying to share the content based on the content-related information while not broadcasting the content reproduce or store request to the (n+1)th through (n+m)th devices 40_1 through 40_$m$, even if the content share request is accepted in operation S305 of FIG. 3.

Upon receiving the information that the content-related information is accepted from the second communication device 20, the first communication device 10 displays a notification message indicating that the second communication device 20 accepted the content-related information, and upon receiving the information that the content-related information is denied from the second communication device 20, the first communication device 10 may display a notification message indicating that the second communication device 20 denied the content-related information. Accordingly, when the notification message indicating that the content-related information is denied is received, the user of the first communication device 10 recognizes that an attempt to share an experience based on sharing the content has failed.

A region 502 where the content-related information is displayed in the screen 513 of the first communication device 10 and the region 503 where the content-related information is displayed in the screen 523 of the second communication device 20 in FIG. 5D may be displayed in a pop-up window or a notification window over an image screen being displayed based on the video call service as shown in FIG. 5D, but alternatively be displayed in an independent region that does not overlap the image screen.

Since operations based on the content share icon 501 of FIGS. 5A through 5D are same as those based on the content share icons 401 of FIGS. 4A through 4D, details thereof are not repeated here.

The content-related information displayed in the region 502 of the screen 513 of the first communication device 10 of FIG. 5D may be transmitted to the second communication device 20 from the first communication device 10 based on the video call service. In other words, if the video call service between the first and second communication devices 10 and 20 is based on VoIP, the content-related information is transmitted after being added to a packet of the VoIP.

Figure 5E:
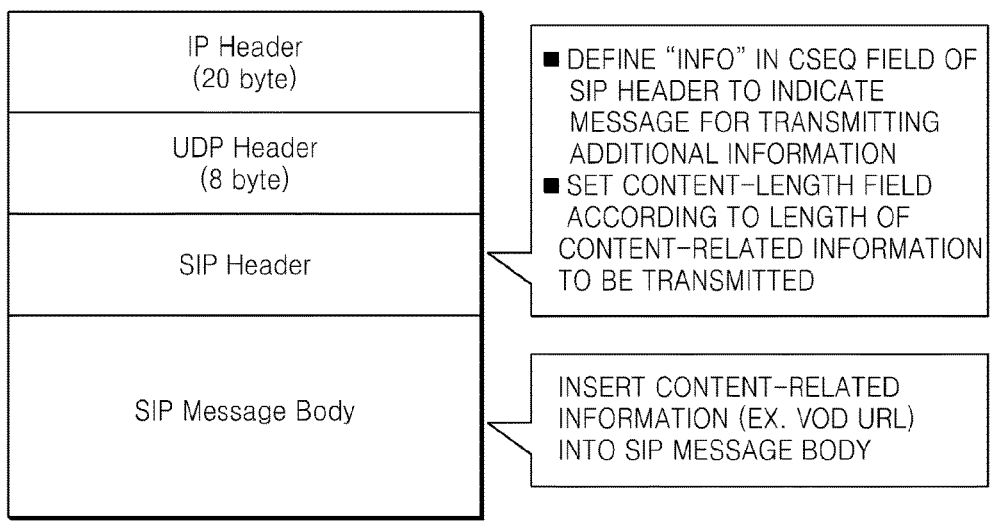
FIG. 5E is a schematic diagram of a session initiation protocol (SIP) packet for transmitting content-related information.

In other words, the content-related information may be transmitted from the first communication device 10 to the second communication device 20 by using a session initiation protocol (SIP) packet of the VoIP. FIG. 5E is a schematic diagram of the SIP packet for transmitting the content-related information. Referring to FIG. 5E, additional information including the content-related information (for example, a uniform resource locator (URL) of a VOD) is added to an SIP message body. "INFO" is defined in a Cseq field of an SIP header to indicate that information included in the SIP message body is the content-related information to be transmitted to the second communication device 20. A content length field included in the SIP header is set according to a length of the content-related information. "INFO" is one of the methods provided by an SIP, and is used when required information is to be exchanged while maintaining an existing session after the existing session is set. In FIG. 5E, the SIP packet including the SIP header and the SIP message body is encapsulated to a user datagram protocol (UDP) that is a network transmission protocol, and encapsulated into an IP packet.

When the SIP packet encapsulated as shown in FIG. 5E is received from the first communication device 10, the second communication device 20 parses the content-related information added to the SIP message body, and generates and displays the region 503 including the content-related information. In other words, when the SIP packet encapsulated as FIG. 5E is received, the second communication device 20 decapsulates the SIP packet to detect the content-related information in the SIP message body, and generates the region 503 to display the content-related information. However, the packet of the VoIP for transmitting the content-related information is not limited to the SIP packet.

In FIG. 5D, the content-related information may be transmitted via a communication service different from the video call service as shown in FIG. 4D, and if the content-related information is transmitted via the different communication service, the content-related information may be transmitted based on a one-way communication instead of the interactive service.

Figure 6:
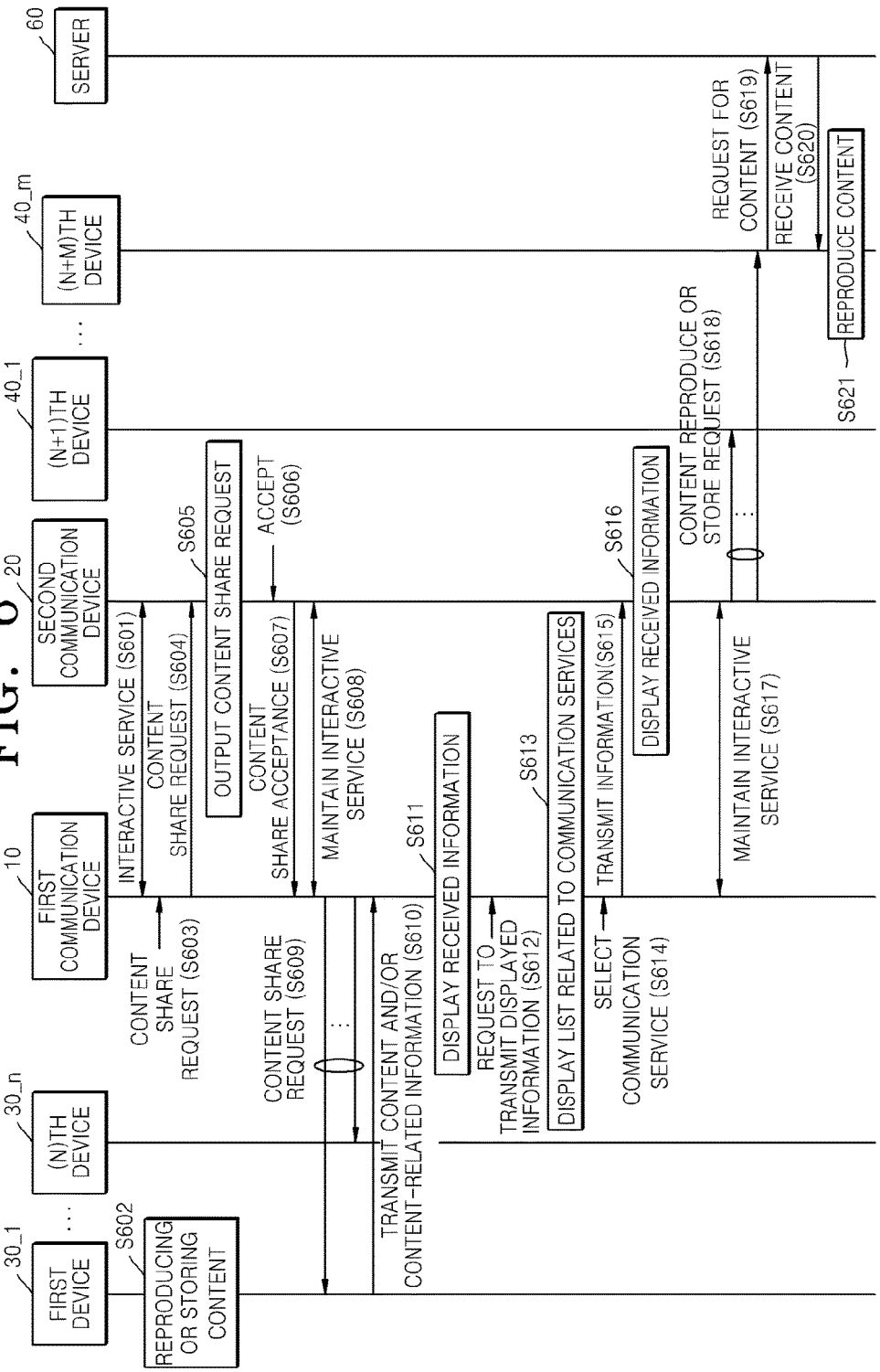
FIG. 6 is a flowchart illustrating a method of sharing content based on the system of FIG. 1, according to another exemplary embodiment.

Alternatively, when the interactive service between the first and second communication devices 10 and 20 is a voice call service based on VoIP, the content-related information may be transmitted from the first communication device 10 to the second communication device 20 by being added to a packet of the VoIP, and thus may be displayed on a screen as shown in FIG. 5D or displayed and output in a voice signal to be recognized by the user. FIG. 6 is a flowchart illustrating a method of sharing content based on the system 100 of FIG. 1, according to another exemplary embodiment. In the method of FIG. 6, a function of transmitting the content-related information by using a communication service different from the interactive service between the first and second communication devices 10 and 20 is added to the method of FIG. 3. The different communication service may be an interactive service or a one-way communication service as described above with reference to FIGS. 4D and 5D.

Accordingly, operations S601 through S611 of FIG. 6 are respectively the same as operations S301 through S311 of FIG. 3 and operations S615 through S621 are respectively the same as operations S312 through S318, and thus details thereof are not repeated herein.

When the information about the at least one of the content and the content-related information is received from the first device 30_1 that is a peripheral device, the first communication device 10 displays the received information in operation S611, and when the displayed information is requested to be transmitted to the second communication device 20 in operation S612 according to user input information, the first communication device 10 displays a list of available communication services in operation S613.

Figure 7A:
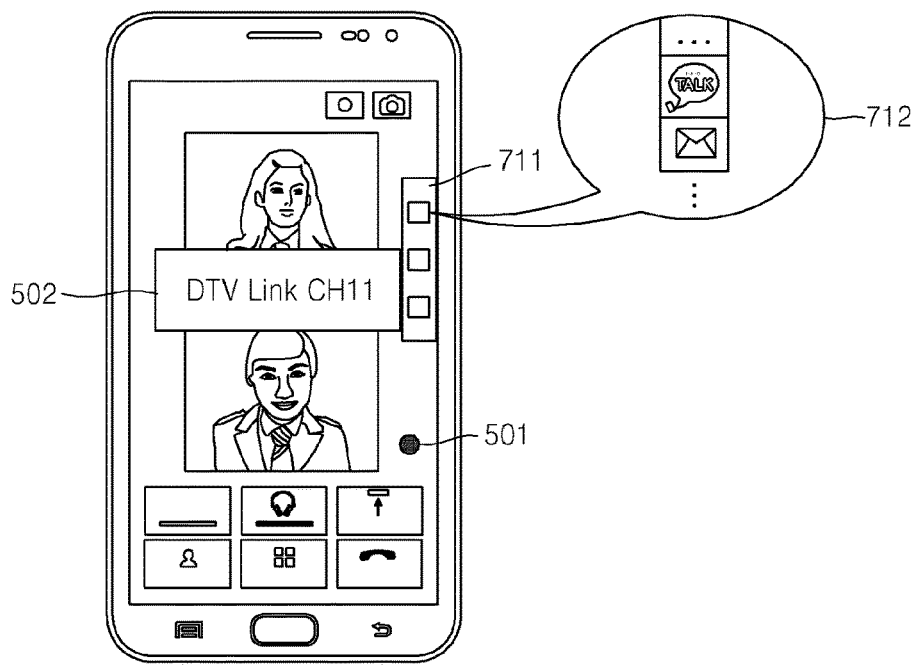
FIGS. 7A through 7C illustrate screens for selecting another communication service while an interactive service is being provided, according to exemplary embodiments.
Figure 7B:
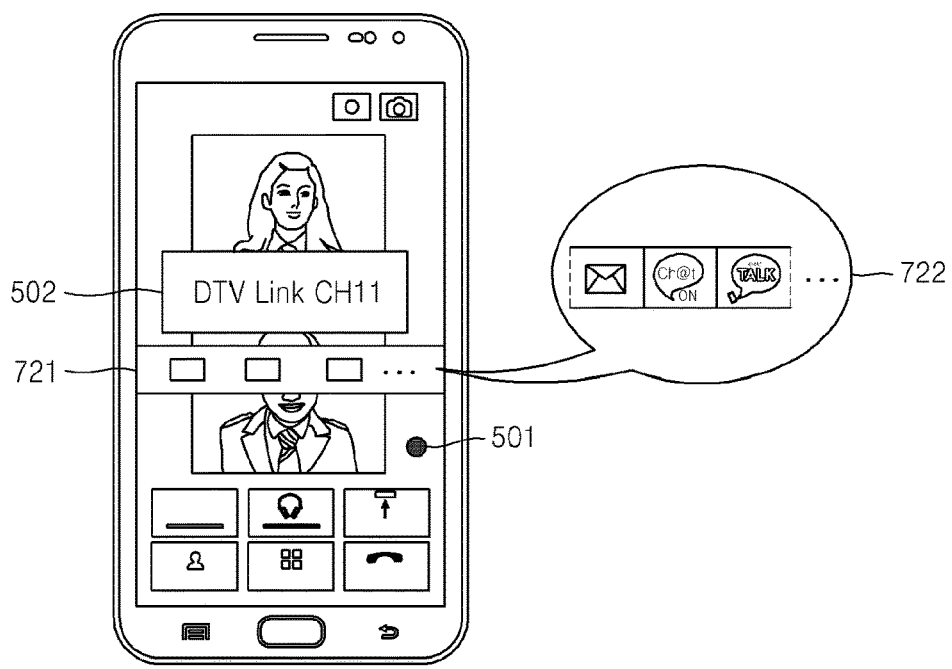
Figure 7C:
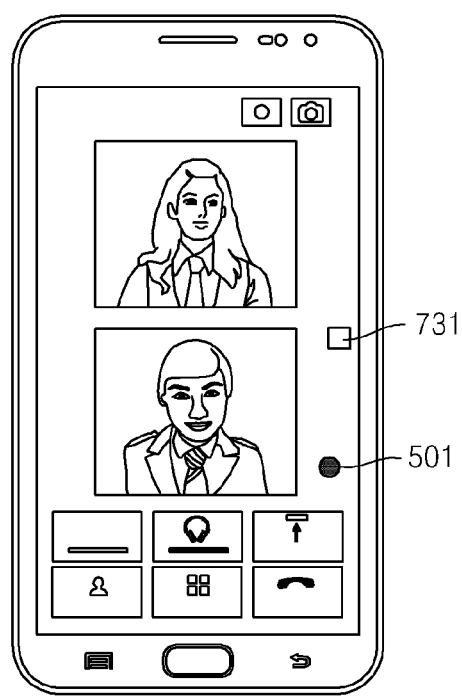

FIGS. 7A through 7C illustrate screens of the first communication device 10 with respect to the list of available communication services, according to an exemplary embodiment. When the user of the first communication device 10 requests the information displayed on the region 502 to be transmitted to the second communication device 20 in operation S612 while the video call service is executed between the first and second communication devices 10 and 20 and the information received from the first device 30_1 is displayed as shown in FIGS. 7A and 7B in operation S611 of FIG. 6, the first communication device 10 displays the list in a display region 711 as shown in a balloon 712 of FIG. 7A, or in a display region 721 as shown in a balloon 722 of FIG. 7B. The available communication services displayed in the display regions 711 and 721 may be displayed as icons showing respective features, texts, or identification information, but are not limited thereto.

When a desired communication service is selected in operation S614 from the list, the first communication device 10 transmits the content and/or the content-related information to the second communication device 20 according to the selected communication service in operation S615. Accordingly, as shown in FIG. 7C, the first communication device 10 may display information 731 about the selected communication service for transmitting the content and/or the content-related information, and remove the region 502 displaying the content-related information. Accordingly, the user of the first communication device 10 may determine the communication service used to transmit the information displayed in the region 502. The region 502 is removed in FIG. 7C to show that the information displayed in the region 502 is transmitted from the first communication device 10 to the second communication device 20. However, alternatively, the region 502 may not be removed and may be maintained to be displayed. The selected communication service may be shown as an icon or information indicating the selected communication service.

FIG. 8 illustrates screens of the first communication device 10 with respect to the list of available communication services, according to another exemplary embodiment. In other words, when the user touches a slide bar 801 in a screen 810 of the first communication device 10 and drags the slide bar 801 upward, a region 821 displaying the list of available communication services is displayed on the first communication device 10 as shown in a screen 820. When a desired communication service is selected from the region 821 and a "Done" button is controlled, the first communication device 10 transmits the information displayed in the region 502 to the second communication device 20 based on the selected communication device while displaying information 831 about the communication service used to transmit the information displayed in the region 502 as shown in a screen 830, and stops displaying the region 502. However, alternatively, the screen 830 may maintain the region 502 to be displayed. Also, the information 831 may be shown in the same manner as the information 731 of FIG. 7C.

Figure 9:
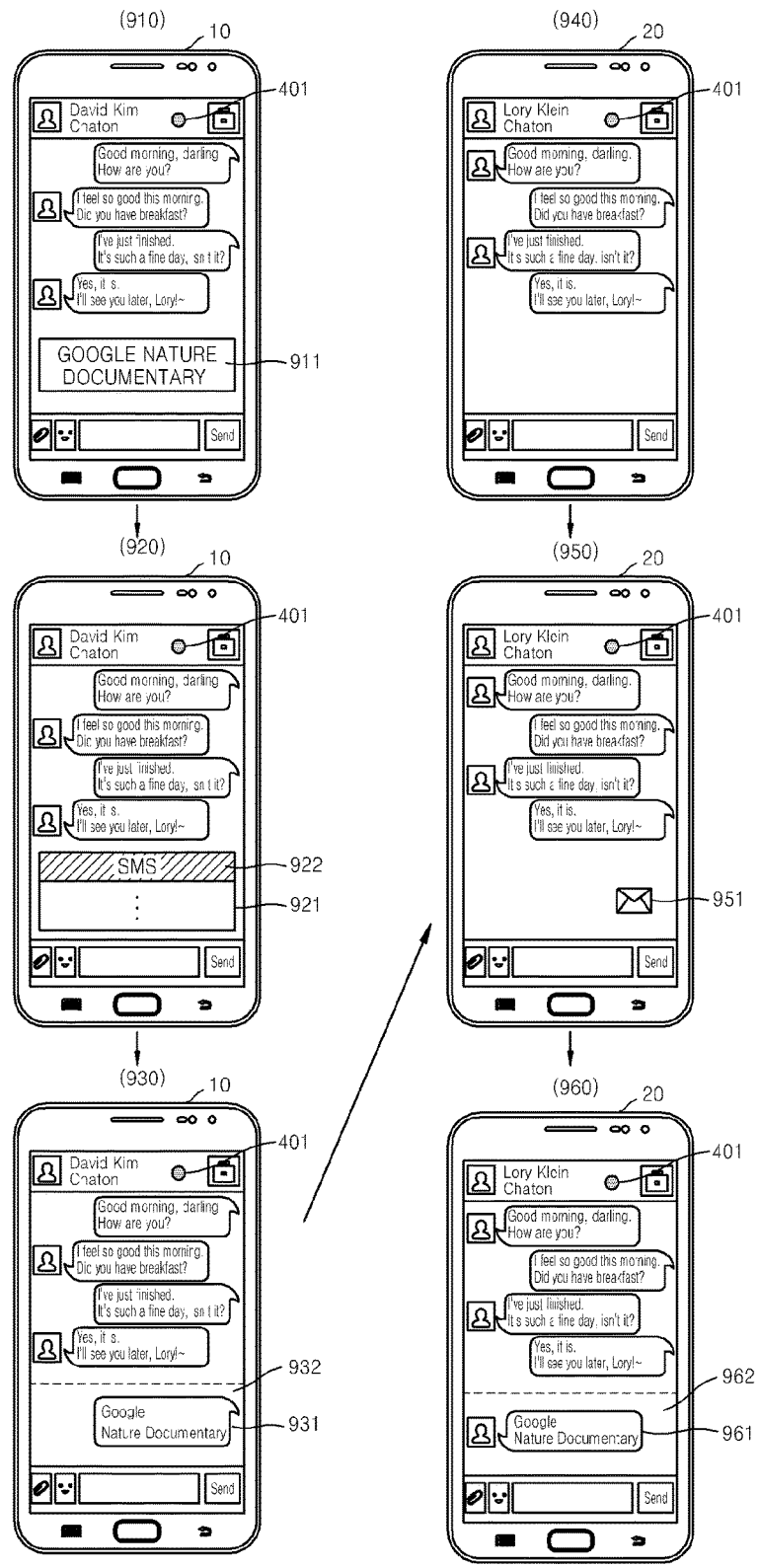
FIG. 9 illustrates screens for selecting another communication service while an interactive service is being provided, according to another exemplary embodiment.

FIG. 9 illustrates screens of the first communication device 10 with respect to the list of available communication services, according to another exemplary embodiment. In FIG. 9, the content-related information is transmitted via a short message service (SMS) while the first and second communication devices 10 and 20 are executing a messenger service.

Screens 910 through 930 are screens of the first communication device 10 and screens 940 through 960 are screens of the second communication device 20.

When the content-related information received from one of the first through (n)th devices 30_1 through 30_n of the first communication device 10 is "Google Nature Documentary" and the list of available communication services is requested by the user of the first communication device 10 as in the screen 910, the first communication device 10 displays the list in a region 921 as shown in the screen 920. When an SMS 922 is selected from the list, the first communication device 10 transmits information about "Google Nature Documentary" to the second communication device 20 based on the SMS 922, and displays a text balloon 931 indicating that the content-related information has been transmitted in a region 932 separated from a display region provided by the messenger service, as shown in the screen 930. The text balloon 931 includes the transmitted information about "Google Nature Documentary". The text balloon 931 displayed on the screen 930 may be shown in another form. Also, the displaying of the information transmitted based on the SMS 922 is not limited to the region 932 separated from the display region provided by the messenger service.

When the SMS 922 is selected and the content-related information is transmitted from the first communication device 10 while information based on the messenger service is displayed as in the screen 940, the second communication device 20 displays information 951 indicating that an SMS is received as shown in the screen 950. When the user of the second communication device 20 selects the information 951 or requests to open the information 951, the second communication device 20 displays a text balloon 961 including the received content-related information in a region 962 separated from a display region provided by the messenger service, as shown in the screen 960. However, the displaying of the content-related information is not limited to the region 962 separated from the display region provided by the messenger service.

FIG. 10 is a flowchart illustrating a method of sharing content based on the system 100 of FIG. 1, according to another exemplary embodiment. In FIG. 10, the first communication device 10 broadcasts the content share request to the first through (n)th devices 30_1 through 30_n and receives the information about at least one of the content and the content-related information from the first through (n)th devices 30_1 through 30_n, and the second communication device 20 transmits the content reproduce or store request to a device selected from among the (n+1)th through (n+m)th devices 40_1 through 40_m, when the first and second communication devices 10 and 20 are executing the interactive service.

Since operations S1001 through S1010 of FIG. 10 are respectively the same as operations S301 through S310 of FIG. 3, details thereof are not repeated here. However, operation S1002 is different from operation S302 since the first and (n)th devices 30_1 and 30_n are reproducing or storing the content in operation S1002.

The first communication device 10 broadcasts the content share request to the first through (n)th devices 30_1 through 30_n in operation S1009, and upon receiving the information about at least one of the content and the content-related information from the first through (n)th devices 30_1 through 30_n in operation S1010, displays a list of the first through (n)th devices 30_1 through 30_n that transmitted the information in operation S1011.

Figure 11A:
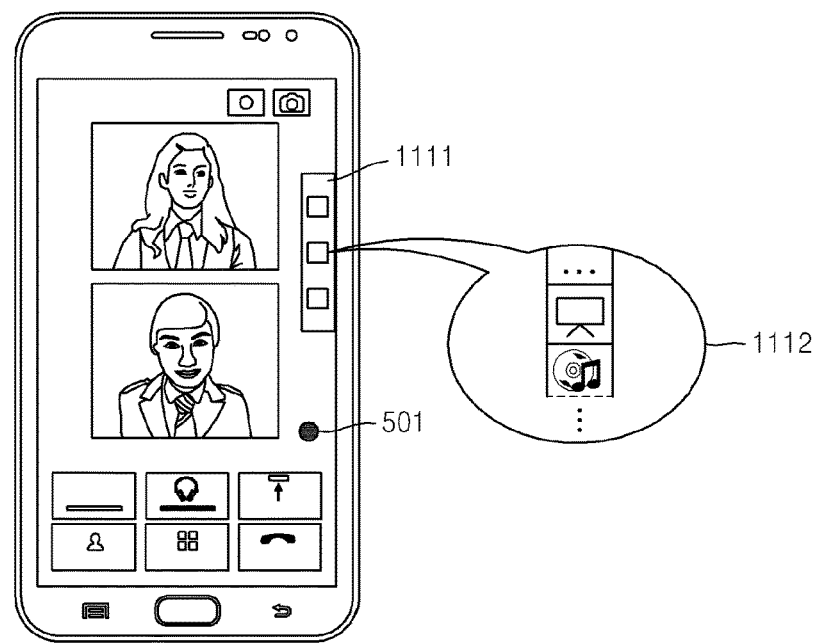
FIGS. 11A through 11C illustrate screens related to selecting of a device based on the method of FIG. 10, according to exemplary embodiments n.
Figure 11B:
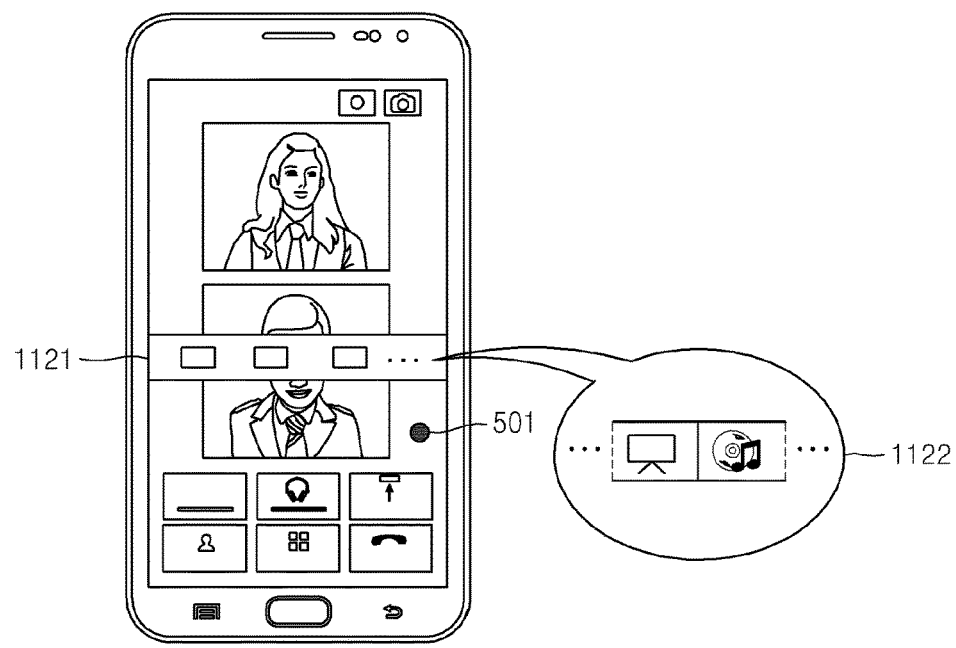
Figure 11C:
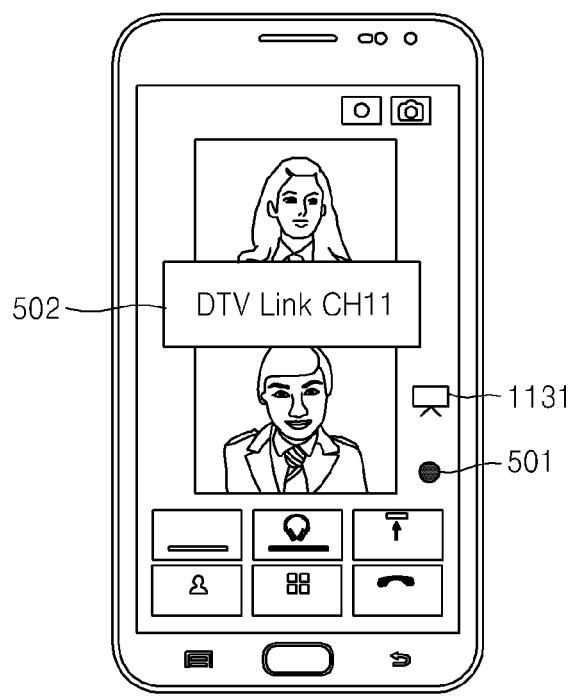

FIGS. 11A through 11C illustrate screens of the first communication device 10 including the list of the first through (n)th devices 30_1 through 30_n, according to exemplary embodiments. When the first and second communication devices 10 and 20 are executing the video call service, the first device 30_1 is a DTV, and the (n)th device 30_n is an audio reproducing device, the first communication device 10 may display the list in a display region 1111 as shown in a balloon 1112 of FIG. 11A, or in a display region 1121 as shown in a balloon 1122 of FIG. 11B, in operation S1011 of FIG. 10. The first through (n)th devices 30_1 through 30_n displayed in the display regions 1111 and 1121 may be displayed as icons showing respective features, texts, or identification information, but are not limited thereto.

When a desired device is selected in operation S1012 from the list, the first communication device 10 displays information about the content and the content-related information received from the selected device in operation S1013 while transmitting the displayed information to the second communication device 20 in operation S1014. FIG. 11C illustrates a screen of the first communication device 10 displaying information 1131 about the selected device and the region 502 including information received from the selected device while maintaining the video call service. Referring to FIG. 11C, it is determined that the selected device is a DTV, information received from the DTV is content-related information, i.e., "DTV Link CH 11", and the content-related information is transmitted to the second communication device 20.

Figure 12:
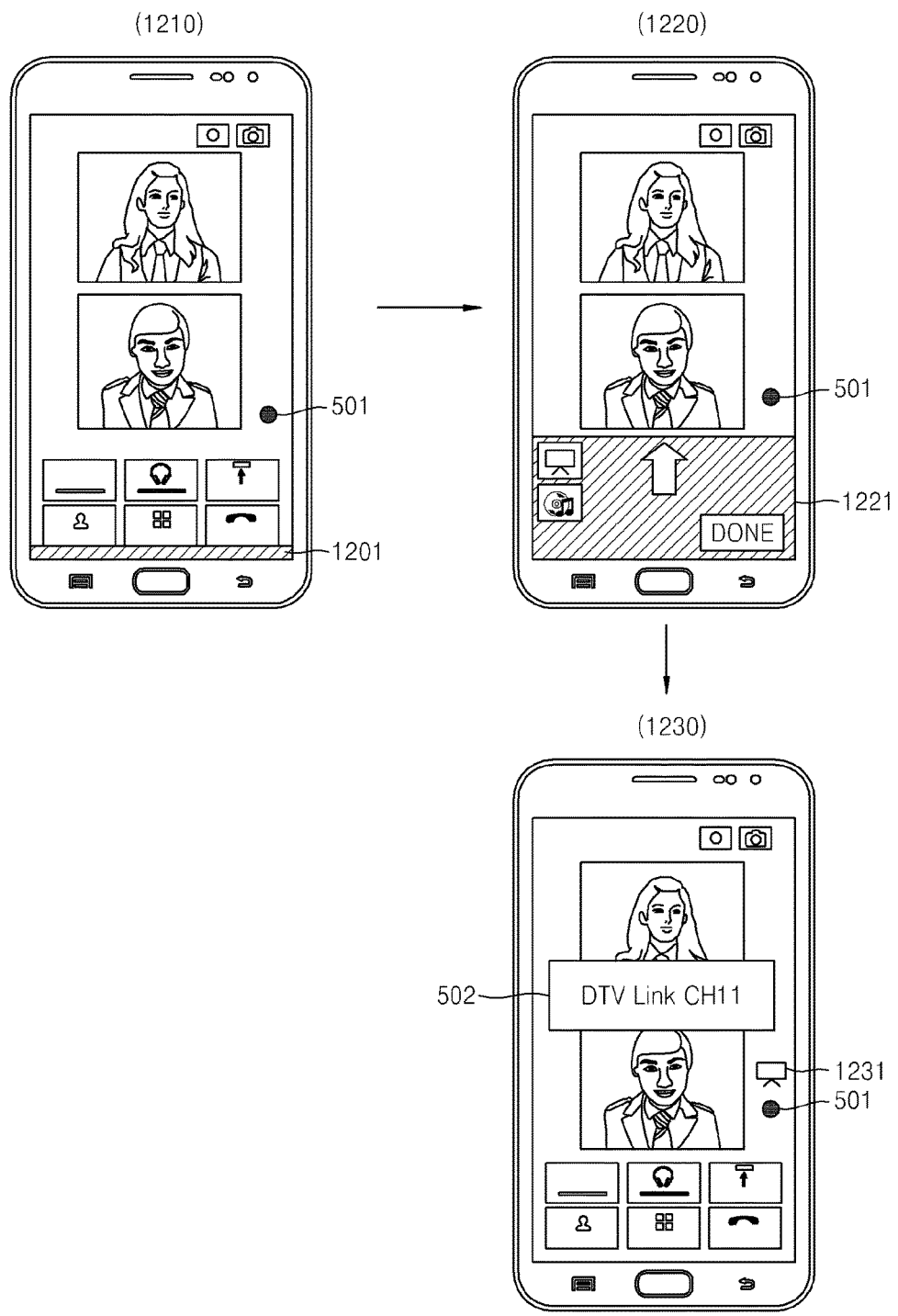
FIG. 12 illustrates screens related to selecting a device based on the method of FIG. 10, according to another exemplary embodiment.

FIG. 12 illustrates screens of the first communication device 10 displaying the list of the first through (n)th devices 30_1 through 30_n, according to an exemplary embodiment. In other words, when the user touches a slide bar 1201 in a screen 1210 of the first communication device 10 and drags the slide bar 1201 upward, a region 1221 displaying the list is displayed on the first communication device 10 as shown in a screen 1220. When a desired device is selected from the region 1221 and a "Done" button is controlled, the first communication device 10 displays information received from the selected device in the region 502 as shown in a screen 1230 while transmitting the received information to the second communication device 20, and displays information 1231 about the selected device. Accordingly, the user of the first communication device 10 may check the selected device, the information received from the selected device, and the information transmitted to the second communication device 20.

The second communication device 20 displays the received information in operation S1015. When the user of the second communication device 20 requests a list of the (n+1)th through (n+m)th devices 40_1 through 40m in operation S1016, the second communication device 20 displays the list of the (n+1)th through (n+m)th devices 40_1 through 40m, which are available peripheral devices, in operation S1017. The available peripheral devices denote devices connectable to the second communication device 20. The second communication device 20 may display the list as shown in FIG. 11A, 11B, or a screen 1210 or 1220 of FIG. 12.

When the user selects a device from the list of the (n+1)th through (n+m)th devices 40_1 through 40m in operation S1018, the second communication device 20 maintains the interactive service with the first communication device 10 in operation S1019 while transmitting the content reproduce or store request as described above with reference to FIG. 3 to the selected device in operation S1020. In FIG. 10, the (n+1)th device 40_1 is selected. Accordingly, the second communication device 20 transmits the content reproduce or store request to the (n+1)th device 40_1 in operation S1020. Referring to FIGS. 11A through 11C and 12, the (n+1)th device 40_1 is a DTV. Thus, the (n+1)th device 40_1 requests for the content to the server 60 based on the content-related information in operation S1021, and upon receiving the content from the server 60 in operation S1022, reproduces the received content in operation S1023.

As described above with reference to FIG. 3, in FIG. 10, the content-related information is transmitted and received between the first and second communication devices 10 and 20. However, if the content is transmitted and received between the first and second communication devices 10 and 20, operations S1021 and S1022 are not performed. Alternatively, the first communication device 10 requests a content transmission session to the second communication device 20 based on an RTP before transmitting the content to the second communication device 20, and when the second communication device 20 accepts the request, the first communication device 10 transmits the content while maintaining the interactive service with the second communication device 20.

Figure 13:
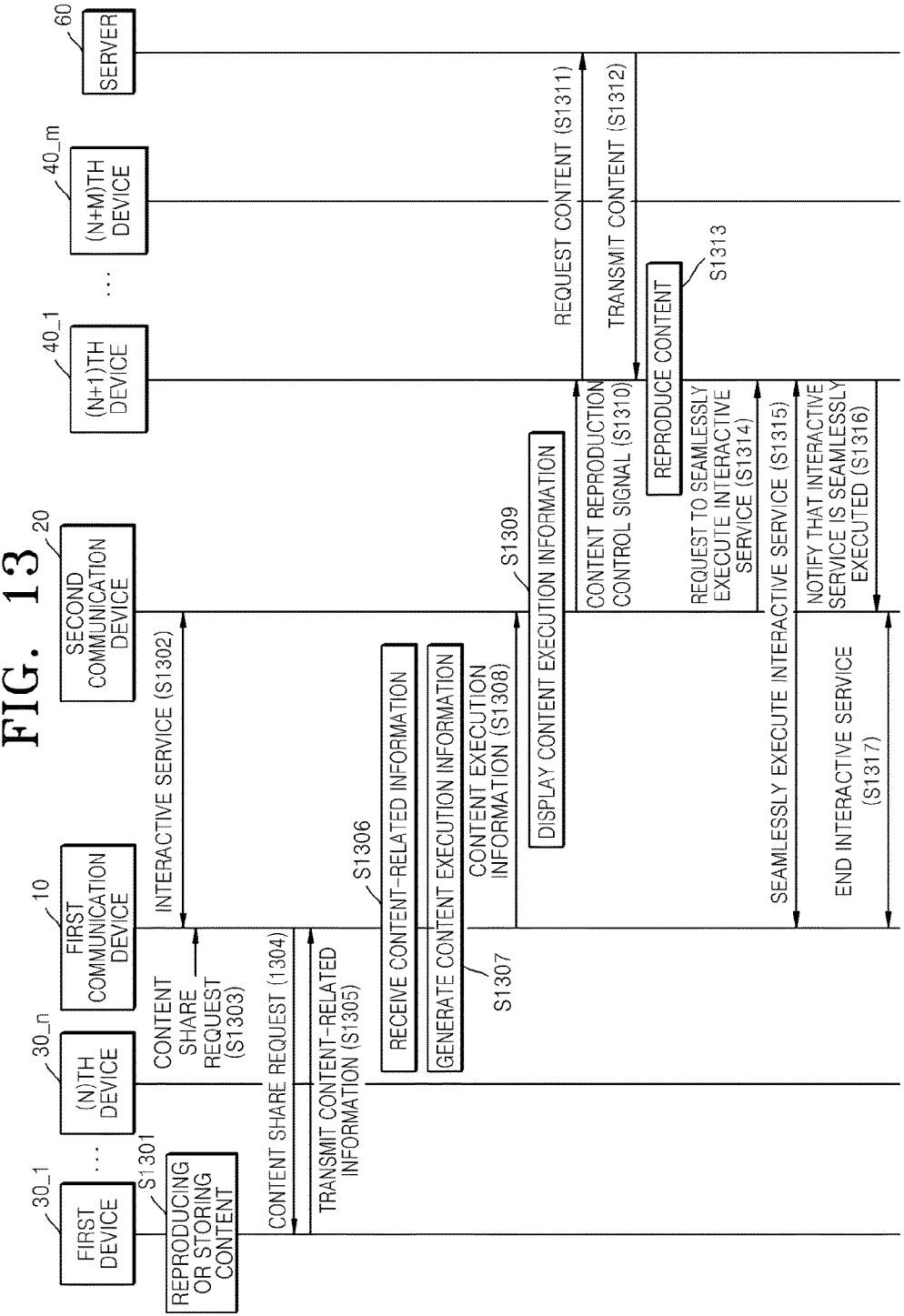
FIG. 13 is a flowchart illustrating a method of sharing content based on the system of FIG. 1, according to another exemplary embodiment.

FIG. 13 is a flowchart illustrating a method of sharing content based on the system 100 of FIG. 1, according to another exemplary embodiment. Here, when the first device 30_1 is reproducing the content and the first and second communication devices 10 and 20 are executing the interactive service, the content execution information based on the content-related information received from the first device 30_1 is transmitted to the second communication device 20, and the interactive service between the first and second communication devices 10 and 20 is seamlessly executed by a device reproducing the content by being controlled by the second communication device 20.

Referring to FIG. 13, the interactive service is executed between the first and second communication devices 10 and 20 in operation S1302 while the first device 30_1 is reproducing the content in operation S1301, and when the content share request is received by the user of the first communication device 10 in operation S1303, the first communication device 10 transmits the content share request to the first device 30_1 in operation S1304. Accordingly, the first communication device 10 receives the content-related information being reproduced from the first device 30_1 in operations S1305 and S1306. The content-related information may be received from the first device 30_1 via monitoring of a peripheral device regardless of the content share request of the user of the first communication device 10.

In other words, when the first through (n)th devices 30_1 through 30_n are not connected to the first communication device 10, the first communication device 10 broadcasts a reproduction state information request to the first through (n)th devices 30_1 through 30_n, and may receive the content-related information by extracting the content-related information from a response signal received from the first through (n)th devices 30_1 through 30_n. The reproducing state information request may be periodically broadcasted while the interactive service is being executed, regardless of receiving information including the content share request from the user of the first communication device 10.

When the reproduction state information request is broadcasted, a plurality of pieces of the content-related information may be received from a plurality of peripheral devices including the first device 30_1. The plurality of peripheral devices are devices reproducing the content. When the plurality of pieces of content-related information are received, the first communication device 10 may display all of the plurality of pieces of content-related information for the user to select desired content-related information.

When the first device 30_1 is connected to the first communication device 10, the content-related information may be received by extracting the content-related information from monitoring information about the first device 30_1. The monitoring information about the first device 30_1 may be obtained by periodically transmitting the reproduction state information request to the first device 30_1 while the interactive service is being executed regardless of the receiving of the user input information from the first communication device 10, but the obtaining of the monitoring information is not limited thereto.

The content-related information may be received according to a content-related information obtaining command. In other words, when the user of the first communication device 10 directly inputs the content-related information obtaining command and the first device 30_1 is selected while the first and second communication devices 10 and 20 are executing the interactive service, the content-related information obtaining command is transmitted to the first device 30_1. Accordingly, the first communication device 10 may receive the content-related information from the first device 30_1. It may be understood that the content-related information obtaining command is identical to the reproduction state information request.

If the user of the first communication device 10 directly inputs the content-related information obtaining command, but a target device is not selected, the first communication device 10 broadcasts the content-related information obtaining command and extracts and receives the content-related information from a response signal. The target device denotes a device capable of obtaining the content-related information. When the content-related information obtaining command is broadcasted, the first communication device 10 may receive the content-related information from a plurality of peripheral devices including the first device 30_1. The plurality of peripheral devices are devices reproducing the content as described above. As such, when the content-related information is received from the plurality of peripheral devices, the first communication device 10 may select one of the plurality of pieces of content-related information as described above with reference to FIG. 10.

When the user of the first communication device 10 directly inputs the content-related information obtaining command, and the first communication device 10 is connected to and monitoring the first device 30_1 or is monitoring peripheral devices while the first communication device 10 is not connected to the peripheral devices including the first device 30_1, the content-related information may be received by extracting the content-related information from the monitoring information.

The content-related information obtaining command may be automatically generated by parsing text information and voice information transmitted and received between the first and second communication devices 10 and 20. The content-related information obtaining command is automatically generated by parsing the text and voice information if the text or voice information includes information indicating a content sharing intention, such as "I want to share the content".

Also, if an NFC module (not shown) is included in the first communication device 10 and the first device 30_1, the content-related information may be received via near field communication between the first communication device 10 and the first device 30_1.

When the content-related information is received in FIG. 13, the first communication device 10 generates the content execution information in operation S1307 based on the received content-related information. Accordingly, the first communication device 10 may determine a device capable of reproducing the content by parsing the content-related information, and can be operated by a program for generating the content execution information including a set of commands for controlling the determined device.

The content execution information may be generated by considering synchronization between contents reproduced in the first device 30_1 and the (n+1)th device 40_1. For example, when the content is broadcast content provided in real-time, the content execution information may be synchronized via only channel tuning information. However, when the content is content stored in a cloud server or VOD-based content, the content execution information may be generated to include reproduction time information or reproduction location information for synchronization. The generated content execution information may be displayed on the first communication device 10, but alternatively in FIG. 13, the first communication device 10 does not display the content execution information but transmits the content execution information to the second communication device 20 in operation S1308. The first communication device 10 may transmit the content execution information by using the interactive service being currently executed. Alternatively, the first communication device 10 may transmit the content execution information by using a communication service different from the interactive service being currently executed. The different communication services between the first and second communication devices 10 and 20 are the same as that described with reference to FIGS. 7A through 7C, 8, and 9.

In other words, when the interactive service being currently executed is the messenger service shown in FIG. 2, the first communication device 10 may transmit the content execution information based on the messenger service. When the content execution information is transmitted via the messenger service, the content execution information may be transmitted such that the content execution information is displayed in the text balloon 202 of FIG. 2. Alternatively, when the interactive service is a VoIP-based call service, the first communication device 10 may transmit the content execution information as additional information of a packet of a VoIP.

Alternatively, when the interactive service is a general video call service or a general call service, the first communication device 10 may transmit the content execution information to the second communication device 20 by using an SMS, an MMS, or a messenger service. Accordingly, the first communication device 10 activates a different communication service for transmitting the content execution information while maintaining the interactive service being currently executed. The transmitting of the content execution information from the first communication device 10 to the second communication device 20 by using the different communication service while maintaining the interactive service between the first and second communication devices 10 and 20 may be realized via a technology similar to setting and communicating a plurality of communication channels via WiFi.

The second communication device 20 parses the content execution information while displaying the content execution information in operation S1309, and transmits a content reproduction control signal to the (n+1)th device 40_1 by executing an (n+1)th device control application set in the second communication device 20 in operation S1310. Alternatively in operation S1309, the second communication device 20 may display "Click here" or "Accept" and "Deny" with the content execution information as shown in the region 403 in the screen 423 of FIG. 4D or the region 503 in the screen 523 of FIG. 5D. In this case, the second communication device 20 may transmit the content reproduction control signal based on the content execution information to the (n+1)th device 40_1 in operation S1310 based on selecting of "Click here" or "accept" and "deny", while transmitting a message or signal accepting the content share request to the first communication device 10 although not shown in FIG. 13. Accordingly, although not shown in FIG. 13, the first communication device 10 may output information that the second communication device 20 accepted the content share request based on the content execution information for the user.

Upon receiving the content reproduction control signal, the (n+1)th device 40_1 requests the content to the server 60 through the network 50 in operation S1311. Upon receiving the content from the server 60 in operation S1312, the (n+1)th device 40_1 reproduces the received content in operation S1313. When the content is broadcast content provided in real-time, the (n+1)th device 40_1 may receive and reproduce the content from a terrestrial broadcasting station (not shown) or a wired broadcasting station (not shown) by tuning a communication channel according to the content reproduction control signal.

When the (n+1)th device 40_1 reproduces the content to be shared, the second communication device 20 requests the (n+1)th device 40_1 to seamlessly execute the interactive service with the first communication device 20 in operation S1314. Here, the (n+1)th device 40_1 is capable of executing the interactive service between the first and second communication devices 10 and 20. For example, when the (n+1)th device 40_1 is a smart TV and the interactive service executed between the first and second communication devices 10 and 20 is a video call service, the (n+1)th device 40_1 may seamlessly execute the interactive service with the first communication device 10, which is performed by the second communication device 20.

Such a request to seamlessly execute the interactive service may include information required to execute the interactive service between the first and second communication devices 10 and 20. For example, when the interactive service is executed based on a phone number, the required information includes the phone number of the first communication device 10. When the interactive service is executed based on an email address, the required information includes the email address. When the interactive service is executed based on a social network service (SNS) account, the required information includes the SNS account.

Upon receiving the request to seamlessly execute the interactive service in operation S1314, the (n+1)th device 40_1 is connected to the first communication device 10 via the network 50 to seamlessly execute the interactive service executed between the first and second communication devices 10 and 20 in operation S1315.

Figure 14:
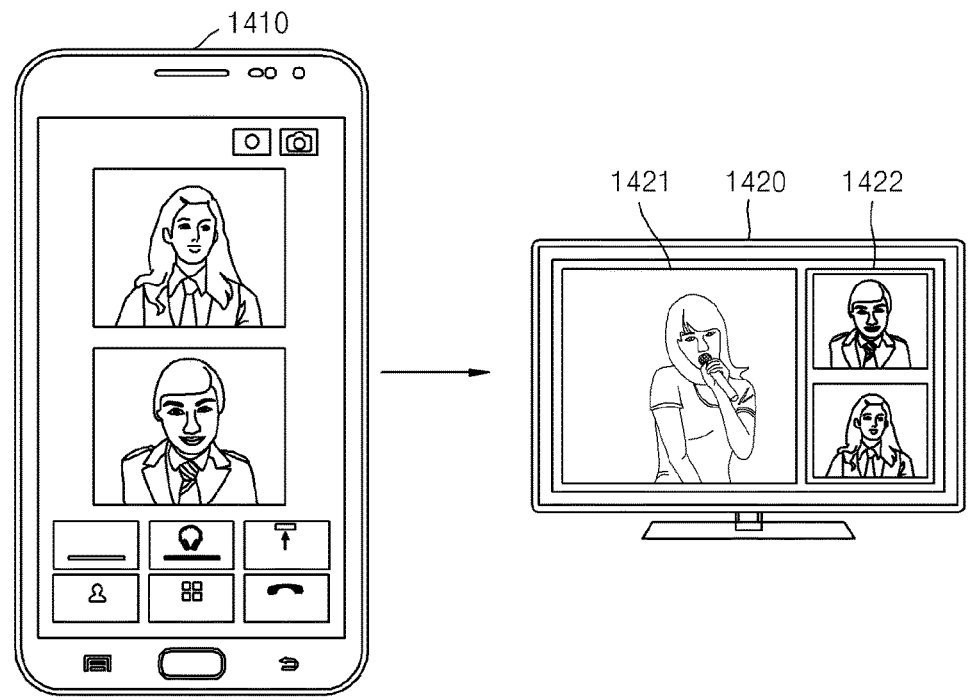
FIG. 14 illustrates screens continuously providing an interactive service based on the method of FIG. 13.

For example, when a video call screen based on the interactive service displayed on the second communication device 20 is a screen 1410 of FIG. 14, and the (n+1)th device 40_1 seamlessly executes the interactive service, the (n+1)th device 40_1 may simultaneously display reproduced content 1421 and a video call screen 1422 based on the interactive service as shown in a screen 1420. FIG. 14 illustrates screens of the (n+1)th device 40_1 when the interactive service is seamlessly executed based on the method of FIG. 13. The reproduced content 1421 and the video call screen 1422 may be provided in a split screen structure. Split screen regions may be determined according to a type of the interactive service. For example, when the interactive service is a messenger service, a smaller region may be assigned than a video call service.

Alternatively, the video call screen 1422 may be displayed as a pop-up window. When the video call screen 1422 is displayed as a pop-up window, the location of the video call screen 1422 may be moved by controlling a screen of the (n+1)th device 40_1. For example, when the (n+1)th device 40_1 receives a touch-based user input, the location of the video call screen 1422 may be moved via a touch and drag operation.

When the (n+1)th device 40_1 continuously executes the interactive service, the (n+1)th device 40_1 notifies the second communication device 20 that the interactive service with the first communication device 10 is continuously executed, in operation S1316. Accordingly, the second communication device 20 ends the interactive service with the first communication device 10 in operation S1317 and the first communication device 10 maintains the interactive service with the (n+1)th device 40_1, and thus the users share viewing experiences.

In FIG. 13, it is understood that the interactive service is maintained between the first and second communication devices 10 and 20 from operations S1303 through S1314.

Figure 15:
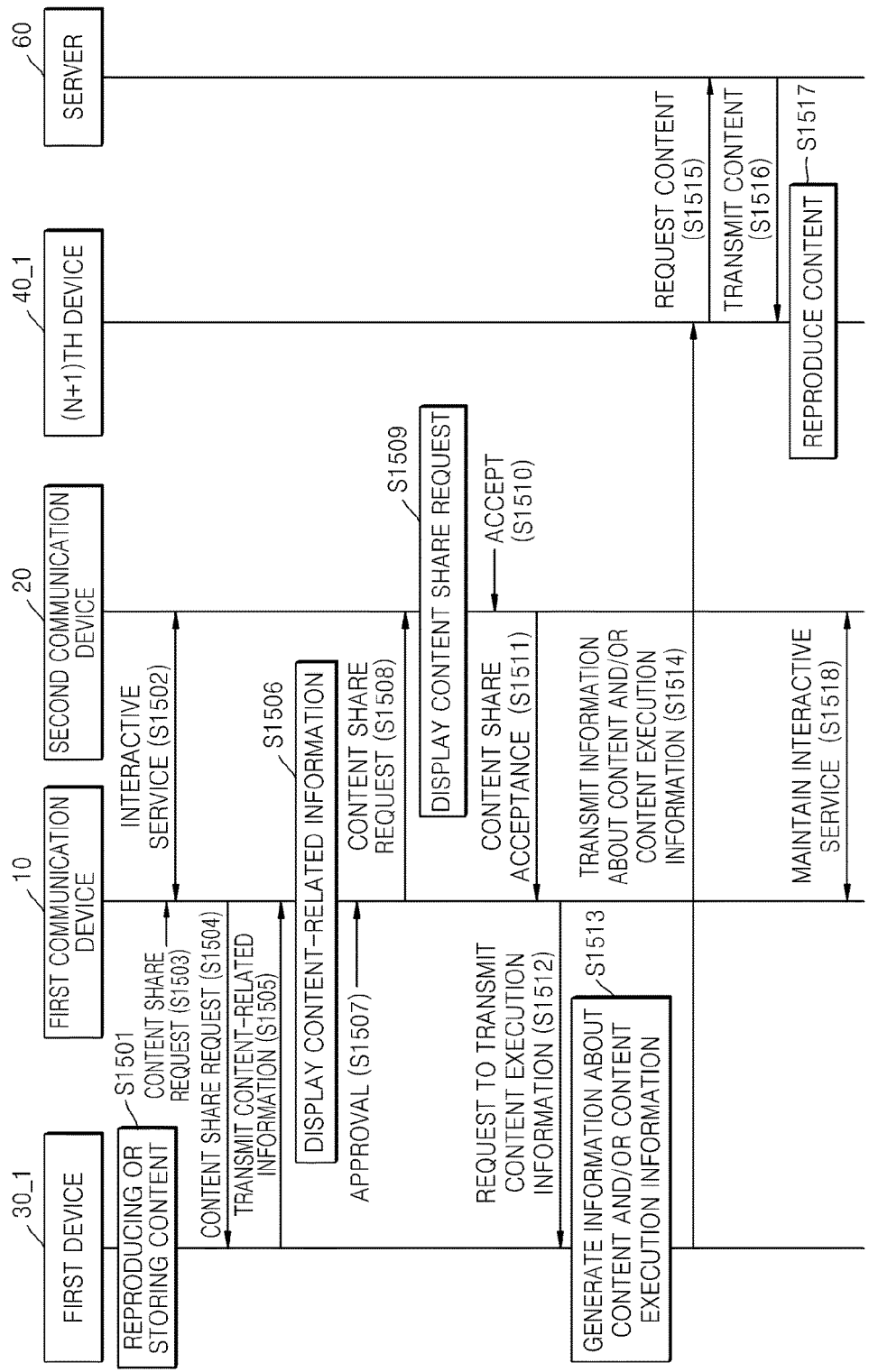
FIG. 15 is a flowchart illustrating a method of sharing content, according to another exemplary embodiment.

FIG. 15 is a flowchart illustrating a method of sharing content, according to another exemplary embodiment. The method of FIG. 15 is different from the method of FIG. 13 since approving of content to be shared by the user of the first communication device 10 and approving of the content share requests of the first and second communication devices 10 and 20 are added to the method of FIG. 15, and transmitting of the content and the content execution information in the method of FIG. 15 are different from that of the method of FIG. 13. Since operations S1501 through S1505 of FIG. 15 are respectively the same as operations S1301 through S1305 of FIG. 13, details thereof are not repeated here.

When the content-related information is received from the first device 30_1 in operation S1505 of FIG. 15, the first communication device 10 displays the content-related information in operation S1506. When an approval is input by the user of the first communication device 10 regarding the content-related information in operation S1507, the first communication device 10 transmits the content share request to the second communication device 20 in operation S1508. Accordingly, the second communication device 20 displays the content share request in operation S1509. When the user accepts the content share request in operation S1510, the second communication device 20 transmits a content share request acceptance to the first communication device 10 in operation S511. The approval of the user of the first communication device 10, the content share request of the second communication device 20, and the content share request acceptance may be input or displayed based on the content share icon 401 of FIGS. 4A through 4C or the content share icon 501 of FIGS. 5A through 5C.

When the content share request acceptance is transmitted, the second communication device 20 also transmits information about the (n+1)th device 40_1. The information about the (n+1)th device 40_1 is URL information including an IP address, and may include information required for communication, a manufacturer name, a model name, and a device type.

Alternatively, the second communication device 20 may not transmit the information about the (n+1)th device 40_1 to the first communication device 10 in operation S1510, but the first communication device 10 may pre-include the information about the (n+1)th device 40_1. In other words, the information about the (n+1)th device 40_1 may be pre-stored in the first communication device 10 by the user of the first communication device 10 regardless of the interactive service between the first and second communication devices 10 and 20, or the first communication device 10 may collect and store information about peripheral devices connectable to the second communication device 20 while the first and second communication devices 10 and 20 execute the interactive service. The information about the peripheral devices connectable to the second communication device 20 may be transmitted from the second communication device 20 upon a request of the first communication device 10 or regardless of a request of the first communication device 10. In this case, information about peripheral devices connectable to the first communication device 10 may also be transmitted to the second communication device 20.

Upon receiving the content share request acceptance from the second communication device 20, the first communication device 10 requests the first device 30_1 to transmit the content execution information in operation S1512. At this time, the first communication device 10 also transmits the information about the (n+1)th device 40_1. If the second communication device 20 includes a plurality of peripheral devices as shown in FIG. 1, and the first communication device 10 includes the information about the peripheral devices, the first communication device 10 may select at least one of the (n+1)th through (n+m)th devices 40_1 through 40_m before requesting the first device 30_1 to transmit the content execution information, and transmit information about the selected device. The selecting of at least one of the peripheral devices may be executed as described above with reference to FIGS. 11A, 11B, and 12, but is not limited thereto. If the peripheral devices of the second communication device 20 are displayed as shown in FIGS. 11A, 11B, and 12, and are selected, the screens shown in FIGS. 11A, 11B, and 12 may be referred to as screens for providing recommendation of a device to reproduce content.

When the content execution information is requested, the first device 30_1 generates information about at least one of the content and the content execution information in operation S1513 by using the content-related information and the information about the (n+1)th device 40_1 included in the request to transmit the content execution information. As described above, since the content execution information is a set of commands for reproducing the content in the (n+1)th device 40_1, the content execution information is in a data format recognizable by the (n+1)th device 40_1.

The data format recognizable by the (n+1)th device 40_1 may be formed based on the information about the (n+1)th device 40_1. In other words, when information about sets of commands for each device is stored in the first device 30_1, the content execution information is generated by using a corresponding set from among the sets stored in the first device 30_1 based on the information about the (n+1)th device 40_1. When the information about the sets is not stored in the first device 30_1, the content execution information may be generated by downloading information or program for generating the content execution information based on the information about the (n+1)th device 40_1 via the server 60, or the content execution information generated by the server 60 may be received and used upon requesting the server 60 to generate the content execution information.

The first device 30_1 transmits the information about at least one of the content and the content execution information to the (n+1)th device 40_1 through the network 50 in operation S1514. Upon receiving the content execution information, the (n+1)th device 40_1 requests the server 60 for the content in operation S1515 based on the content execution information. Upon receiving the content from the server 60 in operation S1516, the (n+1)th device 40_1 reproduces the received content. When the content and the content execution information are received, the (n+1)th device 40_1 may not request the server 60 for the content, and may reproduce the received content. In this case, operations S1515 and S1516 are not performed. As long as the content is received, the (n+1)th device 40_1 may reproduce the content by using an application program capable of reproducing the received content.

The interactive service between the first and second communication devices 10 and 20 is maintained in operation S1518 while operations S1503 and 1517 are performed. Accordingly, the users of the first and second communication devices 10 and 20 may share viewing or listening experiences respectively based on the first and (n+1)th devices 30_1 and 40_1. When the content is real-time broadcast content, the (n+1)th device 40_1 may receive the real-time broadcast content via channel tuning.

The method of FIG. 15 may be modified such that the content execution information is transmitted to the (n+1)th device 40_1 through the first and second communication devices 10 and 20, without being directly transmitted to the (n+1)th device 40_1.

The methods of FIGS. 3, 6, 10, 13, and 15 may be modified to all or selectively include operations as described with reference to FIGS. 7A, 7B, 8, 11A, 11B, and 12. For example, the methods of FIGS. 3, 6, 10, 13, and 15 may be modified to include an operation of recommending or selecting an available communication service as described with reference to FIGS. 7A, 7B, and 8 in order to transmit the content execution information or the content-related information by using a communication service different from the interactive service executed between the first and second communication devices 10 and 20. The methods of FIGS. 3, 6, 10, 13, and 15 may be modified to include an operation of recommending or selecting an available peripheral device related to the first communication device 10 as described with reference to FIGS. 11A, 11B, and 12 in order to select a peripheral device to which the content, the content execution information, or the content-related information is to be provided. The methods of FIGS. 3, 6, 10, 13, and 15 may be modified to include an operation of recommending or selecting an available peripheral device related to the second communication device 20 as described with reference to FIGS. 11A, 11B, and 12 in order to select a peripheral device for reproducing the content.

Figure 16A:
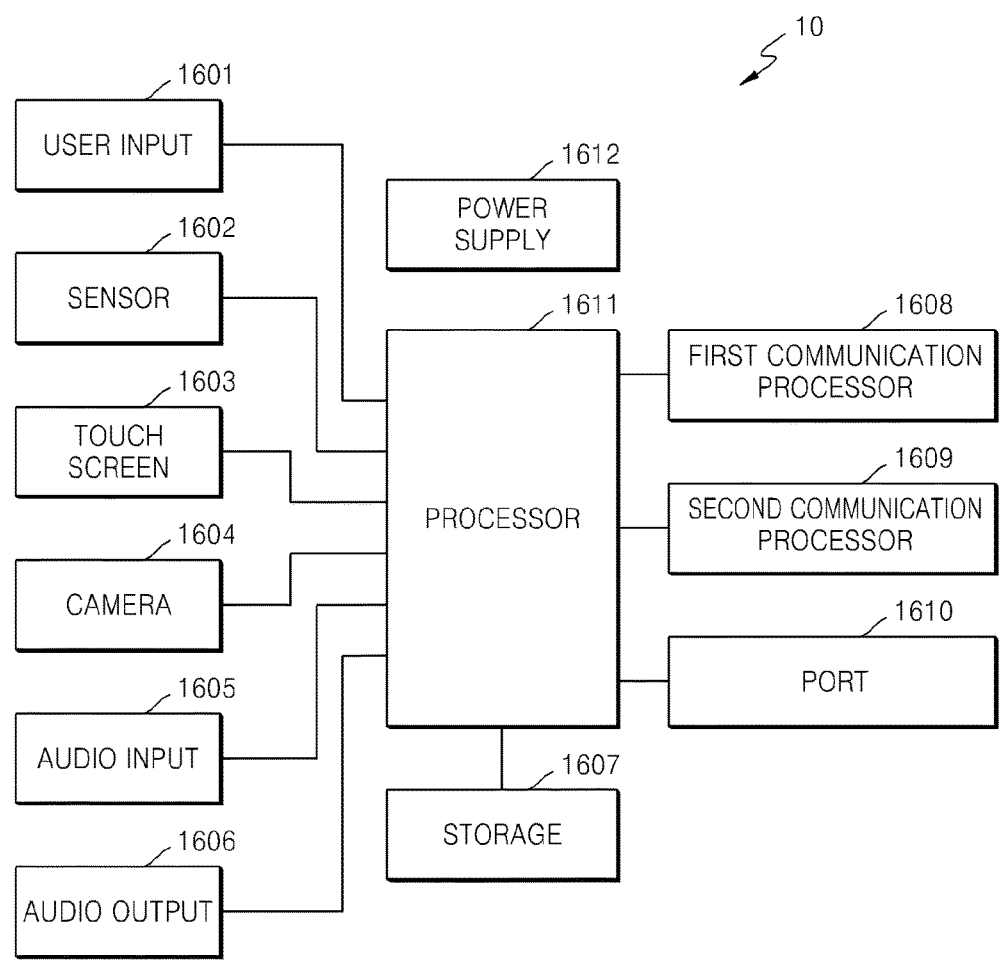
FIG. 16A is a block diagram of the first communication device of FIG. 1.
Figure 16B:
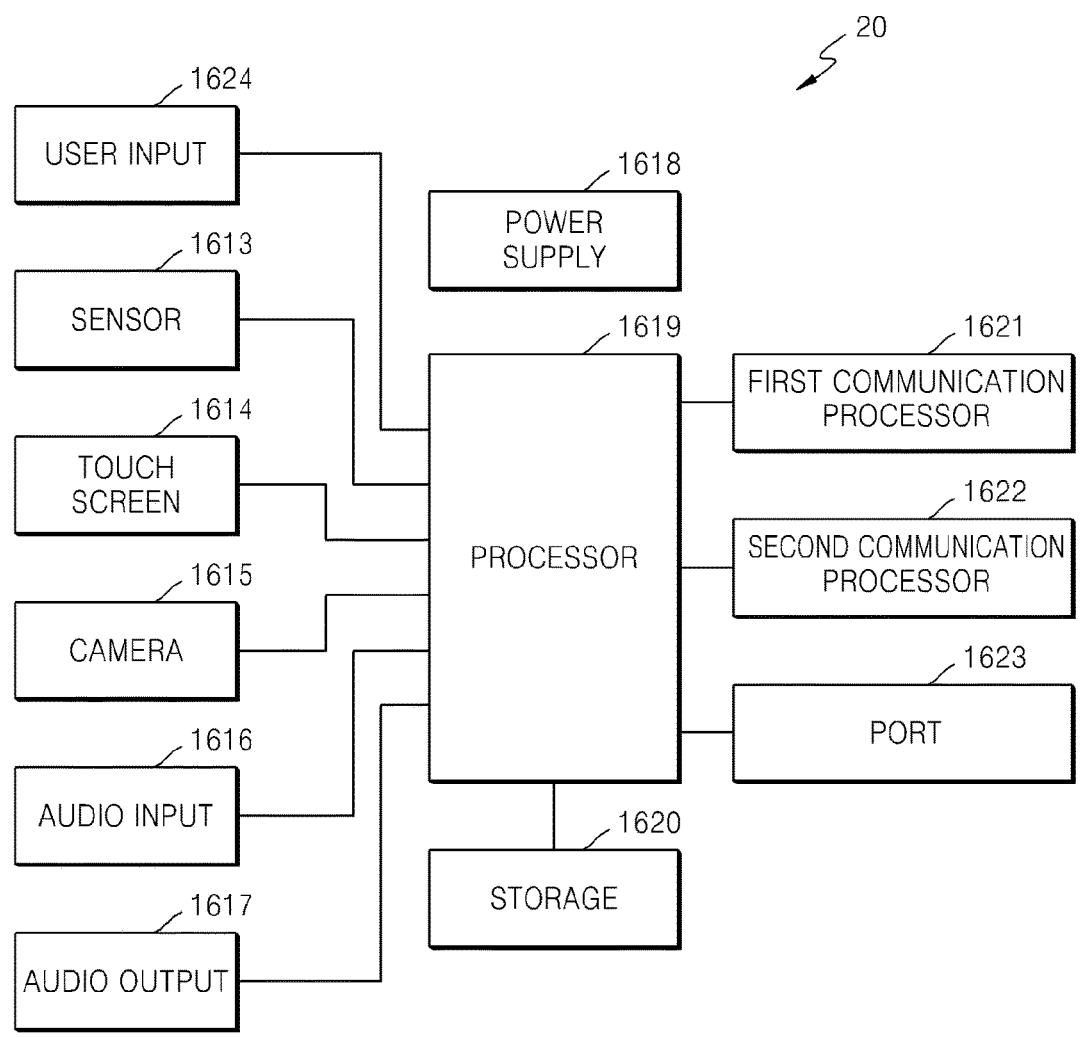
FIG. 16B is a block diagram of the second communication device of FIG. 1.

In order to perform the methods of FIGS. 3, 6, 10, 13, and 15 based on the system 100 of FIG. 1, the first communication device 10 may be configured as FIG. 16A and the second communication device 20 may be configured as FIG. 16B.

FIG. 16A is a block diagram of the first communication device 10 of FIG. 1 and FIG. 16B is a block diagram of the second communication device 20 of FIG. 1. As shown in FIGS. 16A and 16B, the first and second communication devices 10 and 20 may have the same or similar structures. However, as described above, the structures of the first and second communication devices 10 and 20 may differ if types of the first and second communication devices 10 and 20 are different, and functions may differ even if the structures are the same.

For example, a program stored in a storage 1607 of the first communication device 10 of FIG. 16A and a program stored in a storage 1620 of the second communication device 20 of FIG. 16B may be different from each other. Even when the first and second communication devices 10 and 20 are the same type, the programs stored in the storage 1607 and the storage 1620 may be different based on set application programs. However, the storages 1607 and 1620 may only store information for connecting to the server 60 and information for controlling a corresponding device. As such, when the information is stored in the storages 1607 and 1620, the first and second communication devices 10 and 20 may be referred to as cloud devices.

Also, a first communication processor 1608 and a second communication processor 1609 of the first communication device 10, and a first communication processor 1621 and a second communication processor 1622 of the second communication device 20 may be configured to operate based on different communication protocols. Standards of a camera 1604 and a touch screen 1603 of the first communication device 10 and standards of a camera 1615 and a touch screen 1614 of the second communication device 20 may be different from each other. However, basic functions of components included in the first and second communication devices 10 and 20 of FIGS. 16A and 16B are similar.

Referring to FIG. 16A, the first communication device 10 includes a user input 1601, a sensor 1602, the touch screen 1603, the camera 1604, an audio input 1605, an audio output 1606, the storage 1607, the first communication processor 1608, the second communication processor 1609, a port 1610, a processor 1611, and a power supply 1612. However, the structure of the first communication device 10 is not limited to FIG. 16A.

The user input 1601 generates input data (or control data) and user input information for controlling operations of the first communication device 10. The user input 1601 may include a keypad, a dome switch, a touch pad replacing a mouse, a jog wheel, a jog switch, or a hardware button.

The sensor 1602 generates a sensing signal for controlling the operations of the first communication device 10 by detecting a current state of the first communication device 10, such as a location of the first communication device 10, a contact of the user, an orientation of the first communication device 10, or acceleration or deceleration of the first communication device 10. The sensor 1602 may include a proximity sensor or a motion sensor, but is not limited thereto. Accordingly, the sensor 1602 may generate the sensing signal recognizing a gesture of the user based on a sensor.

The proximity sensor is a sensor detecting an object approaching a pre-determined detecting surface or a nearby object by using force of an electromagnetic field or an infrared light without a mechanical contact. Examples of the proximity sensor include a transmission type photoelectric sensor, a direct reflection type photoelectric sensor, a mirror reflection type photoelectric sensor, a high frequency oscillation type proximity sensor, a capacitance type proximity sensor, a magnetic type proximity sensor, and an infrared light proximity sensor.

The user input information based on the touch screen 1603 may be generated according to a request or selection of the user dependent upon the gesture. The gesture may be variously set as described above, according to various combinations of the number of touches, a touch pattern, a touch area, and a touch strength. A touch by a finger of the user may be based on a body part of the user capable of touching the touch screen 1603.

Also, the touch screen 1603 may include any one of various sensors for detecting a touch on the touch screen 1603 or a proximity touch. A sensor included in the touch screen 1603 may be a sensor for detecting the gesture or a pattern of the user with respect to the touch screen 1603. Accordingly, the touch screen 1603 may generate a signal that sensed the gesture or the pattern based on the proximity sensor, such as dragging, flicking, tapping, touching and holding, double tapping, panning, and sweeping based on a touch. The proximity sensor for the touch screen 1603 may be the same as the proximity sensor included in the sensor 1602.

The sensor detecting the touch of the touch screen 1603 may be a tactile sensor. The tactile sensor may detect various types of information, such as roughness of a contact surface, hardness of a contact object, and a temperature of a contact point. The touch of the touch screen 1603 may be detected as a pointer touches a panel. The touch may include a multi-touch. A proximity touch of the touch screen 1603 means that the pointer is within a predetermined distance from the touch screen 1603, without actually touching the touch screen 1603. The pointer is a tool for touching or proximity-touching a predetermined region of the touch screen 1603. Examples of the pointer include a stylus pen, a finger, a body part corresponding to the finger, or a tool corresponding to the finger. Thus, the pointer may be referred to as an external input apparatus.

The touch screen 1603 outputs information processed by the first communication device 10. For example, the touch screen 1603 displays a screen in response to the gesture or pattern sensed through the sensor included in the touch screen 1603, the control data or user input information input through the user input 1601, or a signal detected through the sensor 1602.

The touch screen 1603 may be an input and output apparatus. When the touch screen 1603 is an input and output apparatus, the screen displayed on the touch screen 1603 includes a user interface (UI) screen or a graphic user interface (GUI) screen. The touch screen 1603 may display an image of content being reproduced and receive the user input information. Also, according to an exemplary embodiment, the touch screen 1603 may display information based on a bidirectional communication service, content-related information for content sharing, and content execution information.

Examples of the touch screen 1603 include a liquid crystal display, a thin film transistor-liquid crystal display, an organic light-emitting diode display, a flexible display, a 3-dimensional (3D) display, and an active-matrix organic light-emitting diode (AMOLED) display, but are not limited thereto. The touch screen 1603 may be a display. The first communication device 10 may include two or more touch screens 1603 based on the structure of the first communication device 10.

The camera 1604 processes an image frame, such as a still image or a moving image, obtained from an image sensor (or an optical sensor) in a video call mode or a photographing mode. The processed image frame may be displayed on the touch screen 1603. The image frame processed in the camera 1604 may be stored in the storage 1607 or externally transmitted through the first communication processor 1608, the second communication processor 1609, or the port 1610. The first communication device 10 may include two or more cameras 1604 based on the structure of the first communication device 10. Also, the camera 1604 may be used as an input apparatus for recognizing a space gesture of the user. The image frame obtained from the camera 1604 may be an image of the user generated according to a bidirectional communication service.

The audio input 1605 receives and converts an external sound signal to electric voice data in a call mode, a recording mode, or a voice recognition mode, and transmits the electric voice data to the processor 1611. The audio input 1605 may be a microphone. The audio input 1605 may include various noise removing algorithms to remove noise generated while receiving the external sound signal.

The external sound signal received by the audio input 1605 may be user input information based on a natural language for an interactive service and content sharing. For example, a content-related information obtaining command may be received through the audio input 1605. The user input information based on the natural language means user input information based on speech recognition. The external sound signal may be stored in the storage 1607 or externally transmitted through the first communication processor 1608, the second communication processor 1609, or the port 1610.

The user input 1601, the sensor 1602, the touch screen 1603, the camera 1604, and the audio input 1605 may be referred to as an information input unit or an information input and output unit based on an interface function between the first communication device 10 and the user. For example, when the interface function includes a touch recognition function, a voice recognition function, and a space gesture recognition function, the user input 1601, the sensor 1602, the camera 1604, and the audio input 1605 may be referred to as the information input unit and the touch screen 1603 may be referred to as the information input and output unit.

The audio output 1606 outputs a sound signal or an audio signal received from outside the first communication device 10 in a call mode or an audio reproduction mode. The audio output 1606 may be a speaker. When content is reproduced and an audio signal is included in the reproduced content, the audio output 1606 outputs the audio signal included in the reproduced content. The audio input 1605 and the audio output 1606 may be integrated, such as a headset.

The storage 1607 stores at least one program and/or a set of commands and resources configured to be executable in the processor 1611 described below. Examples of the at least one program include at least one program required to share content while a two way communication service is being executed, an operating system program of the first communication device 10, an application program related to various functions performed in the first communication device 10, and a program for driving hardware components included in the first communication device 10.

Examples of the resource include information about a device required to generate the content execution information, information about the user of the first communication device 10, information required to operate the application program set in the first communication device 10, and information required to execute a program required to operate the hardware components. The information about the device required to generate the content execution information includes information for generating a set of commands recognizable by a device based on identification information of the device. The identification information of the device is included in the information about the device described with reference to operation S1512 of FIG. 15.

The storage 1607 may independently include a storage for storing at least one program for operating each component of the first communication device 10 as well as the operating system program, and a storage for storing the at least one program, the resources, and the application programs for executing a method of sharing content.

Examples of the storage 1607 include nonvolatile memories, such as a high-speed random access memory, a magnetic disk storage apparatus, and a flash memory, or a nonvolatile semiconductor memory. Accordingly, the storage 1607 may be referred to as a memory.

The at least one program and/or the set of commands stored in the storage 1607 may be stored in a plurality of modules according to functions.

Figure 17:
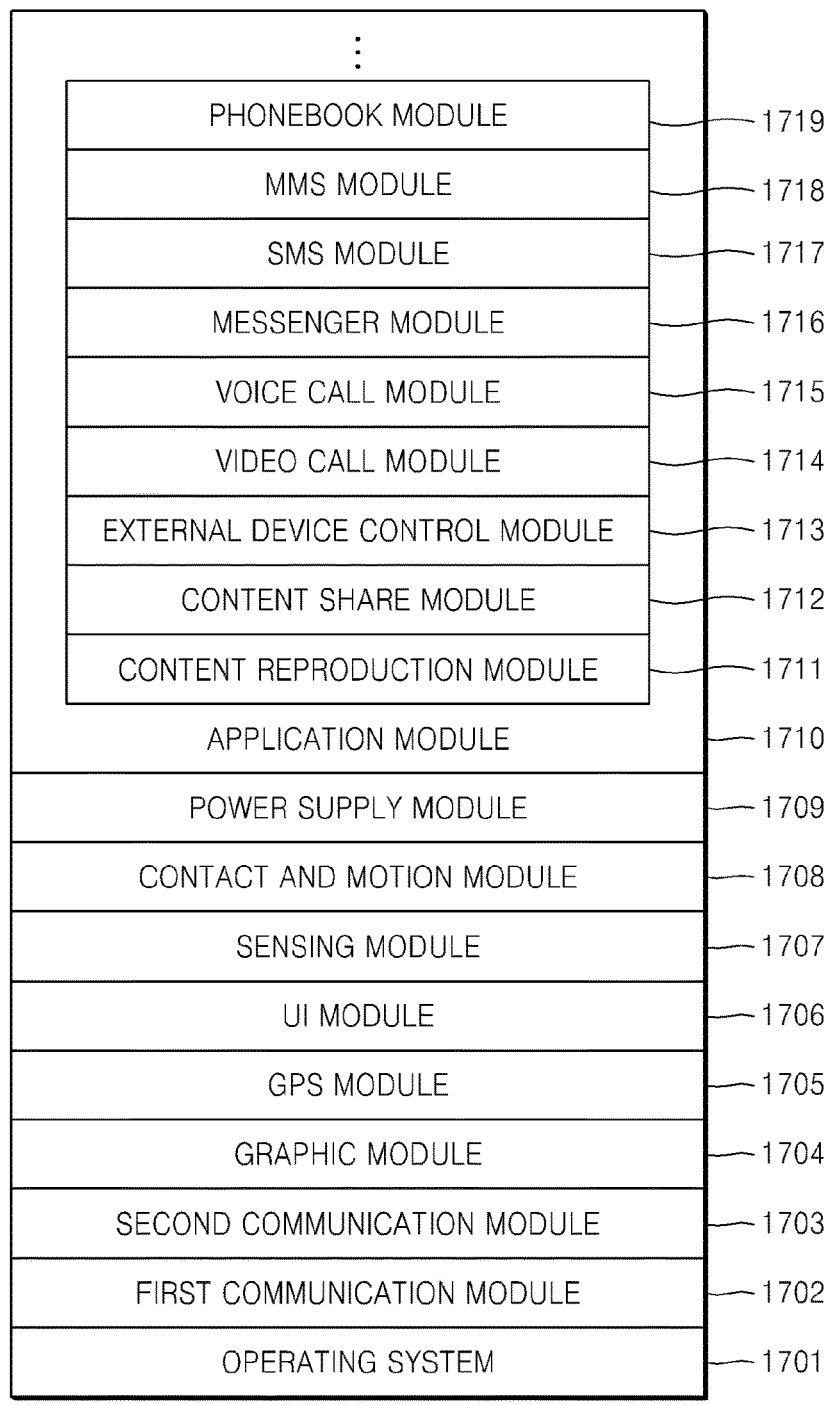
FIG. 17 illustrates a set of programs and/or commands stored in a storage unit of FIG. 16A.

FIG. 17 illustrates a set of programs and/or commands stored in the storage 1607 of FIG. 16A, which is classified according to modules. Referring to FIG. 17, the storage 1607 includes an operating system 1701, a first communication module 1702, a second communication module 1703, a graphic module 1704, a global positioning system (GPS) module 1705, a UI module 1706, a sensing module 1707, a contact and motion module 1708, a power supply module 1709, and an application module 1710, but modules included in the storage 1607 are not limited thereto.

The application module 1710 includes a content reproduction module 1711, a content share module 1712, an external device control module 1713, a video call module 1714, a voice call module 1715, a messenger module 1716, an SMS module 1717, an MMS module 1718, and a phonebook module 1719, but modules included in the application module 1710 are not limited thereto.

The operating system 1701 controls and manages general functions of the first communication device 10, and includes software components enabling a communication between hardware and software components in the first communication device 10.

The first communication module 1702 includes a software component enabling a communication between the second communication device 20 and the server 60 through the first communication port 1608, and processing data received from the second communication device 20 and the server 60 through the first communication processor 1608 and data transmitted to the second communication device 20 and the server 60. According to an exemplary embodiment, the first communication module 1702 may transmit a message, image and audio signals, and content execution information during an interactive service with the second communication device 20.

The second communication module 1703 includes a software component enabling communication with the first device 30_1 through the second communication processor 1609 or the port 1610, and processing data received from the first device 30_1 through the second communication processor 1609 or the port 1610 and data transmitted to the first device 30_1. According to an exemplary embodiment, the second communication module 1703 may transmit and receive data through the second communication processor 1609 or the port 1610 so as to receive content-related information from the first device 30_1. In other words, in order to receive the content-related information, the second communication module 1703 may broadcast or transmit to the first device 30_1, a reproduction state information request and a content-related information obtaining command, and may receive a response signal.

The graphic module 1704 includes a software component adjusting brightness and rendering a graphic displayed on the touch screen 1603, and a software component providing a virtual keyboard (or a soft keyboard) for inputting text by the application module 1710.

The GPS module 1705 includes a software component determining a location of the first communication device 10 and providing the determined location to a GPS application.

The UI module 1706 includes a software component providing a UI required in an application providing UI information based on the touch screen 1603.

The sensing module 1707 includes a software component determining sensing information based on the sensor 1602 and providing a service based on the sensing information to the application module 1710.

The contact and motion module 1708 includes a software component detecting a touch contact based on the touch screen 1603, and tracking a motion based on a contact to provide the motion to the application module 1710 if required.

The power supply module 1709 includes a software component controlling a power supply to a hardware component in the first communication device 10 by being connected to the operating system 1701, and controlling a sleep mode of the touch screen 1603.

Since functions of modules included in the application module 1710 may be intuitively inferred based on their names, modules of the application module 1710 related to an exemplary embodiment will be mainly described.

For example, when the user of the first communication device 10 requests a video call based on information about the second communication device 20 through the touch screen 1603, the processor 1611 starts an operation of the video call module 1714. Accordingly, the processor 1611 tries to connect to the second communication device 20 through the first communication processor 1608. When the user of the first communication device 10 requests to share content while the first and second communication devices 10 and 20 are connected to each other and a video call service is being executed, the video call module 1714 is interlocked to the content share module 1712 to share the content while executing the video call service.

In other words, as the video call module 1714 and the content share module 1712 are interlocked to each other, the processor 1611 receives the content-related information from the first device 30_1, and generates the content execution information based on the received content-related information. When the content execution information is generated, the processor 1611 transmits the content execution information to the second communication device 20 by using the first communication module 1702.

Alternatively, in order to perform operations of the methods of FIGS. 3, 6, 10, 13, and 15, the processor 1611 may interlock the video call module 1714 to the external device control module 1713 and the second communication module 1703. Also, in order to transmit the content-related information by using a different communication service, the processor 1611 may interlock the video call module 1714 to one of the MMS module 1718, the SMS module 1717, and the messenger module 1716, or display a list of available communication services on the touch screen 1603 based on applications in the application module 1710 as shown in FIG. 7A or 7B. Accordingly, the application module 1710 may include various communication service modules.

The modules included in the application module 1710 are not limited to those shown in FIG. 17, and the application module 1710 may further include various modules, such as an instant messaging module, a video conference module, an image management module, a browsing module, a calendar module, a widget module, a search module, and a word processor module. Also, the modules included in the application module 1710 may be referred to as engines.

The storage 1607 may not store modules included in the application module 1710 from among the set of programs and/or commands shown in FIG. 17, or may only store location information, such as a URL, of the application module 1710 and display information indicating the application module 1710. If the storage 1607 does not store the modules included in the application module 1710, the processor 1611 may connect to the server 60 through the first communication processor 1608 to use a set of programs and/or commands stored in the server 60 corresponding to the application module 1710. When the storage 1607 only stores the location information and the display information, the processor 1611 may use a set of programs and/or commands of an application selected by the user and stored in the server 60 through the first communication processor 1608, by using the location information of the selected application based on the display application displayed on the touch screen 1603.

The first communication processor 1608 may transmit and receive data to and from the second communication device 20 or the server 60 through a wireless network, such as a wireless Internet, a wireless intranet, a wireless phone network, a wireless LAN, WiFi, WiFi direct (WFD), 3G, 4G, LTE, Bluetooth, infrared data association (IrDA), RFID, ultra wideband (UWB), or ZigBee, or a wired network, such as a wired Internet.

The first communication processor 1608 may include at least one of a broadcasting reception module, a mobile communication module, a wireless internet module, a wired internet module, a near field communication module, and a location information module, but is not limited thereto.

The broadcasting reception module receives a broadcasting signal and/or broadcasting-related information from an external broadcasting management server (not shown) through a broadcasting channel. Examples of the broadcasting channel include a satellite channel, a terrestrial channel, and a cable channel. The mobile communication module transmits and receives a wireless signal with a base station (not shown), the second communication device 20, and the server 60 on a mobile communication network. Examples of the wireless signal include a voice call signal, a video call signal, and various data according to transmitting and receiving of texts and MMS.

The wireless internet module is used for wireless internet connection. The wired internet module is used for wired internet connection. The near field communication module is used for near field communication. Bluetooth, RFID, IrDA, UWB, ZigBee, WFD, or NFC may be used in the near field communication module.

The location information module is used to check or obtain the location of the first communication device 10. An example of the location information module includes a GPS-based location information module. The GPS-based location information module receives location information from a plurality of satellites. The location information may include coordinate information represented by a latitude and a longitude.

The network 50 of FIG. 1 includes the wireless network and the wired network described with reference to the first communication processor 1608 above.

The second communication processor 1609 may transmit and receive data with the first through (n)th devices 30_1 through 30_n through a near field wireless network based on NFC, Bluetooth, IrDA, RFID, or ZigBee, or a wired network based on a home phone line networking alliance (PNA).

The second communication processor 1609 may include an NFC module included in the first communication processor 1608. Thus, it may be understood that the second communication processor 1609 is included in the first communication processor 1608.

The port 1610 may transmit and receive data with the first through (n)th devices 30_1 through 30_n by using a plug and play interface like a USB port (not shown). The plug and play interface automatically plays content when the first device 30_1 is plugged into the first communication device 10.

The power supply 1612 supplies power to the hardware components included in the first communication device 10. The power supply 1612 includes one or more power sources, such as a battery and an alternating current (AC) power source. The first communication device 10 may not include the power supply 1612, but alternatively include a connector (not shown) connectable to an external power supply (not shown).

The processor 1611 may be one or more processors controlling all operations of the first communication device 10. The processor 1611 may be one or more processors since the processor 1611 may be divided into and operated as a plurality of processors according to functions of the first communication device 10, although the processor 1611 is illustrated in a single chip form in FIG. 16A.

The processor 1611 may control all of the user input 1601, the sensor 1602, the touch screen 1603, the camera 1604, the audio input 1605, the audio output 1606, the storage 1607, the first communication processor 1608, the second communication processor 1609, the port 1610, and the power supply 1612 by using the operating system 1701 and various modules 1702 through 1719 stored in the storage 1607. Accordingly, the processor 1611 may be a controller, a microprocessor, or a digital signal processor. Also, the processor 1611 may provide a UI to the user input unit 1601, the sensor 1602, the touch screen 1603, the camera 1604, and the audio input 1605 by using the operating system 1701 and the UI module 1706.

The processor 1611 may perform one of the methods of FIGS. 3, 6, 10, 13, and 15 by executing at least one program related to the method. The processor 1611 may read and execute the at least one program from the storage 1607 or download the at least one program from the server 60 connected to the first communication processor 1608. The server 60 may be an application providing server or an application market server.

Alternatively, the processor 1611 may receive and display the content execution information based on the content-related information on the touch screen 1603 by executing the at least one program, and transmit the content execution information to the second communication device 20 when a content share request approval is received from the user. The processor 1611 may include an interface functional unit between various hardware components in the first communication device 10 and the processor 1611.

Referring to FIG. 16B, the second communication device 20 includes a user input 1624, a sensor 1613, the touch screen 1614, the camera 1615, an audio input 1616, an audio output 1617, a power supply 1618, a processor 1619, the storage 1620, the first communication processor 1621, the second communication processor 1622, and a port 1623, but components included in the second communication device 20 are not limited thereto. The structure of the second communication device 20 is not limited to that shown in FIG. 16B. As described above, basic functions of the components of the second communication device 20 of FIG. 16B are same or similar to those of the first communication device 10 of FIG. 16A, and thus overlapping details are not repeated here.

Also, the storage 1620 of the second communication device 20 may store at least one set of programs and/or commands classified according to modules as shown in FIG. 17. The external device control module 1713 stored in the storage 1620 may be interlocked to the first communication module 1702 to further perform a function of controlling the (n+1)th device 40_1 to continuously execute an interactive service.

The storage 1620 may not store the modules included in the application module 1710 from the set of programs and/or commands shown in FIG. 17, or only stores the display information indicating the application module 1710 or the location information of the application module 1710, as described above with reference to the storage 1607. Accordingly, operations of the second communication device 20 may be the same as described above with reference to the storage 1607.

Figure 18A:
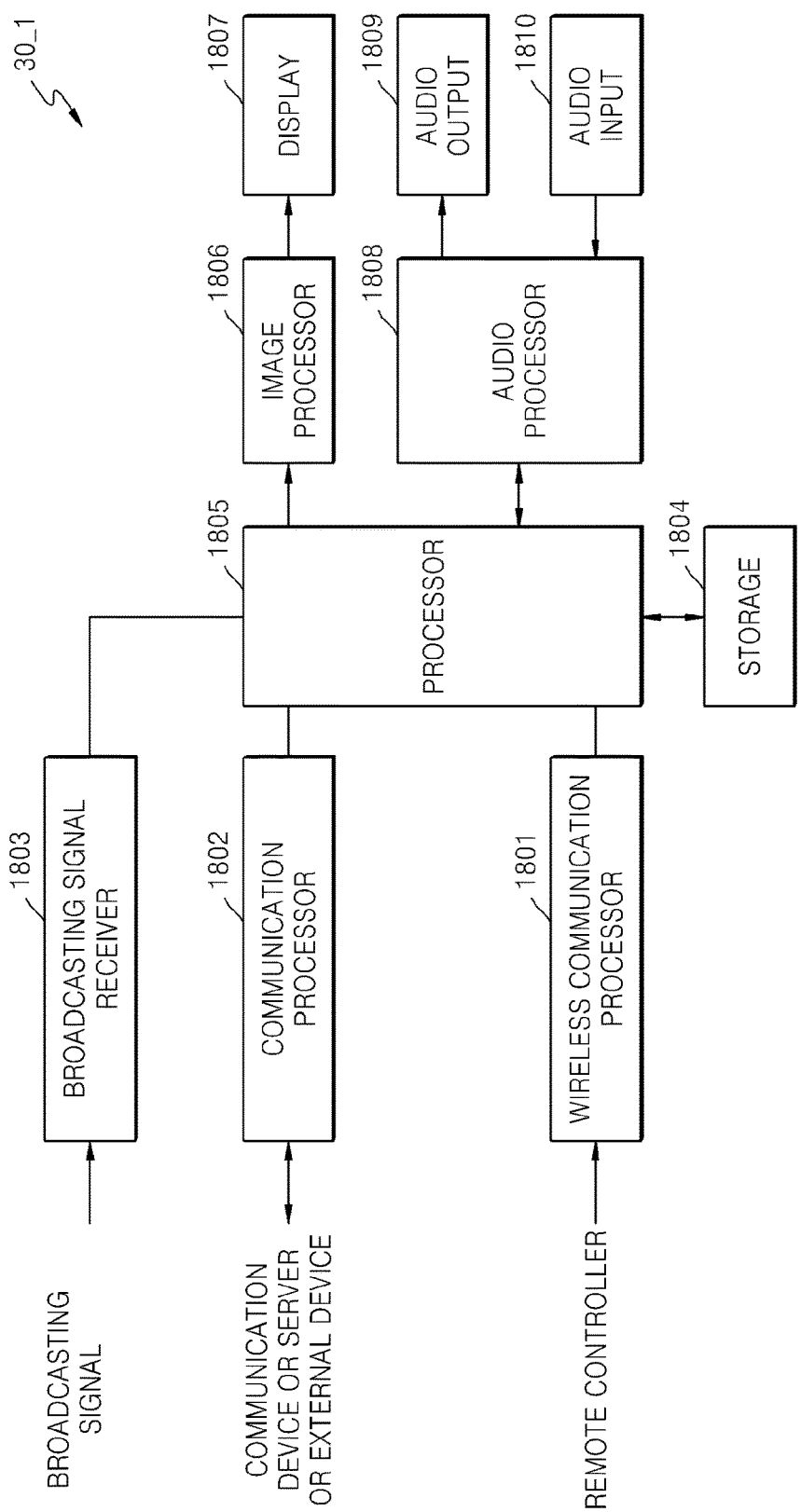
FIG. 18A is a block diagram of a first device of FIG. 1.
Figure 18B:
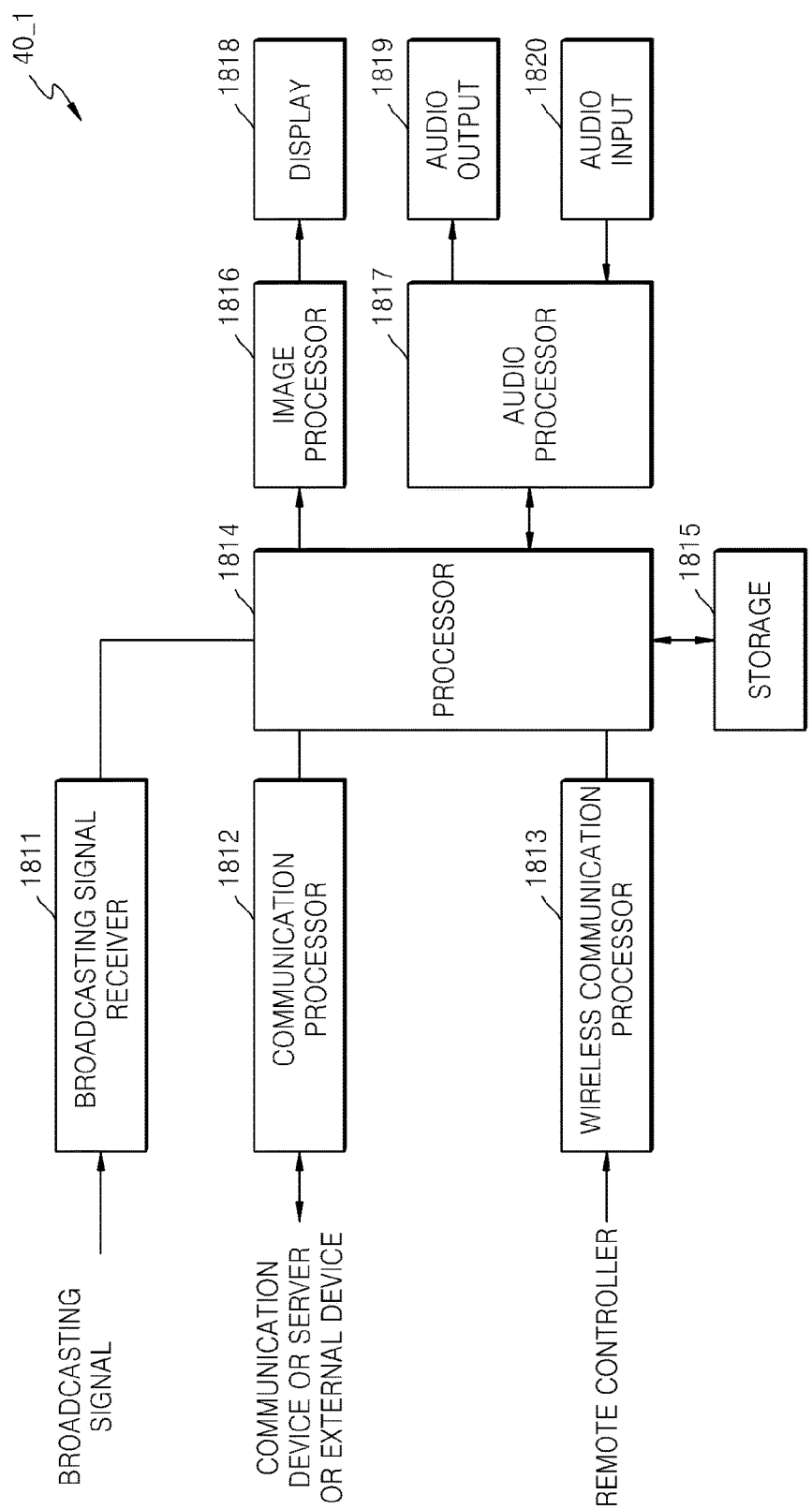
FIG. 18B is a block diagram of an (n+1)th device of FIG. 1.

FIG. 18A is a block diagram of the first device 30_1 of FIG. 1, and FIG. 18B is a block diagram of the (n+1)th device 40_1 of FIG. 1, wherein the first device 30_1 and the (n+1)th device 40_1 are each a TV having a communication function. As shown in FIGS. 18A and 18B, the first and (n+1)th devices 30_1 and 40_1 may have the same or similar structures. If the first and (n+1)th devices 30_1 and 40_1 are different types, the structures may differ.

Referring to FIG. 18A, the first device 30_1 may include a wireless communication processor 1801, a communication processor 1802, a broadcasting signal receiver 1803, a storage 1804, a processor 1805, an image processor 1806, a display 1807, an audio processor 1808, an audio output 1809, and an audio input 1810, but is not limited thereto.

The wireless communication processor 1801 is configured to wirelessly communicate with a remote controller. In other words, when the remote controller is an IR transmitter, the wireless communication processor 1801 may be an IR receiver for receiving an IR signal from the remote controller and demodulating and transmitting the IR signal to the processor 1805. Alternatively, when the remote controller is an RF module, the wireless communication processor 1801 may be an RF module for receiving an RF signal from the remote controller and transmitting the RF signal to the processor 1805. However, the wireless communication processor 1801 is not limited to the IR receiver or the RF module. In other words, the wireless communication processor 1801 may be based on NFC, such as Bluetooth.

The communication processor 1802 may transmit and receive data by being connected to the first communication device 10 based on the NFC described above with reference to the second communication processor 1609 of FIG. 16, or transmit and receive data by being connected to the server 60 or the (n+1)th device 40_1 through the network 50 of FIG. 1. Accordingly, the communication processor 1802 may include a first communication processor (not shown) communicating with the server 60 or the (n+1)th device 40_1 by being configured like the first communication processor 1608 of FIG. 16, and a second communication processor (not shown) communicating with the first communication device 10 by being configured like the second communication processor 1609 of FIG. 16.

The broadcasting signal receiver 1803 divides and outputs a broadcasting signal received from a tuner (not shown) into an image signal and an audio signal. In other words, the tuner selects a broadcasting signal corresponding to a channel selected by the user or a pre-stored channel from among received broadcasting signals. Also, the tuner converts the broadcasting signal to an intermediate frequency signal or a baseband image or audio signal. The intermediate frequency signal or the baseband image or audio signal is input to the processor 1805.

The storage 1804 may store at least one program for processing and controlling various signals in the processor 1805, and may store information for authorizing the first communication device 10 and information about the first device 30_1. The information for authorizing the first communication device 10 may include information about the user of the first communication device 10. The at least one program for processing and controlling the various signals in the processor 1805 may include at least one program for generating the content execution information as described above with reference to the method of FIG. 15, and transmitting the content execution information to the (n+1)th device 40_1.

The processor 1805 may control all the functions of the first device 30_1 and control the communication processor 1802 to transmit and receive data with the first communication device 10. The processor 1805 may load the at least one program stored in the storage 1804 to configure a UI screen to be displayed on the display 1807 through the image processor 1806.

The UI screen may be a UI screen for selecting content to be reproduced. Alternatively, the UI screen may be a UI screen required for the (n+1)th device 40_1 to continuously execute the interactive service as described above with reference to the method of FIG. 13, or a UI screen indicating a received state when the content execution information is received.

The processor 1805 may transmit and receive data related to reproducing content with the first communication device 10, the server 60, or the (n+1)th device 40_1 connected to the communication processor 1802. Accordingly, the processor 1805 may use the at least one program and resources stored in the storage 1804. The processor 1805 may include at least one processor like the processor 1611 of FIG. 6A.

The image processor 1806 includes an image decoder (not shown) and a scaler (not shown). The image processor 1806 processes an image signal output from the broadcasting signal receiver 1803 to be displayed on a screen. The image decoder decodes an inverse-multiplexed image signal, and the scaler scales a resolution of the decoded image signal to be output to the display 1807. The image decoder may be a decoder having any one of various standards. For example, when the inverse-multiplexed image signal is an image signal encoded according to the MPEG-2 standard, the image signal may be decoded by an MPEG-2 decoder. Alternatively, when the inverse-multiplexed image signal is an image signal encoded according to the H.264 standard based on a digital multimedia broadcasting (DMB) method or DVB-H, the image signal may be decoded by an H.264 decoder.

The display 1807 may output an image processed by the image processor 1806. The output image may be an image received from the broadcasting signal receiver 1803, a UI screen, or an image of content received from the server 60 through the communication processor 1802. Alternatively, the display 1807 may be a touch screen so as to be used also as an input.

The audio processor 1808 processes and outputs an audio signal output from the broadcasting signal receiver 1803 and audio included in the content received from the communication processor 1802, to the audio output 1809. The audio output 1809 may have any one of various structures for outputting a stereo signal, a 3.1 channel signal, and a 5.1 channel signal.

Also, the audio processor 1808 may process and transmit a signal input from the audio input 1810 to the processor 1805. The audio input 1810 may be a microphone.

Referring to FIG. 18B, the (n+1)th device 40_1 may include a broadcasting signal receiver 1811, a communication processor 1812, a wireless communication processor 1813, a processor 1814, a storage 1815, an image processor 1816, a display 1818, an audio processor 1817, an audio output 1819, and an audio input 1820, but is not limited thereto.

As described above, like the first and second communication devices 10 and 20 shown in FIGS. 16A and 16B, the components of the (n+1)th device 40_1 of FIG. 18B have the same or similar functions as those of the first device 30_1 of FIG. 18A, and thus overlapping details thereof are not repeated here. However, as described above with reference to FIG. 16A, detailed operations and standards of the components of the first and (n+1)th devices 30_1 and 40_1 may somewhat differ from each other.

For example, details of programs stored in the storage 1804 of the first device 30_1 and details of programs stored in the storage 1815 of the (n+1)th device 40_1 may differ from each other, and standards of the display 1807 and the communication processor 1802 of the first device 30_1 and standards of the display 1818 and the communication unit 1812 of the (n+1)th device 40_1 may differ from each other.

Figure 19:
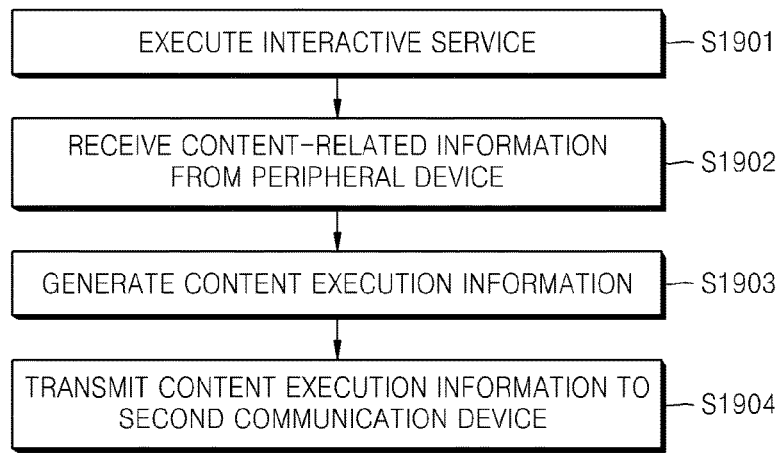
FIG. 19 is a flowchart illustrating a method of sharing content, which is performed by the first communication device, according to an exemplary embodiment.

FIG. 19 is a flowchart illustrating the method of FIG. 13 or 15, which is performed by the first communication device 10 by using the at least one program and resources stored in the storage 1607 by the processor 1611, according to an exemplary embodiment.

Referring to FIG. 19, the processor 1611 of the first communication device 10 receives the content-related information from the first device 30_1 in operation S1902 while the first communication device 10 is executing the interactive service with the second communication device 20 in operation S1901. Operation S1902 may be performed according to monitoring of a peripheral device of the first communication device 10 or monitoring of the first device 30_1 connected to the first communication device 10 as described above with reference to FIG. 13, or inputting or generating of the content-related information obtaining command.

The processor 1611 generates the content execution information based on the received content-related information in operation S1903.

Figure 20:
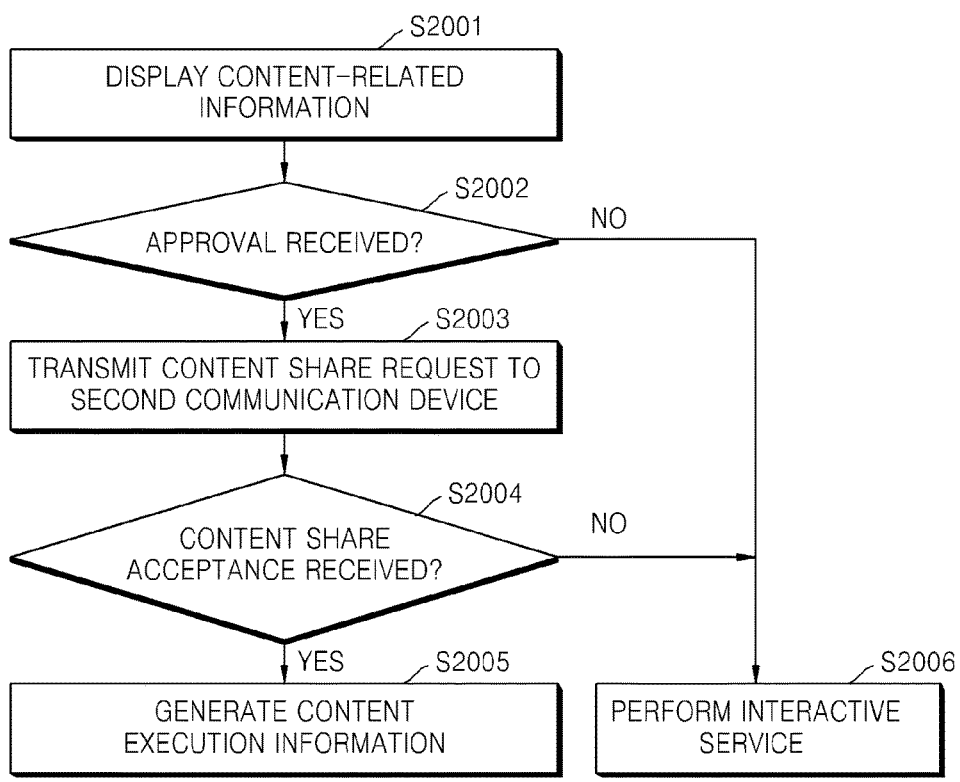
FIG. 20 is a flowchart illustrating in detail generating of content execution information of the method of FIG. 19, according to an exemplary embodiment n.

FIG. 20 is a flowchart illustrating in detail operation S1903 of the method of FIG. 19, according to an exemplary embodiment. Referring to FIG. 20, the processor 1611 displays the content-related information on the touch screen 1603 in operation S2001. Upon receiving an approval (or confirmation) of the user based on the content-related information in operation S2002, the processor 1611 transmits the content share request to the second communication device 20 through the first communication processor 1608 by using the first communication module 1702 stored in the storage 1607, in operation S2003.

Upon receiving the content share request acceptance from the second communication device 20 through the first communication processor 1608 in operation S2004, the processor 1611 generates the content execution information in operation S2005. However, if the approval of the user based on the content-related information is not received in operation S2002 or the content share request acceptance is not received in operation S2004, the processor 1611 ends an operation related to content sharing and maintains the interactive service in operation S2006.

Figure 21:
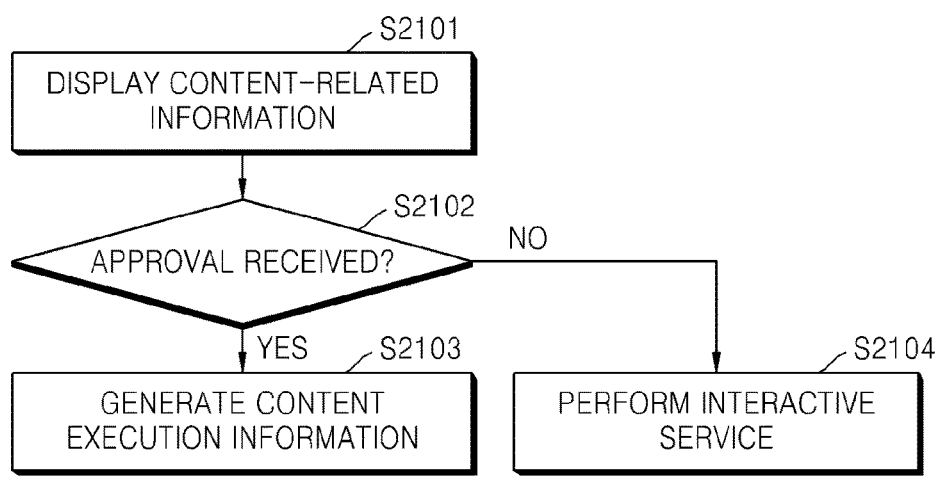
FIG. 21 is a flowchart illustrating in detail generating of content execution information of the method of FIG. 19, according to another exemplary embodiment.

FIG. 21 is a flowchart illustrating in detail operation S1903 of the method of FIG. 19, according to another exemplary embodiment. Referring to FIG. 21, the processor 1611 of the first communication device 10 displays the content-related information on the touch screen 1603 in operation S2101. Upon receiving the approval of the user on the content-related information in operation S2102, the processor 1611 generates the content execution information based on the content-related information in operation S2103. However, when the approval is not received, the processor 1611 ends the operation related to content sharing and maintains the interactive service in operation S2104.

When the content execution information is generated in operation S1903, the processor 1611 transmits the content execution information to the second communication device 20 through the first communication processor 1608 in operation S1904.

Figure 22:
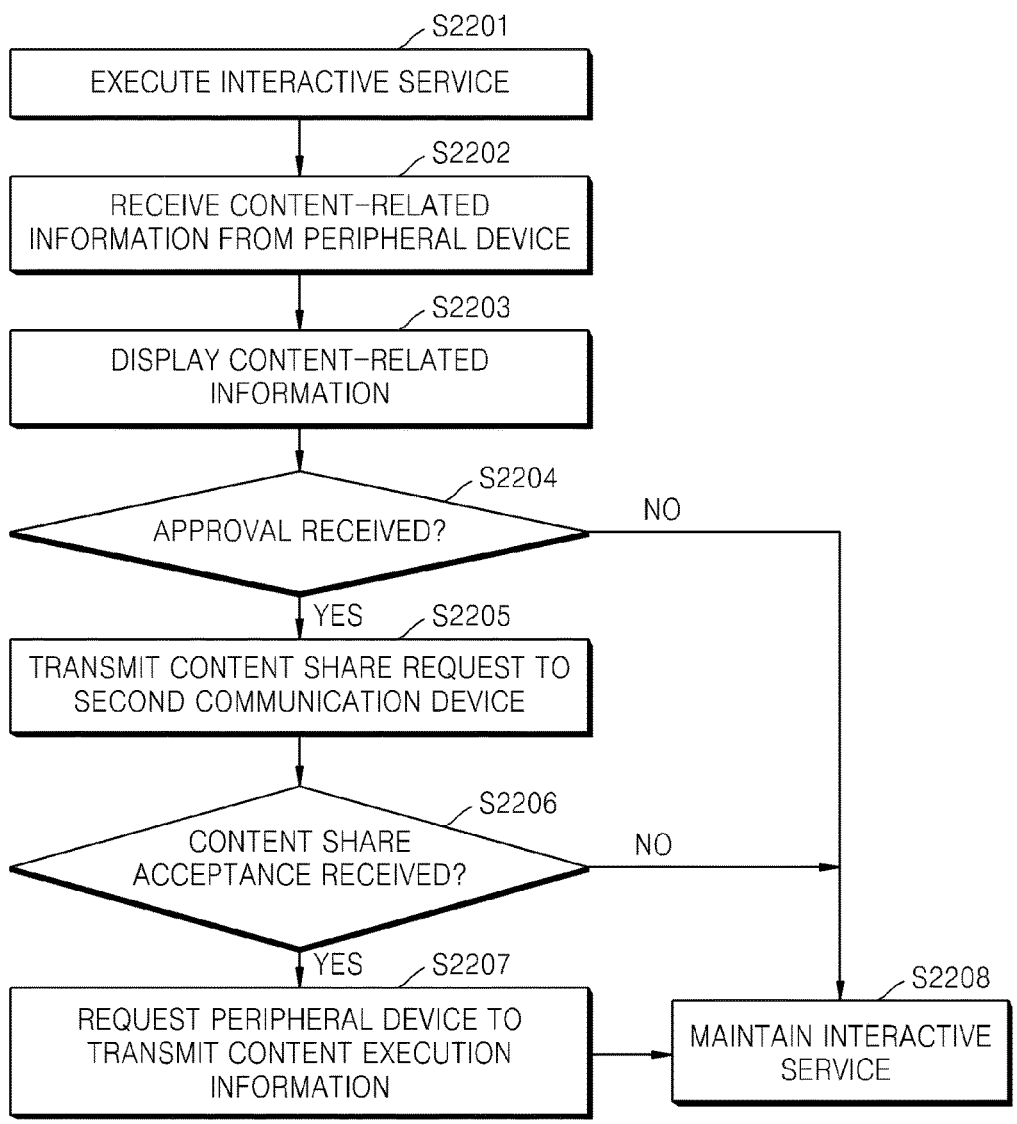
FIG. 22 is a flowchart illustrating a method of sharing content, which is performed by the first communication device, according to another exemplary embodiment n.

FIG. 22 is a flowchart illustrating the method of FIG. 15, which is performed by the first communication device 10 by using the at least one program and resources stored in the storage 1607 by the processor 1611, according to another exemplary embodiment.

The processor 1611 of the first communication device 10 receives the content-related information from the first device 30_1 in operation S2202 while the first communication device 10 is executing the interactive service with the second communication device 20 in operation S2201, as described above with reference to FIG. 15. Operation S2202 may be performed according to monitoring of a peripheral device of the first communication device 10 or monitoring of the first device 30_1 connected to the first communication device 10 as described above with reference to FIG. 13, or inputting or generating of the content-related information obtaining command.

When the content-related information is displayed on the touch screen 1603 and an approval of the user of the first communication device 10 regarding the content-related information is received in operation S2204, the processor 1611 transmits the content share request to the second communication device 20 in operation S2205.

Accordingly, when the content share request acceptance is received from the second communication device 20 in operation S2206, the processor 1611 requests the first device 30_1 to transmit the content execution information through the second communication processor 1609 or the port 1610 by using the second communication processor 1609 in operation S2207, and maintains the interactive service in operation S2208.

If the approval of the user regarding the content-related information is not received in operation S2204 or the content share request acceptance is not received in operation S2206, the processor 1611 ends an operation related to content sharing and maintains the interactive service in operation S2208.

Figure 23:
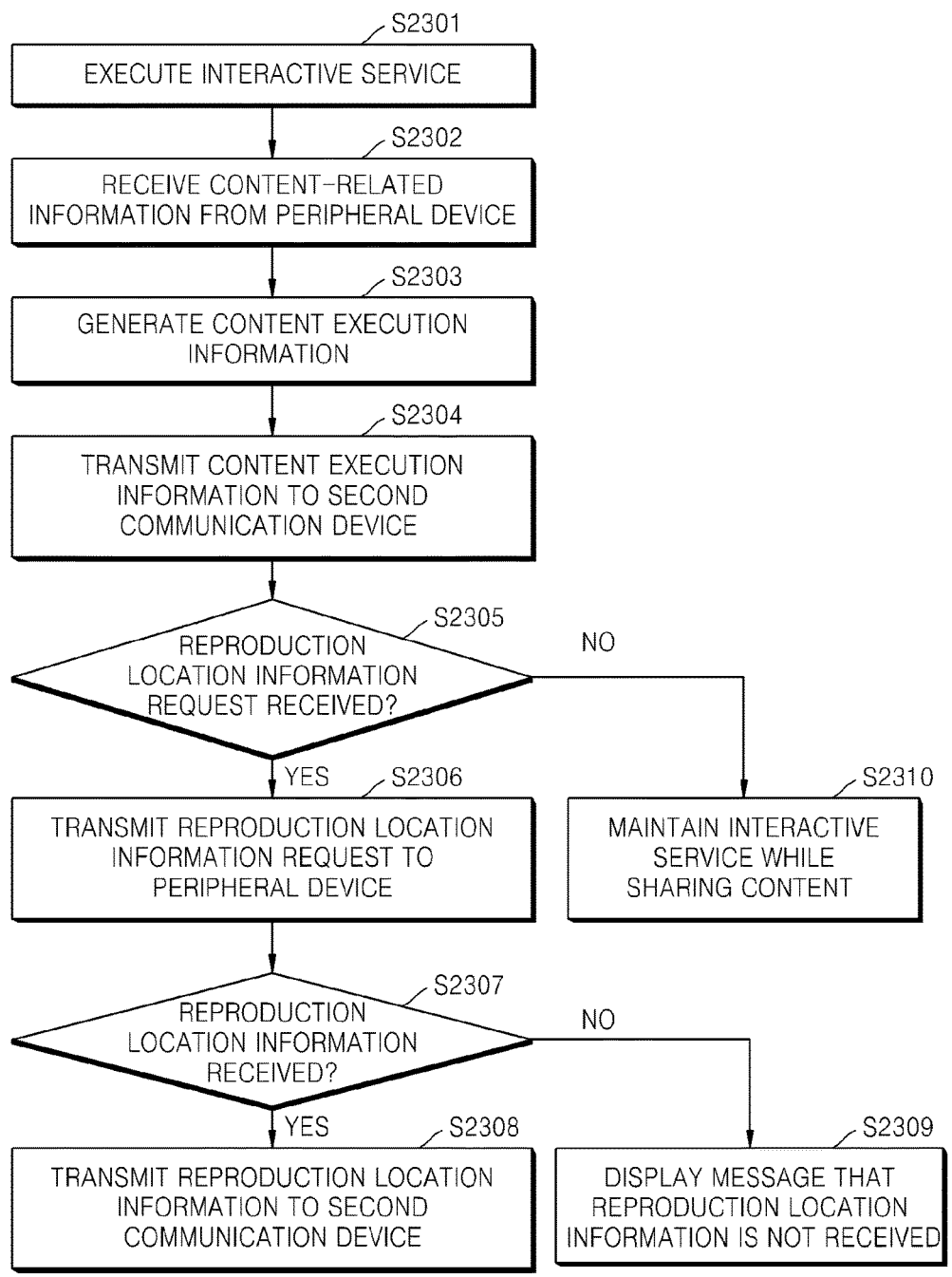
FIG. 23 is a flowchart illustrating a method of sharing content, which is performed by the first communication device, according to another exemplary embodiment.

FIG. 23 is a flowchart illustrating a method of sharing content, which is performed by the first communication device 10 by using the at least one program and resources stored in the storage 1607 by the processor 1611, according to another exemplary embodiment. In the method of FIG. 23, operations of receiving a reproduction location information request from the second communication device 20 are added to the method of FIG. 19. Thus, operations S2301 through S2304 of FIG. 23 are respectively the same as operations S1901 through S1904 of FIG. 19, and details thereof are not repeated here.

Upon receiving the reproduction location information request from the second communication device 20 through the first communication processor 1608 in operation S2305, the processor 1611 of the first communication device 10 transmits the reproduction location information request to the first device 30_1 through the second communication processor 1609 or the port 1610 in operation S2306. The reproduction location information request is received from the second communication device 20 when the content is not broadcast content provided in real-time.

Accordingly, upon receiving the reproduction location information from the first device 30_1 in operation S2307, the processor 1611 transmits the reproduction location information to the second communication device 20 through the first communication processor 1608 in operation S2308. If the reproduction location information is not received in operation S2307, the processor 1611 displays a message that the reproduction location information is not received on the touch screen 1603 in operation S2309. Accordingly, the user of the first communication device 10 may take action related to providing of the reproduction location information.

When the reproduction location information request is not received from the second communication device 20 in operation S2305, the user of the first communication device 10 may watch or listen to the content through the first device 30_1 and the user of the second communication device 20 may watch or listen to the content through the (n+1)th device 40_1 so as to share experiences of the content by using the interactive service between the first and second communication devices 10 and 20, in operation S2310. Here, if the content is not broadcast content provided in real-time, the users of the first and second communication devices 10 and 20 may have different watching or listening times.

Figure 24:
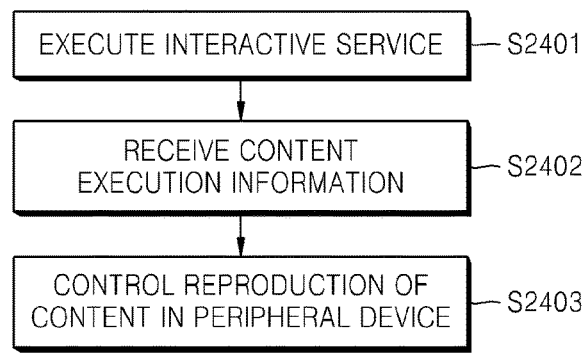
FIG. 24 is a flowchart illustrating a method of sharing content, which is performed by the second communication device, according to another exemplary embodiment.

FIG. 24 is a flowchart illustrating the method of FIG. 13 or 15, which is performed by the second communication device 20 by using the at least one program and resources stored in the storage 1620 by the processor 1619, according to an exemplary embodiment.

As described above with reference to FIGS. 13 and 15, the second communication device 20 receives the content execution information from the first communication device 10 through the first communication processor 1621 in operation S2402 while the second communication device 20 is executing the interactive service with the first communication device 10 in operation S2401.

Figure 25:
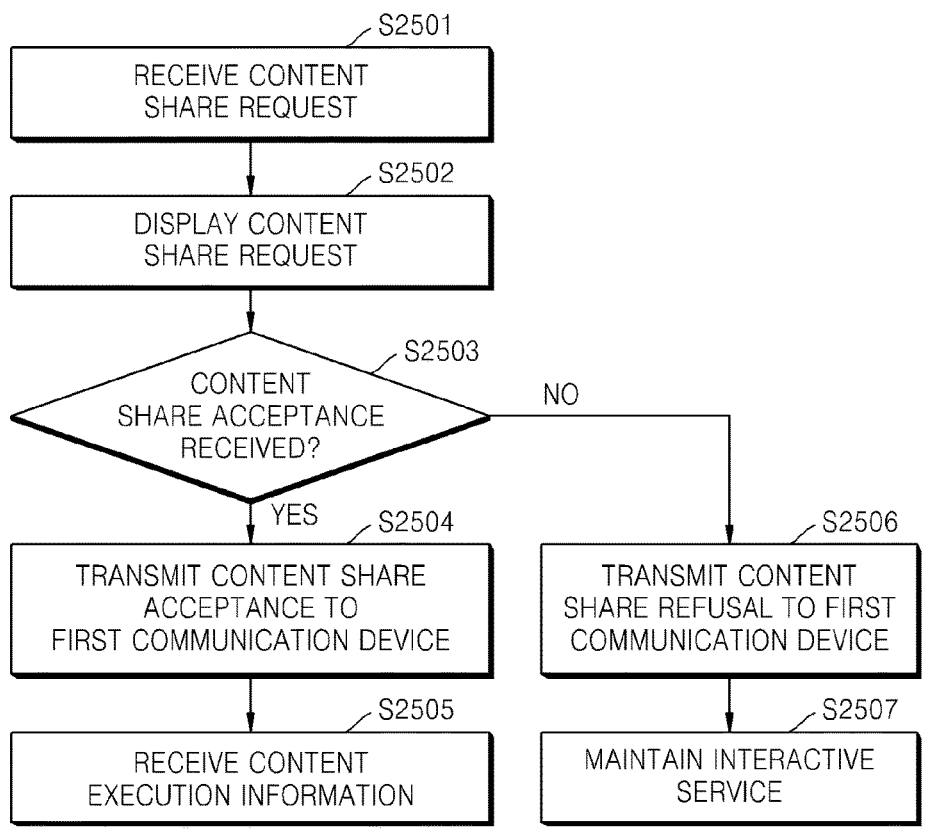
FIG. 25 is a flowchart illustrating in detail receiving of content execution information of the method of FIG. 24, according to an exemplary embodiment.

FIG. 25 is a flowchart illustrating in detail operation S2402 of the method of FIG. 24, according to an exemplary embodiment. Referring to FIG. 25, when the content share request is received in operation S2501, the processor 1619 of the second communication device 20 displays the content share request on the touch screen 1614 in operation S2502. Then, when the content share request acceptance is received from the user of the second communication device 20 through the touch screen 1614 in operation S2503, the processor 1619 transmits the content share request acceptance to the first communication device 10 through the first communication processor 1621 in operation S2504. Accordingly, the processor 1619 receives the content execution information from the first communication device 10 through the second communication processor 1609 in operation S2505.

Otherwise, if the content share request acceptance is not received in operation S2503, the processor 1619 of the second communication device 20 transmits a content share request refusal to the first communication device 10 through the first communication processor 1608 in operation S2506 and maintains the interactive service in operation S2507. Accordingly, the users of the first and second communication devices 10 and 20 continuously use the interactive service while not sharing the content.

In operation S2403 of FIG. 24, the processor 1619 of the second communication device 20 controls reproduction of the content in the (n+1)th device 40_1 by using the content execution information.

Figure 26:
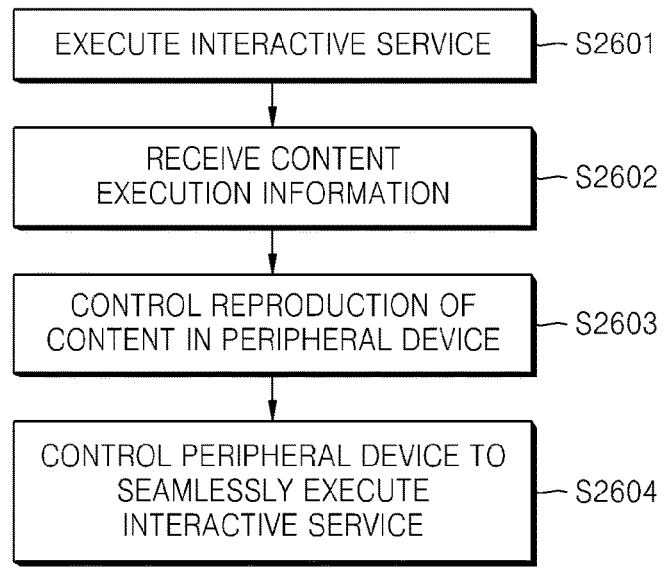
FIG. 26 is a flowchart illustrating a method of sharing content, which is performed by the second communication device, according to another exemplary embodiment.

FIG. 26 is a flowchart illustrating the method of FIG. 13, which is performed by the second communication device 20, according to another exemplary embodiment. In the method of FIG. 26, the (n+1)th device 40_1 continuously executes the interactive service in addition to the method of FIG. 24 like the method of FIG. 13. Thus, operations S2601 through S2603 of FIG. 26 are respectively the same as operations S2401 through S2403 of FIG. 24, and details thereof are not repeated here.

In operation S2604, the processor 1619 of the second communication device 20 controls the (n+1)th device 40_1 though the second communication processor 1622 such that the (n+1)th device 40_1 continuously executes the interactive service.

Figure 27:
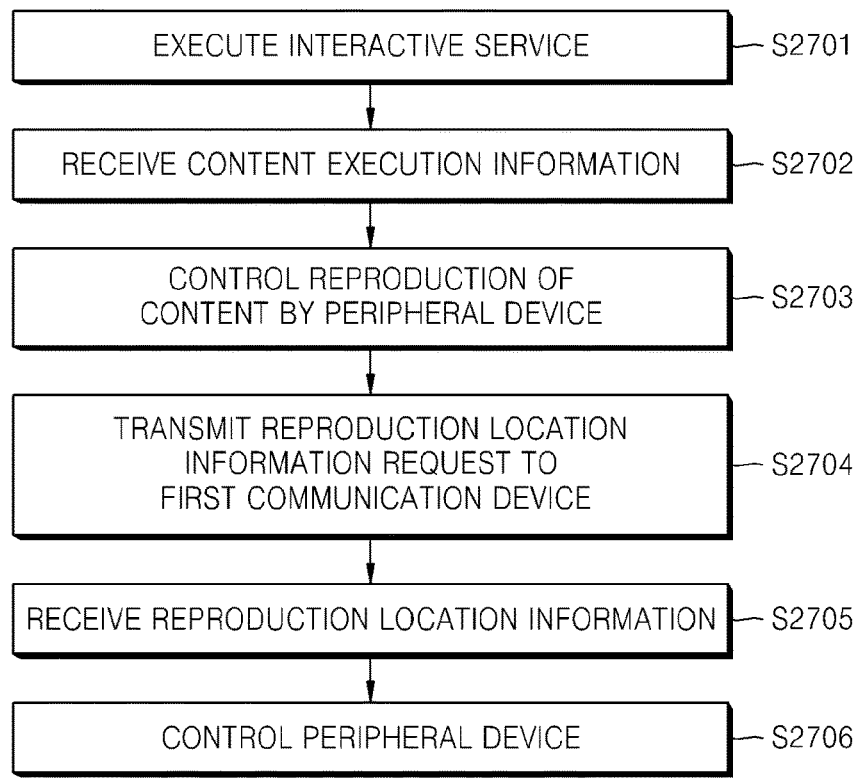
FIG. 27 is a flowchart illustrating a method of sharing content, which is performed by the second communication device, according to another exemplary embodiment.

FIG. 27 is a flowchart illustrating a method of sharing content, which is performed by the second communication device 20, according to another exemplary embodiment, wherein the first communication device 10 performs according to the method of FIG. 23. Since operations S2701 through S2703 of FIG. 27 are respectively the same as operations S2401 through S2403 of FIG. 24, details thereof are not repeated here.

In operation S2704, the processor 1619 of the second communication device 20 transmits the reproduction location information request to the first communication device 10 through the first communication processor 1621. Then, upon receiving the reproduction location information from the first communication device 10 in operation S2705, the processor 1619 uses the reproduction location information to control a reproduction location of the content reproduced in the (n+1)th device 40_1 through the second communication processor 1622 or the port 1623 in operation S2706.

Figure 28:
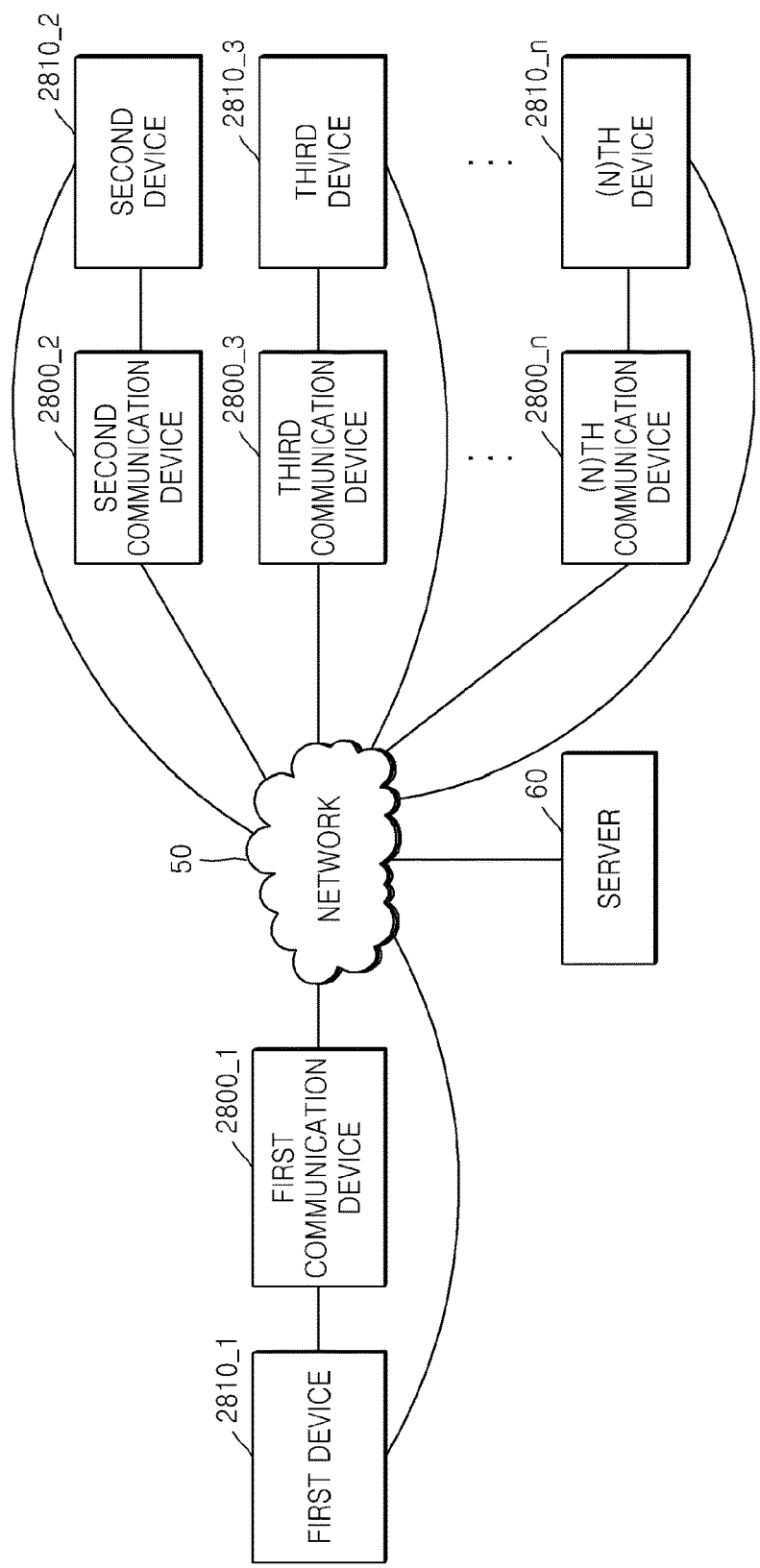
FIG. 28 is a block diagram of a system for sharing content, according to another exemplary embodiment.

FIG. 28 is a block diagram of a system for sharing content, according to another exemplary embodiment, wherein the interactive service is executed in a several-for-one manner.

In other words, in FIG. 28, when a first communication device 2800_1 executes an interactive service simultaneously with second through (n)th communication devices 2800_2 through 2800_n as described above with reference to FIG. 1, the first communication device 2800_1 may share content being reproduced in a first device 2810_1 by using peripheral devices (or external devices) connectable to the second through (n)th communication devices 2800_2 through 2800_n.

When one communication device executes an interactive service with a plurality of communication devices as shown in FIG. 28, all communication devices participating in the interactive service may be connected to each other so that any communication device may request other communication devices to share content being reproduced in a peripheral device.

For example, the (n)th communication device 2800_n may request the first through (n−1)th communication device 2800_1 through 2800_n−1 to share content being reproduced in an (n)th device 2810_n. Accordingly, users of the first through (n)th communication devices 2800_1 through 2800_n may share contents in real-time through first through (n)th devices 2810_1 through 2810_n respectively connected to the first through (n)th communication devices 2800_1 through 2800_n while sharing viewing experiences based on the interactive service.

Types of the first through (n)th communication devices 2800_1 through 2800_n may be the same as or different from that of the first communication device 10 of FIG. 1. However, the types of the first through (n)th communication devices 2800_1 through 2800_n are not limited as long as the first through (n)th communication devices 2800_1 through 2800_n are capable of executing an interactive service and storing at least one program and resources for controlling a connected peripheral device to share content.

Types of the first through (n)th devices 2810_1 through 2810_n may be the same as or different from that of the first device 30_1. However, the types of the first through (n)th devices 2810_1 through 2810_n are not limited as long as the first through (n)th devices 2810_1 through 2810_n are capable of reproducing content by being controlled respectively by the first through (n)th communication devices 2800_1 through 2800_n while the interactive service is being executed. Accordingly, the first through (n)th devices 2810_1 through 2810_n may store at least one program and resources.

Figure 29:
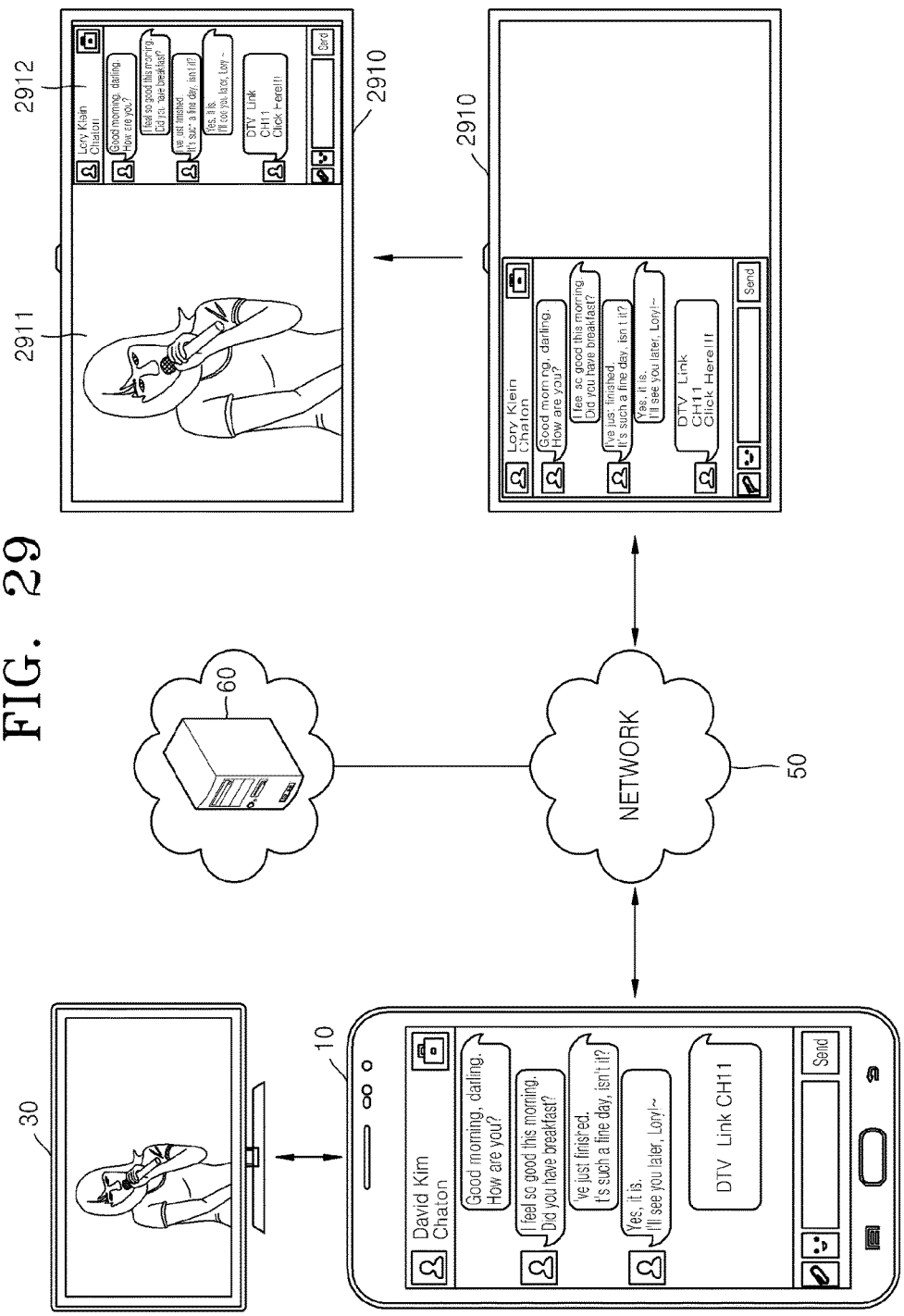
FIG. 29 is a diagram for describing a system for sharing content, according to another exemplary embodiment.

FIG. 29 is a diagram for describing a system for sharing content, according to another exemplary embodiment. In FIG. 29, the second communication device 20 and the (n+1)th device 40_1 of FIG. 1 are replaced by a third communication device 2910.

In other words, as shown in FIG. 29, when the first communication device 10 requests to share the content being reproduced in a first device 30 as described in FIG. 1, the third communication device 2910 reproduces the requested content. Accordingly, the third communication device 2910 may simultaneously display a content reproducing screen 2911 and an interactive service screen 2912 as shown in FIG. 29. The third communication device 2910 includes at least one program and resources to display the content reproducing screen 2911 and the interactive service screen 2912. Regions of the third communication device 2910 for displaying the content reproducing screen 2911 and the interactive service screen 2912 may be determined based on a type of the interactive service, or may be pre-determined regardless of the type of the interactive service.

Figure 30:
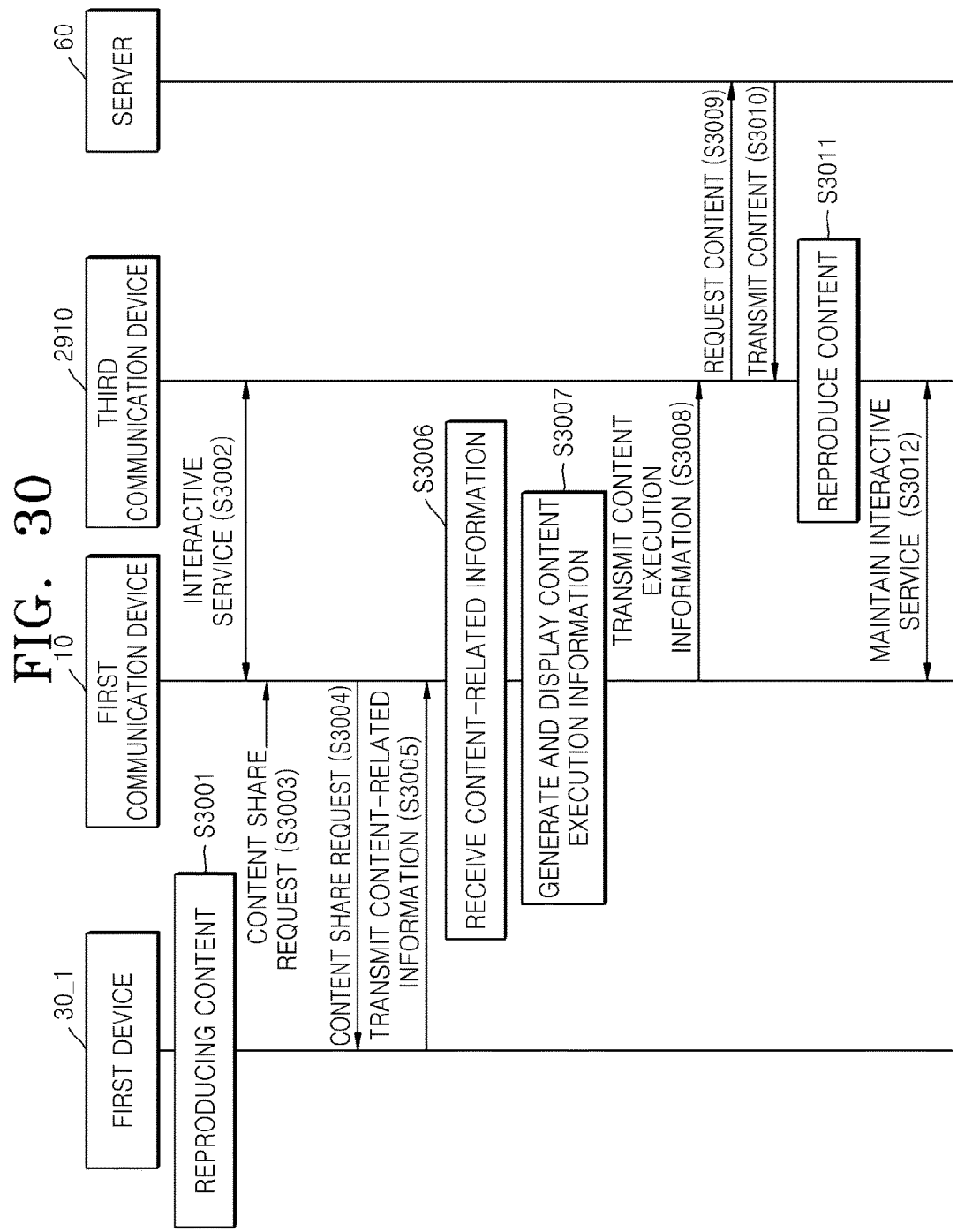
FIG. 30 is a flowchart illustrating a method of sharing content based on the system of FIG. 29.

FIG. 30 is a flowchart illustrating a method of sharing content based on the system of FIG. 29.

Referring to FIG. 30, while the first device 30_1 is reproducing content in operation S3001 and the first and third communication devices 10 and 2910 are executing the interactive service in operation S3002, the first communication device 10 receives the content-related information from the first device 30_1 in operations S3003 through S3006 as described above with reference to FIG. 13. Accordingly, the first communication device 10 generates and displays the content execution information in operation S3007 based on the received content-related information. The method of FIG. 30 may be modified to selectively include an operation of receiving an approval of the user of the first communication device 10, an operation of transmitting a content share request to the third communication device 2910, and an operation of receiving a content share request acceptance from the third communication device 2910 as described above with reference to FIGS. 13 through 15, from when the content-related information is received to when the content execution information is generated and displayed.

The first communication device 10 transmits the content execution information to the third communication device 2910 in operation S3008. Accordingly, the third communication device 2910 requests the server 60 for the content in operation S3009. Upon receiving the content from the server 60 in operation S3010, the third communication device 2910 reproduces the received content as shown in FIG. 29 while maintaining the interactive service with the first communication device 10 in operation S3012 to share viewing experiences. The interactive service between the first and third communication devices 10 and 2910 may be maintained while operations S3003 through S3011 are performed.

Figure 31:
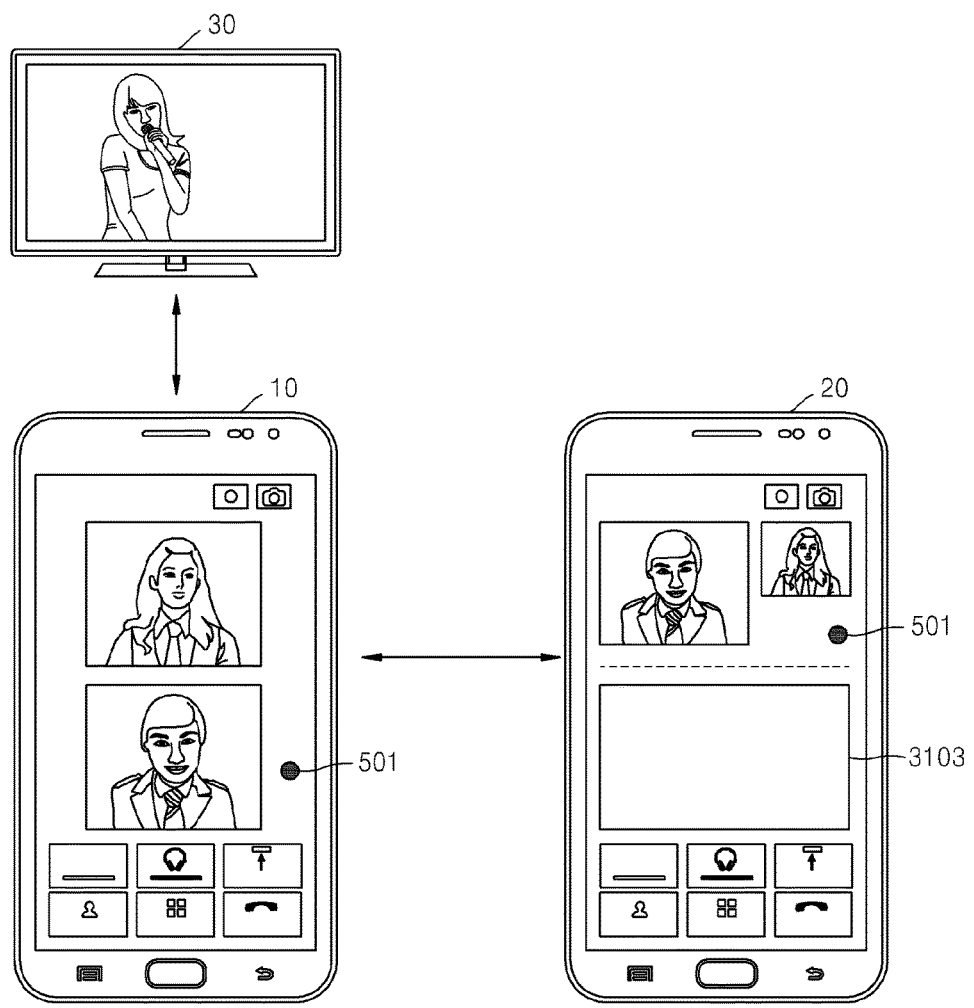
FIG. 31 is a diagram for describing a system for sharing content, according to another exemplary embodiment.

FIG. 31 is a diagram for describing a system for sharing content, according to another exemplary embodiment, wherein content being reproduced in the first device 30, that is a peripheral device of the first communication device 10, is reproduced in a region 3103 of the second communication device 20 during a video call based on the interactive service between the first and second communication devices 10 and 20. Screens of the first and second communication devices 10 and 20 of FIG. 31 may include the information 731 about the different communication service shown in FIG. 7C.

Figure 32:
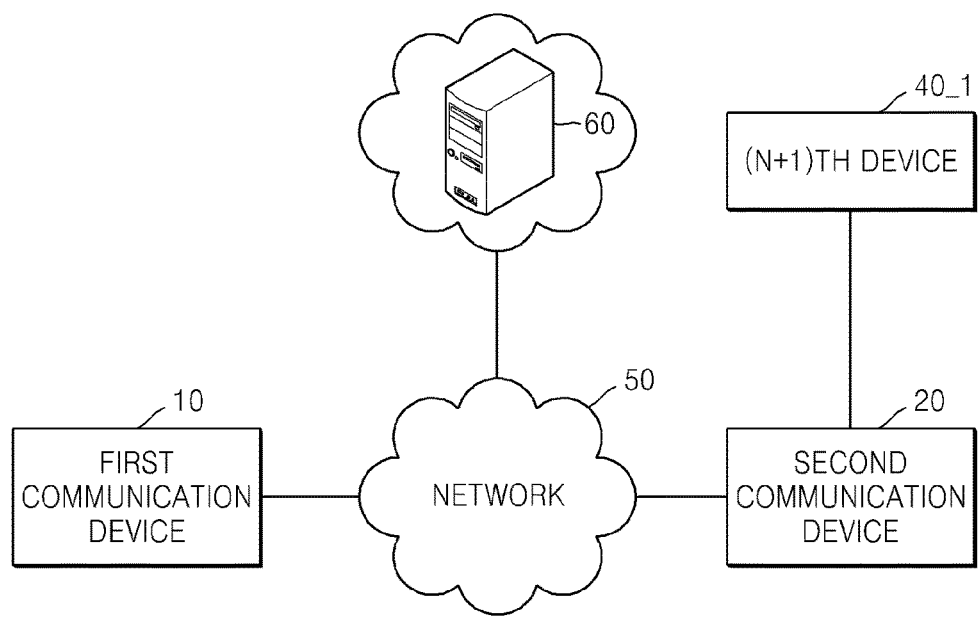
FIG. 32 is a diagram for describing a system for sharing content, according to another exemplary embodiment.

FIG. 32 is a diagram for describing a system for sharing content, according to another exemplary embodiment, wherein the first communication device 10 and the first device 30_1 of FIG. 1 are modified. In other words, while the first communication device 10 is reproducing content, the first communication device 10 may try and execute the interactive service with the second communication device 20, and request the second communication device 20 to share the content being reproduced in the first communication device 10.

Figure 34:
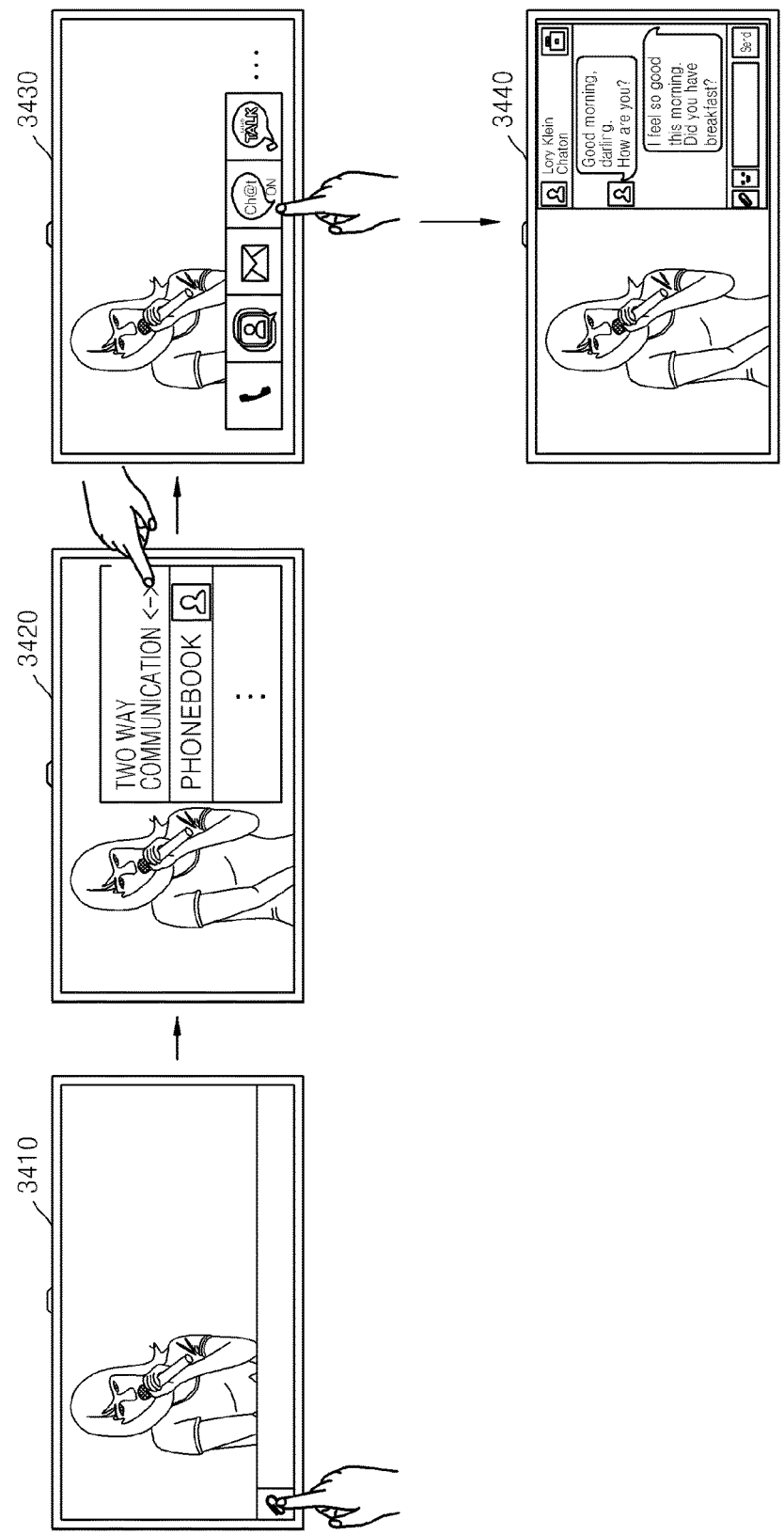
FIG. 34 illustrate screens of a first communication device from when the first communication device is reproducing content to when the first communication provides an interactive service with a second communication device.

FIG. 33 is a flowchart illustrating a method of sharing content based on the system of FIG. 32. FIG. 34 illustrate screens of the first communication device 10 of FIG. 32 from when the first communication device 10 is reproducing content to when the first communication 10 executes an interactive service with the second communication device 20.

Referring to FIGS. 33 and 34, when the user of the first communication device 10 makes a request for the interactive service as shown in a screen 3420 while the first communication device 10 is reproducing content in operation S3301 as shown in a screen 3410, icons of available bidirectional communication services are displayed on the first communication device 10 as shown in a screen 3430. When the interactive service is executed by selecting ChatON from the displayed icons, the first communication device 10 may display a screen 3440. The screen 3440 simultaneously displays the content being reproduced and a screen based on the interactive service. However, the screens of the first communication device 10 performing above operations are not limited to FIG. 34.

When the content-related information obtaining command is received by the user of the first communication device 10 in operation S3303 while the interactive service is being executed in operation S3302, the first communication device 10 obtains the content-related information of the content being reproduced in the first communication device 10 in operation S3304.

The first communication device 10 generates and displays the content execution information based on the content-related information in operation S3305. The first communication device 10 transmits the content execution information to the second communication device 20 in operation S3306. Accordingly, the second communication device 20 transmits the content reproduction control signal to the (n+1)th device 40_1 in operation S3307. The (n+1)th device 40_1 requests the server 60 for the content in operation S3308, and upon receiving the content from the server 60 in operation S3309, the (n+1)th device 40_1 reproduces the content.

The first and second communication devices 10 and 20 maintain the interactive service in operation S3311 to transmit and receive messages about the content to share experiences.

Figure 35:
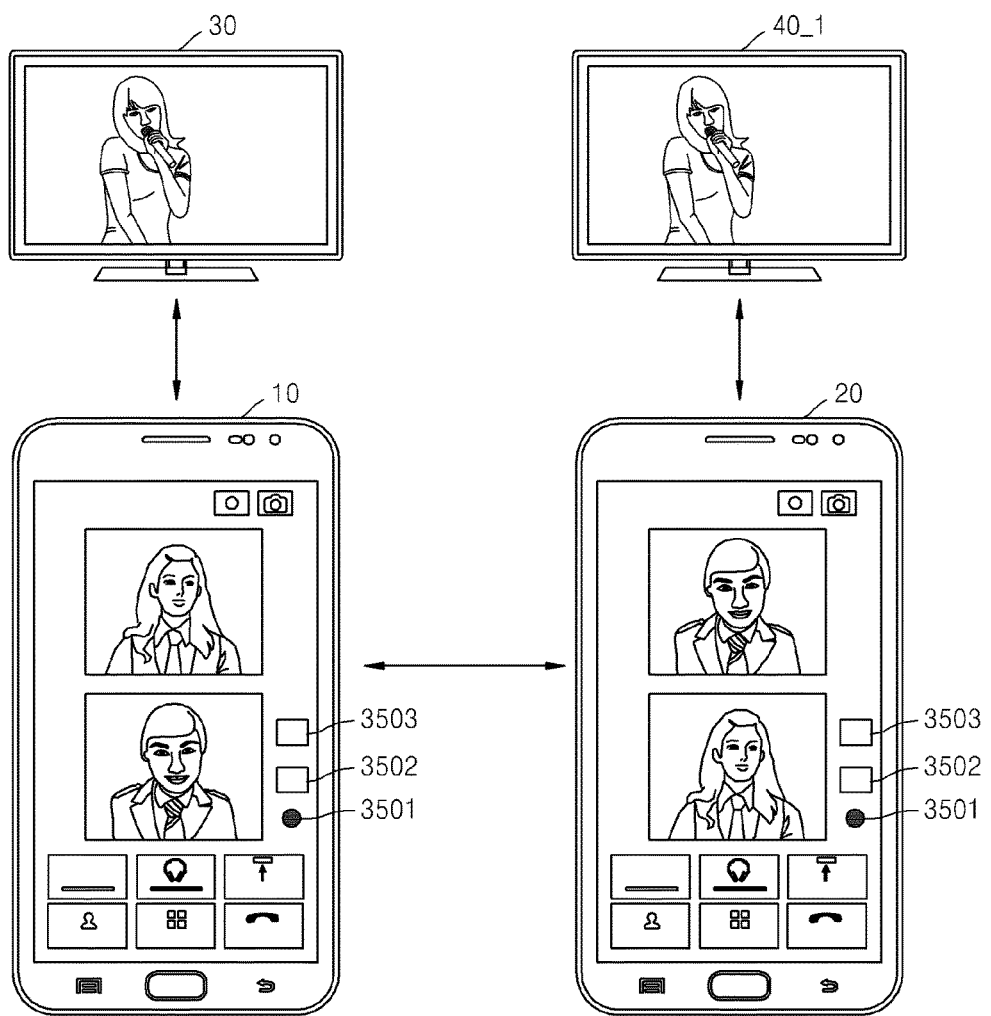
FIG. 35 is a diagram for describing a system for sharing content, according to another exemplary embodiment.

FIG. 35 is a diagram for describing a system for sharing content, according to another exemplary embodiment, wherein information 3501 about a state of sharing the content, information 3502 about a selected device, and information 3503 about a used communication service when a different communication service is used to transmit the content-related information are all displayed during a video call based on the interactive service between the first and second communication devices 10 and 20. Accordingly, the users may intuitively determine which device is currently used to share the content, and which communication service is used to transmit the content-related information.

Figure 36:
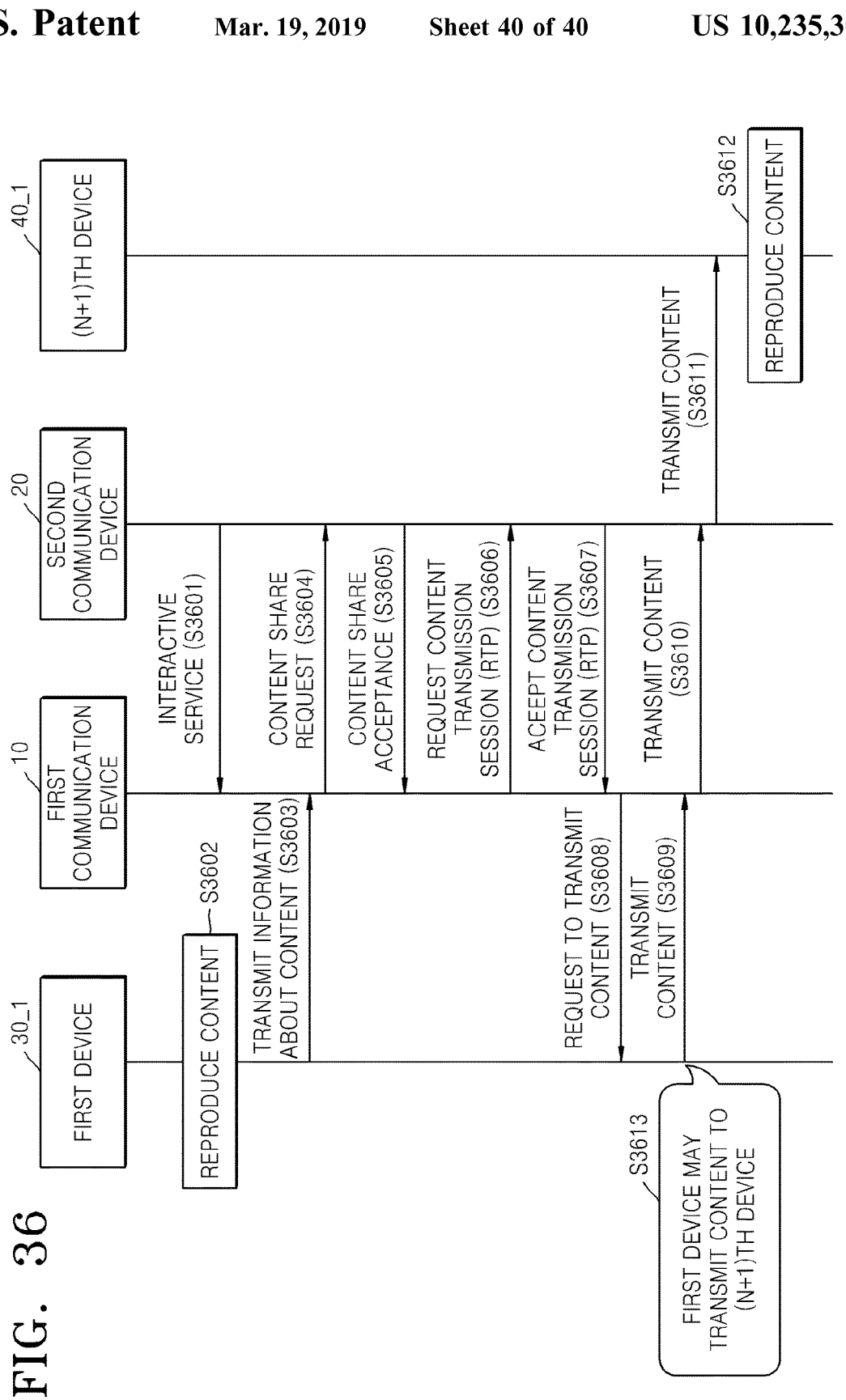
FIG. 36 is a flowchart illustrating a method of sharing content, according to another exemplary embodiment.

FIG. 36 is a flowchart illustrating a method of sharing content, according to another exemplary embodiment, wherein the content being reproduced is directly transmitted. A system for sharing content, to which the method of FIG. 36 is applied, may include the first device 30_1, the first communication device 10, the second communication device 20, and the (n+1)th device 40_1, but is not limited thereto.

When the content is reproduced in the first device 30_1 in operation S3602 while the first and second communication devices 10 and 20 are executing the interactive service in operation S3601, the first device 30_1 transmits information about the content to the first communication device 10 in operation S3603. Operation S3603 may be performed by setting the information about the content to be automatically transmitted to the second communication device 20 when the content is reproduced in the first device 30_1, by monitoring a peripheral device while the first communication device 10 executes the interactive service with the second communication device 20, or by monitoring a peripheral device of the first communication device 10 regardless of the interactive service, but is not limited thereto.

Upon receiving the information about the content from the first device 30_1, the first communication device 10 transmits the content share request to the second communication device 20 in operation S3604. The content share request may be provided as shown in the text balloon 202 of FIG. 2 when the interactive service is a messenger service. The second communication device 20 transmits the content share request acceptance to the first communication device 10 in operation S3605 when the user of the second communication device 20 touches "Click here" in the message in the text balloon 202 or inputs a space gesture or a voice signal corresponding to "Click here".

Upon receiving the content share request acceptance, the first communication device 10 requests a content transmission session based on RTP to the second communication device 20 in operation S3606. When the content transmission session is accepted by the second communication device 20 in operation S3607, the first communication device 10 requests the first device 30_1 to transmit the content in operation S3608. Accordingly, the first device 30_1 transmits the content being reproduced to the first communication device 10 in operation S3609. The first communication device 10 transmits the received content to the second communication device 20 based on RTP in operation S3610. Accordingly, the first communication device 10 transmits the content while maintaining the interactive service with the second communication device 20. The second communication device 20 transmits the received content to the (n+1)th device 40_1 in operation S3611. The (n+1)th device 40_1 reproduces the received content in operation S3612.

The method of FIG. 36 may be modified such that the first device 30_1 directly transmits the content to the (n+1)th device 40_1 in operation S3613 based on the request to transmit the content in operation S3608. Operations of the first and (n+1)th devices 30_1 and 40_1 based on operation S3613 may be performed according to operations S1512 through S1514 of FIG. 15.

One or more programs, including commands for executing a method of reproducing content, according to the one or more exemplary embodiments, can also be embodied as computer-readable codes on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, etc. The computer-readable recording medium can also be distributed over network-coupled computer systems so that the computer-readable code is stored and executed in a distributed fashion.

While the exemplary embodiments have been particularly shown and described with reference to the exemplary embodiments thereof, it will be understood by those of ordinary skill in the art that various changes in form and details may be made therein without departing from the spirit and scope of the exemplary embodiments as defined by the following claims.

What is claimed is:

1. A method of sharing content by a first device, the method comprising:
   executing an interactive service between the first device and a second device;
   displaying a content share icon on a screen of the first device;
   in response to a user selection of the content share icon displayed on the screen, transmitting a content share request to the second device and changing a first state of the content share icon displayed on the screen to a second state of the content share icon displayed on the screen;
   receiving a content share acceptance from the second device;
   in response to receiving the content share acceptance from the second device, changing the second state of the content share icon displayed on the screen to a third state of the content share icon displayed on the screen;
   transmitting a content request to a peripheral device of the first device;
   receiving at least one of content and content-related information from the peripheral device; and
   transmitting the received at least one of content and content-related information to the second device.

2. The method of claim 1, wherein the transmitting of the received at least one of content and content-related information is performed via a communication service which is different from the interactive service.

3. The method of claim 1, wherein the transmitting of the received at least one of content and content-related information is performed via the interactive service.

4. The method of claim 1, wherein the content comprises content that is being reproduced by the peripheral device or content that is stored in the peripheral device.

5. A method of sharing content by a first device, the method comprising:
   executing an interactive service between the first device and a second device;
   displaying a content share icon on a screen of the first device;
   in response to a user selection of the content share icon displayed on the screen, transmitting a content share request to the second device and changing a state of the content share icon displayed on the screen;
   receiving a content share acceptance from the second device;
   transmitting a content request to a peripheral device of the first device;
   receiving at least one of content and content-related information from the peripheral device; and
   transmitting the received at least one of content and content-related information to the second device,
   wherein the content-related information comprises identification information of the peripheral device, identification information of the content, reproduction synchronization information of the content, and location information of the content.

6. The method of claim 1, wherein the transmitting of the content request comprises broadcasting the content request.

7. A method of sharing content by a first device, the method comprising:
   executing an interactive service between the first device and a second device;
   displaying a content share icon on a screen of the first device;
   in response to a user selection of the content share icon displayed on the screen, transmitting a content share request to the second device and changing a state of the content share icon displayed on the screen;
   receiving a content share acceptance from the second device;

transmitting a content request to a peripheral device of the first device;
receiving at least one of content and content-related information from the peripheral device; and
transmitting the received at least one of content and content-related information to the second device,
wherein the method further comprises:
displaying a list of a plurality of peripheral devices; and
selecting the peripheral device from the displayed list,
wherein the transmitting of the content request comprises transmitting the content request to the selected peripheral device.

8. The method of claim 1, further comprising:
displaying the received at least one of the content and the content-related information on a part of the screen of the first device.

9. A method of sharing content by a first device, the method comprising:
executing an interactive service between the first device and a second device;
displaying a content share icon on a screen of the first device;
in response to a user selection of the content share icon displayed on the screen, transmitting a content share request to the second device and changing a state of the content share icon displayed on the screen;
receiving a content share acceptance from the second device;
transmitting a content request to a peripheral device of the first device;
receiving at least one of content and content-related information from the peripheral device; and
transmitting the received at least one of content and content-related information to the second device,
wherein the method further comprises:
displaying a list of available communication service on a part of the screen of the first device;
selecting a communication service based on the displayed list of available communication service according to a user input,
wherein the transmitting the received at least one of content and content-related information is performed via the selected communication service.

10. A non-transitory computer-readable recording medium having recorded thereon one or more programs comprising commands for executing a method of sharing content by a first device, the method comprising:
executing an interactive service between the first device and a second device;
displaying a content share icon on a screen of the first device;
in response to a user selection of the content share icon displayed on the screen, transmitting a content share request to the second device and changing a first state of the content share icon displayed on the screen to a second state of the content share icon displayed on the screen;
receiving a content share acceptance from the second device;
in response to receiving the content share acceptance from the second device, changing the second state of the content share icon displayed on the screen to a third state of the content share icon displayed on the screen;
transmitting a content request to a peripheral device of the first device;
receiving at least one of content and content-related information from the peripheral device; and
transmitting the received at least one of content and content-related information to the second device.

11. A first device comprising:
a communication interface configured to communicate with a second device and/or a peripheral device of the first device; and
a processor configured to execute an interactive service between the first device and a second device via the communication interface, display a content share icon on a screen of the first device, in response to a user selection of the content share icon displayed on the screen, transmit a content share request to the second device via the communication interface and change a first state of the content share icon displayed on the screen to a second state of the content share icon displayed on the screen, receive a content share acceptance from the second device via the communication interface, in response to receiving the content share acceptance from the second device, change the second state of the content share icon displayed on the screen to a third state of the content shared icon displayed on the screen, transmit a content request to a peripheral device of the first device via the communication interface, receive at least one of content and content-related information from the peripheral device via the communication interface, and transmit the received at least one of content and content-related information to the second device via the communication interface.

12. The first device of claim 11, wherein the processor controls the communication interface to transmit the received at least one of content and content-related information to the second device by using a communication service which is different from the interactive service.

13. The first device of claim 11, wherein the processor controls the communication interface to transmit the received at least one of content and content-related information to the second device by using the interactive service.

14. The first device of claim 11, wherein the content comprises content that is being reproduced by the peripheral device or content that is stored in the peripheral device.

15. A first device comprising:
a communication interface configured to communicate with a second device and/or a peripheral device of the first device; and
a processor configured to execute an interactive service between the first device and the second device via the communication interface, display a content share icon on a screen of the first device, in response to a user selection of the content share icon displayed on the screen, transmit a content share request to the second device via the communication interface and change a state of the content share icon displayed on the screen, receive a content share acceptance from the second device via the communication interface, transmit a content request to a peripheral device of the first device via the communication interface, receive at least one of content and content-related information from the peripheral device via the communication interface, and transmit the received at least one of content and content-related information to the second device via the communication interface,
wherein the content-related information comprises identification information of the peripheral device, identification information of the content, reproduction synchronization information of the content, and location information of the content.

16. The first device of claim 11, wherein the processor controls the communication interface to transmit the content request to the peripheral device by broadcasting the content request.

17. A first device comprising:
- a communication interface configured to communicate with a second device and/or a peripheral device of the first device;
- a processor configured to execute an interactive service between the first device and the second device via the communication interface, display a content share icon on a screen of the first device, in response to a user selection of the content share icon displayed on the screen, transmit a content share request to the second device via the communication interface and change a state of the content share icon displayed on the screen, receive a content share acceptance from the second device via the communication interface, transmit a content request to a peripheral device of the first device via the communication interface, receive at least one of content and content-related information from the peripheral device via the communication interface, and transmit the received at least one of content and content-related information to the second device via the communication interface; and
- an input interface configured to receive a user input,
- wherein the processor displays a list of a plurality of peripheral devices on the screen, selects the peripheral device from the displayed list based on the user input received via the input interface, and transmits the content request to the selected peripheral device via the communication interface.

18. The first device of claim 17, wherein the processor further configured to display the received at least one of the content and the content-related information on a part of the screen.

* * * * *